(12) United States Patent
Cotter et al.

(10) Patent No.: US 11,037,355 B2
(45) Date of Patent: \*Jun. 15, 2021

(54) APPARATUS AND METHOD FOR PERFORMING MOTION CAPTURE USING A RANDOM PATTERN ON CAPTURE SURFACES

(71) Applicant: REARDEN MOVA, LLC, Mountain View, CA (US)

(72) Inventors: Timothy Cotter, Sunnyvale, CA (US); Stephen G. Perlman, Palo Alto, CA (US); John Speck, Brainbridge Island, WA (US); Roger van der Laan, Redwood City, CA (US); Kenneth A. Pearce, San Francisco, CA (US); Greg LaSalle, Culver City, CA (US)

(73) Assignee: Rearden Mova, LLC, Mountain View, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/141,199

(22) Filed: Jan. 4, 2021

(65) Prior Publication Data

US 2021/0125392 A1 Apr. 29, 2021

Related U.S. Application Data

(60) Continuation of application No. 17/087,503, filed on Nov. 2, 2020, which is a continuation of application (Continued)

(51) Int. Cl.
*G06T 13/40* (2011.01)
*H04N 13/239* (2018.01)
(Continued)

(52) U.S. Cl.
CPC ............ *G06T 13/40* (2013.01); *G06K 9/3216* (2013.01); *G06T 7/20* (2013.01); *G06T 7/246* (2017.01);
(Continued)

(58) Field of Classification Search
CPC ..... G06T 13/40; G06T 19/006; G06T 7/0014; G06T 2207/30201; G06T 7/20;
(Continued)

(56) References Cited

U.S. PATENT DOCUMENTS

| 2,127,656 A | 8/1938 | Terry |
| 3,085,877 A | 4/1963 | Reid |

(Continued)

FOREIGN PATENT DOCUMENTS

| CA | 2519737 A1 | 9/2006 |
| CA | 2657309 A1 | 12/2007 |

(Continued)

OTHER PUBLICATIONS

Joshi et al., "Learning Controls for Blend Shape Based Realistic Facial Animation", Eurographics/SIGGRAPH Symposium on Computer Animation, 2003, 7 pages.

(Continued)

*Primary Examiner* — Lin Ye
*Assistant Examiner* — Tuan H Le
(74) *Attorney, Agent, or Firm* — Nicholson De Vos Webster & Elliott LLP

(57) ABSTRACT

A method is described comprising: applying a random pattern to specified regions of an object; tracking the movement of the random pattern during a motion capture session; and generating motion data representing the movement of the object using the tracked movement of the random pattern.

30 Claims, 30 Drawing Sheets

(Continued)

(10 of 30 Drawing Sheet(s) Filed in Color)

Related U.S. Application Data

No. 16/792,116, filed on Feb. 14, 2020, now Pat. No. 10,825,226, which is a continuation of application No. 15/713,601, filed on Sep. 22, 2017, now Pat. No. 10,593,090, which is a continuation of application No. 14/754,651, filed on Jun. 29, 2015, now Pat. No. 9,928,633, which is a division of application No. 14/187,759, filed on Feb. 24, 2014, now Pat. No. 9,996,962, which is a division of application No. 11/255,854, filed on Oct. 20, 2005, now Pat. No. 8,659,668.

(60) Provisional application No. 60/724,565, filed on Oct. 7, 2005.

(51) Int. Cl.
| | |
|---|---|
| *G06K 9/32* | (2006.01) |
| *H04N 5/235* | (2006.01) |
| *H04N 5/247* | (2006.01) |
| *G06T 7/20* | (2017.01) |
| *G06T 7/292* | (2017.01) |
| *H04N 13/243* | (2018.01) |
| *G06T 7/246* | (2017.01) |
| *H04N 5/222* | (2006.01) |
| *H04N 5/225* | (2006.01) |

(52) U.S. Cl.
CPC ............ *G06T 7/292* (2017.01); *H04N 5/2224* (2013.01); *H04N 5/2256* (2013.01); *H04N 5/2353* (2013.01); *H04N 5/2354* (2013.01); *H04N 5/247* (2013.01); *H04N 13/239* (2018.05); *H04N 13/243* (2018.05); *G06K 2009/3225* (2013.01); *G06T 2207/10016* (2013.01); *G06T 2207/30196* (2013.01)

(58) Field of Classification Search
CPC ...................... G06T 7/246; G06T 7/292; G06T 2207/10016; G06T 2207/30196; H04N 5/2224; H04N 5/2354; H04N 5/2256; H04N 13/239; H04N 5/247; H04N 13/243; H04N 5/2353; G06K 9/3216; G06K 2009/3225; G06F 3/012; G06F 3/04883; G06F 9/542; G06F 2203/011; G06F 3/011; A61B 5/165; A61B 5/7445
See application file for complete search history.

(56) References Cited

U.S. PATENT DOCUMENTS

| | | | |
|---|---|---|---|
| 3,335,716 A | 8/1967 | Alt et al. | |
| 3,699,856 A | 10/1972 | Chabot et al. | |
| 3,805,238 A | 4/1974 | Rothfjell | |
| 4,360,393 A | 11/1982 | Koval | |
| 4,389,670 A | 6/1983 | Davidson et al. | |
| 4,417,791 A | 11/1983 | Erland et al. | |
| 5,227,985 A | 7/1993 | Dementhon | |
| 5,235,416 A | 8/1993 | Stanhope | |
| 5,304,809 A | 4/1994 | Wickersheim | |
| 5,420,622 A | 5/1995 | Faroudja | |
| 5,480,341 A | 1/1996 | Plakos | |
| 5,519,826 A | 5/1996 | Harper et al. | |
| 5,569,317 A | 10/1996 | Sarada et al. | |
| 5,575,719 A | 11/1996 | Gobush et al. | |
| 5,678,546 A | 10/1997 | Truppe | |
| 5,689,577 A | 11/1997 | Arata | |
| 5,699,798 A | 12/1997 | Hochman et al. | |
| 5,852,672 A | 12/1998 | Lu | |
| 5,878,283 A | 3/1999 | House et al. | |
| 5,930,379 A | 7/1999 | Rehg et al. | |
| 5,966,129 A | 10/1999 | Matsukuma et al. | |
| 5,969,822 A | 10/1999 | Fright et al. | |
| 6,020,892 A | 2/2000 | Dillon | |
| 6,072,496 A * | 6/2000 | Guenter | G06K 9/00201 345/419 |
| 6,141,104 A | 10/2000 | Schulz et al. | |
| 6,148,280 A | 11/2000 | Kramer | |
| 6,151,118 A | 11/2000 | Norita et al. | |
| 6,241,622 B1 | 6/2001 | Gobush et al. | |
| 6,243,198 B1 | 6/2001 | Sedlmayr | |
| 6,473,717 B1 | 10/2002 | Claussen et al. | |
| 6,487,516 B1 | 11/2002 | Amorai-Moriya | |
| 6,492,986 B1 * | 12/2002 | Metaxas | G06K 9/00335 345/420 |
| 6,513,921 B1 | 2/2003 | Houle | |
| 6,533,674 B1 | 3/2003 | Gobush | |
| 6,554,706 B2 | 4/2003 | Kim et al. | |
| 6,592,465 B2 | 7/2003 | Lutz et al. | |
| 6,633,294 B1 | 10/2003 | Rosenthal et al. | |
| 6,685,326 B2 | 2/2004 | Debevec et al. | |
| 6,758,759 B2 | 7/2004 | Gobush et al. | |
| 6,801,641 B2 | 10/2004 | Eraslan | |
| 6,850,872 B1 | 2/2005 | Marschner et al. | |
| 6,943,949 B2 | 9/2005 | Sedlmayr | |
| 7,009,337 B2 | 3/2006 | Urabe | |
| 7,044,613 B2 | 5/2006 | Debevec | |
| 7,068,277 B2 | 6/2006 | Menache | |
| 7,075,254 B2 | 7/2006 | Chitta et al. | |
| 7,081,997 B2 | 7/2006 | Sedlmayr | |
| 7,086,954 B2 | 8/2006 | Gobush et al. | |
| 7,089,319 B2 | 8/2006 | Lysenko et al. | |
| 7,127,081 B1 * | 10/2006 | Erdem | G06K 9/00228 382/103 |
| 7,154,671 B2 | 12/2006 | Sedlmayr | |
| 7,184,047 B1 | 2/2007 | Crampton | |
| 7,218,320 B2 | 5/2007 | Gordon et al. | |
| 7,239,321 B2 | 7/2007 | Berger | |
| 7,257,237 B1 | 8/2007 | Luck et al. | |
| 7,324,110 B2 | 1/2008 | Edwards et al. | |
| 7,327,362 B2 | 2/2008 | Grau | |
| 7,333,113 B2 | 2/2008 | Gordon | |
| 7,344,498 B1 | 3/2008 | Doughty et al. | |
| 7,356,164 B2 | 4/2008 | Aliaga et al. | |
| 7,358,972 B2 | 4/2008 | Gordon et al. | |
| 7,369,681 B2 | 5/2008 | Foth et al. | |
| 7,426,422 B2 | 9/2008 | Carman et al. | |
| 7,436,403 B2 | 10/2008 | Debevec | |
| 7,548,272 B2 | 6/2009 | Perlman et al. | |
| 7,554,549 B2 | 6/2009 | Sagar et al. | |
| 7,587,520 B1 | 9/2009 | Kent et al. | |
| 7,606,392 B2 | 10/2009 | Gordon et al. | |
| 7,720,259 B2 | 5/2010 | Gordon et al. | |
| 8,054,312 B2 | 11/2011 | Gordon | |
| 8,144,153 B1 | 3/2012 | Sullivan et al. | |
| 8,659,668 B2 | 2/2014 | Cotter et al. | |
| 9,177,387 B2 | 11/2015 | Marks | |
| 9,424,679 B2 | 8/2016 | Sullivan et al. | |
| 9,928,633 B2 | 3/2018 | Cotter et al. | |
| 9,996,962 B2 | 6/2018 | Cotter et al. | |
| 10,593,090 B2 | 3/2020 | Cotter et al. | |
| 10,825,226 B2 | 11/2020 | Cotter et al. | |
| 2002/0060649 A1 | 5/2002 | Perlman | |
| 2002/0130867 A1 | 9/2002 | Yang et al. | |
| 2003/0016368 A1 | 1/2003 | Aman et al. | |
| 2003/0027655 A1 | 2/2003 | Lutz et al. | |
| 2003/0095186 A1 | 5/2003 | Aman et al. | |
| 2003/0160791 A1 | 8/2003 | Breton et al. | |
| 2004/0017313 A1 | 1/2004 | Menache | |
| 2004/0072091 A1 | 4/2004 | Mochizuki et al. | |
| 2004/0104935 A1 | 6/2004 | Williamson et al. | |
| 2004/0119716 A1 | 6/2004 | Park et al. | |
| 2004/0155962 A1 | 8/2004 | Marks | |
| 2005/0040085 A1 | 2/2005 | Carman et al. | |
| 2005/0057569 A1 * | 3/2005 | Berger | G06K 9/00315 345/473 |

(56) References Cited

U.S. PATENT DOCUMENTS

| | | | |
|---|---|---|---|
| 2005/0071306 A1* | 3/2005 | Kruszewski | G06T 13/40 706/47 |
| 2005/0083333 A1* | 4/2005 | Gordon | G06K 9/00255 345/475 |
| 2005/0104543 A1 | 5/2005 | Kazanov et al. | |
| 2005/0105772 A1 | 5/2005 | Voronka et al. | |
| 2005/0114073 A1 | 5/2005 | Gobush | |
| 2005/0143183 A1 | 6/2005 | Shirai et al. | |
| 2005/0161118 A1 | 7/2005 | Carman et al. | |
| 2005/0168578 A1 | 8/2005 | Gobush | |
| 2005/0174771 A1 | 8/2005 | Conner | |
| 2005/0215336 A1 | 9/2005 | Ueda et al. | |
| 2005/0215337 A1 | 9/2005 | Shirai et al. | |
| 2006/0055699 A1* | 3/2006 | Perlman | G06T 17/10 345/473 |
| 2006/0055706 A1 | 3/2006 | Perlman et al. | |
| 2006/0061680 A1 | 3/2006 | Madhavan et al. | |
| 2006/0077258 A1 | 4/2006 | Allen et al. | |
| 2006/0127836 A1 | 6/2006 | Wen | |
| 2006/0146142 A1 | 7/2006 | Arisawa et al. | |
| 2006/0192785 A1 | 8/2006 | Marschner et al. | |
| 2006/0203096 A1 | 9/2006 | Lasalle et al. | |
| 2007/0024946 A1 | 2/2007 | Panasyuk et al. | |
| 2007/0058839 A1 | 3/2007 | Echegaray et al. | |
| 2007/0060410 A1 | 3/2007 | Gobush | |
| 2007/0091085 A1 | 4/2007 | Wang et al. | |
| 2007/0091178 A1 | 4/2007 | Cotter et al. | |
| 2007/0200930 A1 | 8/2007 | Gordon | |
| 2007/0206832 A1 | 9/2007 | Gordon et al. | |
| 2007/0273951 A1 | 11/2007 | Ribi | |
| 2007/0279494 A1 | 12/2007 | Aman et al. | |
| 2007/0285559 A1 | 12/2007 | Perlman et al. | |
| 2008/0100622 A1 | 5/2008 | Gordon | |
| 2009/0125312 A1* | 5/2009 | Hwang | G10L 21/06 704/276 |
| 2010/0002934 A1 | 1/2010 | Sullivan et al. | |

FOREIGN PATENT DOCUMENTS

| | | |
|---|---|---|
| CA | 2764447 A1 | 12/2010 |
| EP | 1775937 A2 | 4/2007 |
| JP | 10-005229 A | 1/1998 |
| WO | 99/55220 A1 | 11/1999 |
| WO | 2006/011153 A2 | 2/2006 |

OTHER PUBLICATIONS

Kadir et al., "Saliency, Scale and Image Description", International Journal of Computer Vision, 2001, 45 pages.

Kobbelt et al., "Multiresolution Hierarchies on Unstructured Triangle Meshes", Computer Graphics Group, 1999, 10 pages.

Koch et al., "Simulating Facial Surgery Using Finite Element Models", Proceedings of the 23rd annual conference on Computer graphics and interactive techniques, Aug. 1996, 8 pages.

Kraevoy et al., "Cross-Parameterization and Compatible Remeshing of 3D Models", University of British Columbia, 2004, 9 pages.

Kry et al., "EigenSkin: Real Time Large Deformation Character Skinning in Hardware", In ACM SIGGRAPH Symposium on Computer Animation, 2002, 7 pages.

Kshirsagar et al., "Visyllable Based Speech Animation", Eurographics, vol. 22, No. 3, 2003, pp. 631-639.

Kurihara et al., "Modeling Deformable Human Hands from Medical Images", Eurographics/ACM SIGGRAPH Symposium on Computer Animation, 2004, 9 pages.

Lanir, Y., "Skin Mechanics", Handbook of Bioengineering, Chapter 11, 1987, pp. 11.1-11.21 and 11.24-11.25.

Levy et al., "Least Squares Conformal Maps for Automatic Texture Atlas Generation", ACM Transactions on Graphics, 2002, 10 pages.

Lewis et al., "Algorithms for Performance-Driven Animation", Retargeting, SIGGRAPH, 2005, 69 pages.

Lewis et al., "Performance Driven Facial Animation Course Notes Example: Motion Retargeting", SIGGPARH, 2006, 5 pages.

Lewis et al., "Pose Space Deformation: A Unified Approach to Shape Interpolation and Skeleton-Driven Deformation", Proceedings of the 27th annual conference on Computer graphics and interactive techniques, 2000, 8 pages.

Lewis et al., "Reducing Blendshape Interference by Selected Motion Attenuation", ACM SIGGRAPH Symposium on Interactive 3D Graphcis and Games, 2005, 5 pages.

Li et al., "3-D Motion Estimation in Model-Based Facial Image Coding", IEEE Transactions on Pattern Analysis and Machine Intelligence, vol. 15, No. 6, Jun. 1993, pp. 545-555.

Lin et al., "Mirror MoCap: Automatic and efficient capture of dense 3D facial motion parameters from video", Visual Computer, 2005, 18 pages.

Lowe et al., "Distinctive Image Features from Scale-Invariant Keypoints", Computer Science Department University of British Columbia Vancouver, B.C., 2004, 28 pages.

Lucas et al., "An iterative Image Registration Technique with an Application to Stereo vision", Proceedings DARPA Image Understanding Workshop, Apr. 1981, pp. 674-679.

Matthews et al., "Active Appearance Models Revisited", CMU-RI-TR-03-02 the Robotics Institute Carnegie Mellon University, 2004, 37 pages.

Motionanalysis "Eagle Digital System", Available Online at <www.motionanalysis.com/applications/animation/games/eaglesystem.html>, printed on Feb. 25, 2005, 4 pages.

Motionanalysis, "Falcon Analog System," Available Online at <www.motionanaylsis.com/applications/animation/games/falconsystem.html>, 2005, 4 pages.

Motionanalysis, "Hawk Digital System", Available Online at <www.motionanalysis.com/applications/animation/games/hawksytem.html>, printed on Feb. 25, 2005 4 pages.

Motionanalysis, "The Motion Capture Leader, The Undisputed Leader for 3D Optical Motion Capture System," Available Online at <www.motionanaylsis.com/>, 2005, 1 page.

Motionanalysis, "Video Game Products, Products," Available Online at <www.motionanalysis.com/applications/animation/games/products.html>, 2005, 1 page.

Muller et al., "Visualization of Implicit Surfaces Using Adaptive Tetrahedrizations," IEEE Scientific Visualization Conference, Dagstuhl, Germany, Jun. 1997, pp. 243-250.

Nehab et al., "Efficiently Combining Positions and Normals for Precise 3D Geometry", SIGGRAPH '05: ACM SIGGRAPH Papers, 2005, 8 pages.

Noh et al., "A Survey of Facial Modeling and Animation Techniques", A Survey of Facial Modeling and Animation Techniques, Technical Report, 1999, 26 pages.

Noh et al., "Expression Cloning", ACM SIGGRAPH, 2001, Aug. 2001, 12 pages.

Non-Final Office Action, U.S. Appl. No. 10/942,413, dated Aug. 10, 2006, 22 pages.

Non-Final Office Action, U.S. Appl. No. 10/942,413, dated Jul. 6, 2011, 32 pages.

Non-Final Office Action, U.S. Appl. No. 10/942,413, dated Mar. 17, 2010, 37 pages.

Non-Final Office Action, U.S. Appl. No. 10/942,413, dated Nov. 28, 2008, 31 pages.

Non-Final Office Action, U.S. Appl. No. 10/942,413, dated Oct. 14, 2010, 30 pages.

Non-Final Office Action, U.S. Appl. No. 10/942,413, dated Sep. 28, 2007, 19 pages.

Non-Final Office Action, U.S. Appl. No. 10/942,609, dated Jan. 5, 2010, 12 pages.

Non-Final Office Action, U.S. Appl. No. 10/942,609, dated Sep. 14, 2011, 11 pages.

Non-Final Office Action, U.S. Appl. No. 11/066,954, dated Jul. 28, 2008, 36 pages.

Non-Final Office Action, U.S. Appl. No. 11/077,628, dated May 27, 2008, 34 pages.

Non-Final Office Action, U.S. Appl. No. 11/255,854, dated Feb. 23, 2009, 14 pages.

Non-Final Office Action, U.S. Appl. No. 11/255,854, dated Jan. 20, 2011, 19 pages.

(56) References Cited

OTHER PUBLICATIONS

Non-Final Office Action, U.S. Appl. No. 11/255,854, dated Oct. 20, 2011, 18 pages.
Non-Final Office Action, U.S. Appl. No. 11/449,043, dated May 27, 2008, 12 pages.
Non-Final Office Action, U.S. Appl. No. 11/449,127, dated Oct. 29, 2008, 11 pages.
Non-Final Office Action, U.S. Appl. No. 11/888,377, dated Apr. 12, 2011, 26 pages.
Non-Final Office Action, U.S. Appl. No. 11/888,377, dated Aug. 25, 2010, 23 pages.
Non-Final Office Action, U.S. Appl. No. 12/455,771, dated May 22, 2012, 24 pages.
Non-Final Office Action, U.S. Appl. No. 14/187,759, dated Jan. 11, 2017, 7 pages.
Non-Final Office Action, U.S. Appl. No. 14/187,759, dated Mar. 9, 2016, 16 pages.
Non-Final Office Action, U.S. Appl. No. 14/754,651, dated Jun. 16, 2017, 10 pages.
Non-Final Office Action, U.S. Appl. No. 14/754,651, dated Mar. 15, 2016, 23 pages.
Examiner's Report, CA App. No. 2659572, dated Jul. 29, 2015, 3 pages.
Examiner's Report, IN App. No. IN700/CHENP/2009, dated Jul. 12, 2016, 9 pages.
Extended European Search Report, EP App. No. 07836403, dated Jun. 18, 2010, 12 pages.
Extended European Search Report, EP App. No. 07836409, dated Jun. 18, 2010, 12 pages.
Extended European Search Report, EP App. No. 10784126.4, dated Nov. 13, 2012, 6 pages.
Extended European Search Report, EP App. No. 12168363.5, dated Jun. 22, 2012, 4 pages.
Ezzat et al., "Trainable Videorealistic Speech Animation", ACM Transactions on Graphics, 2002, 11 pages.
Final Office Action, U.S. Appl. No. 10/942,609, dated Aug. 18, 2009, 10 pages.
Final Office Action, U.S. Appl. No. 10/942,413, dated Jul. 7, 2009, 25 pages.
Final Office Action, U.S. Appl. No. 10/942,413, dated Jun. 11, 2008, 26 pages.
Final Office Action, U.S. Appl. No. 10/942,413, dated Mar. 1, 2007, 19 pages.
Final Office Action, U.S. Appl. No. 10/942,609, dated Jul. 17, 2012, 10 pages.
Final Office Action, U.S. Appl. No. 10/942,609, dated Jun. 22, 2010, 14 pages.
Final Office Action, U.S. Appl. No. 11/066,954, dated Jan. 16, 2009, 12 pages.
Final Office Action, U.S. Appl. No. 11/077,628, dated Feb. 13, 2009, 9 pages.
Final Office Action, U.S. Appl. No. 11/255,854, dated Aug. 23, 2012, 22 pages.
Final Office Action, U.S. Appl. No. 11/255,854, dated Mar. 19, 2010, 16 pages.
Final Office Action, U.S. Appl. No. 11/449,043, dated Jan. 5, 2009, 16 pages.
Final Office Action, U.S. Appl. No. 11/449,131, dated Jun. 10, 2009, 10 pages.
Final Office Action, U.S. Appl. No. 14/754,651, dated Sep. 9, 2016, 17 pages.
First Examination Report, IN App. No. 1528/DELNP/2007, dated Sep. 29, 2015, 3 pages.
First Examination Report, NZ App. No. 574599, dated Jul. 8, 2010, 2 pages.
First Examination Report, NZ App. No. 597473, dated Jan. 11, 2012, 2 pages.
First Examiner's Report, AU App. No. AU2010256510, dated Aug. 10, 2015, 3 pages.
First Office Action, EP App. No. 10784126.4, dated Dec. 17, 2015, 7 pages.
First Office Action, JP App.No. 2008-500696, dated Jul. 26, 2010, 4 pages.
Fordham, Joe, "Middle-earth Strikes Back", Cinefex 92, 2003, pp. 71-142.
Fourth Office Action, CN App. No. 200780035753, dated Jan. 29, 2012, 10 pages.
Frauenfelder M., "G-Cluster Makes Games to Go," The Feature: It's All About the Mobile Internet, http://www.thefeaturearchives.com/13267.html, 2001, 3 pages.
Graham "The Power of Texture: A New Approach for Surface Capture of the Human Hand", Carnegie Mellon University Computer Science Department, Apr. 30, 2004, pp. 1-23.
Guenter et al., "Making Faces", International Conference on Computer Graphics and Interactive Techniques, Proceedings of the 25th Annual Conference on Computer Graphics and Interactive Techniques, 1998, 12 pages.
Guodong et al., "Human Motion Estimation from a Reduced Marker Set," Proceedings of the 2006 Symposium on Interactive 3D Graphics and Games (I3D '06), 2006, pp. 35-42.
Guskov et al., "Direct Pattern Tracking on Flexible Geometry", Winter School of Computer Graphics, University of Michigan, 2002, 6 pages.
Guskov et al., "Trackable Surfaces," Eurographics/SIGGRAPH Symposium on Computer Animation, 2003, pp. 251-257.
Hasenfratz et al., "Real-Time Capture Reconstruction and Insertion Into Virtual World of Human Actions," In Vision, Video and Graphic, Eurographics, 2003, 8 pages.
Hyneman et al., "Human face project", SIGGRAPH Course #9, Jul. 2005, 19 pages.
Igarashi et al., "The Appearance of Human Skin", Technical Report: CUCS-024-05, Department of Computer Science, Jun. 2005, 88 pages.
International Preliminary Report on Patentability for Application No. PCT/US2006/006151, dated Apr. 28, 2011, 6 pages.
International Preliminary Report on Patentability for Application No. PCT/US2007/13468, dated Dec. 10, 2008, 7 pages.
International Preliminary Report on Patentability for Application No. PCT/US2010/037318, dated Dec. 15, 2011, 6 pages.
International Preliminary Report on Patentability from Application No. PCT/US2006/039093, dated Apr. 9, 2008, 7 pages.
International Preliminary Report on Patentability, PCT App. No. PCT/US05/32418, dated Mar. 5, 2009, 9 pages.
International Preliminary Report on Patentability, PCT App. No. PCT/US2005/34524, dated Nov. 23, 2007, 5 pages.
International Search Report and Written Opinion for Application No. PCT/US2005/34524, dated Oct. 11, 2007, 8 pages.
International Search Report and Written Opinion for Application No. PCT/US2006/039093, dated May 11, 2007, 4 pages.
International Search Report and Written Opinion for Application No. PCT/US2007/017188, dated Jul. 11, 2008, 9 pages.
International Search Report and Written Opinion for Application No. PCT/US2007/13468, dated Apr. 22, 2008, 9 pages.
International Search Report and Written Opinion for Application No. PCT/US2010/37318, dated Aug. 17, 2010, 8 pages.
International Search Report and Written Opinion for PCT Application No. PCT/US05/32418, dated Feb. 19, 2008, 16 pages.
International Search Report and Written Opinion for PCT Application No. PCT/US06/06151, dated Aug. 25, 2008, 4 pages.
Non-Final Office Action, U.S. Appl. No. 16/792,116, dated Jun. 1, 2020, 10 pages.
Non-Final Office Action, U.S. Appl. No. 17/087,503, dated Dec. 24, 2020, 6 pages.
Notice of Allowance from U.S. Appl. No. 11/007,628, dated May 15, 2009, 9 pgs.
Notice of Allowance, CA App. No. 2519737, dated Jan. 19, 2017, 1 page.
Notice of Allowance, CA App. No. 2657309, dated Dec. 4, 2017, 1 page.
Notice of Allowance, CA App. No. 2659572, dated Jun. 7, 2016, 1 page.

(56) References Cited

OTHER PUBLICATIONS

Notice of Allowance, CA App. No. 2933547, dated Apr. 1, 2020, 1 page.
Notice of Allowance, U.S. Appl. No. 17/087,503, dated Jan. 28, 2021, 10 pages.
Notice of Allowance, U.S. Appl. No. 10/942,413, dated Feb. 3, 2012, 8 pages.
Notice of Allowance, U.S. Appl. No. 11/066,954, dated Sep. 9, 2009, 8 pages.
Notice of Allowance, U.S. Appl. No. 11/077,628, dated Jul. 14, 2009, 6 pages.
Notice of Allowance, U.S. Appl. No. 11/077,628, dated May 15, 2009, 9 pages.
Notice of Allowance, U.S. Appl. No. 11/255,854, dated Mar. 29, 2013, 15 pages.
Notice of Allowance, U.S. Appl. No. 11/255,854, dated May 9, 2013, 12 pages.
Notice of Allowance, U.S. Appl. No. 11/255,854, dated Oct. 17, 2013, 9 pages.
Notice of Allowance, U.S. Appl. No. 11/449,043, dated Apr. 30, 2009, 15 pages.
Notice of Allowance, U.S. Appl. No. 11/449,127, dated Apr. 17, 2009, 10 pages.
Notice of Allowance, U.S. Appl. No. 11/449,131, dated Sep. 29, 2008, 14 pages.
Notice of Allowance, U.S. Appl. No. 11/888,377, dated Nov. 17, 2011, 14 pages.
Notice of Allowance, U.S. Appl. No. 14/187,759, dated Aug. 12, 2016, 9 pages.
Notice of Allowance, U.S. Appl. No. 14/187,759, dated Dec. 24, 2014, 13 pages.
Notice of Allowance, U.S. Appl. No. 14/187,759, dated Jan. 19, 2018, 33 pages.
Notice of Allowance, U.S. Appl. No. 14/187,759, dated Jun. 23, 2015, 16 pages.
Notice of Allowance, U.S. Appl. No. 14/187,759, dated Nov. 7, 2017, 9 pages.
Notice of Allowance, U.S. Appl. No. 14/754,651, dated Sep. 21, 2017, 15 pages.
Notice of Allowance, U.S. Appl. No. 15/713,601, dated Jan. 28, 2020, 10 pages.
Notice of Allowance, U.S. Appl. No. 16/792,116, dated Sep. 8, 2020, 9 pages.
Notification Concerning Transmittal of International Preliminary Report on Patentability and Written Opinion, PCT App. No. PCT/US2007/017188, dated Feb. 12, 2009, 9 pages.
Office Action and Search Report, CA App. No. 2933547, dated Oct. 22, 2018, 3 pages.
Office Action, CA App. No. 2764447, dated May 14, 2018, 4 pages.
Office Action, CA App. No. 2764447, dated May 15, 2017, 4 pages.
Office Action, CA App. No. 2933547, dated Sep. 23, 2019, 4 pages.
Office Action, CA App. No. 2973956, dated May 14, 2018, 4 pages.
Office Action, CA App. No. 2973956, dated Apr. 22, 2020, 5 pages.
Office Action, CN App. No. 200580030846.9, dated May 25, 2010, 9 pages.
Office Action, EP App. No. 07836403.1, dated Jun. 1, 2011, 4 pages.
Office Action, U.S. Appl. No. 10/942,609, dated Aug. 7, 2008, 10 pages.
Office Action, U.S. Appl. No. 11/449,131, dated Dec. 29, 2008, 12 pages.
Pantic et al., "Expert system for automatic analysis of facial expressions", Image and Vision Computing, vol. 18, Aug. 2000, pp. 881-905.
Parke, F., "Computer Generated Animation of Faces", SIGGRAPH 1972, 1972, pp. 451-457.
Parke, Frederick, "A Parametric Model for Human Faces", Department of Computer Science, Dec. 1974, 111 pages.
Partial European Search Report, EP App. No. 06121767, dated Oct. 12, 2011, 5 pages.

Pighin et al., "Digital Face Cloning Introduction", Siggraph 2005 course notes, 2005, 6 pages.
Pighin et al., "Resynthesizing Facial Animation through 3D Model-Based Tracking", Proceedings of the Seventh IEEE International Conference on Computer Vision, 1999, 8 pages.
Pighin et al., "Synthesizing Realistic Facial Expressions from Photographs", DBLP, Jan. 1998, 10 pages.
U.S. Appl. No. 60/711,923, filed Aug. 26, 2005, 4 pages.
Pyun et al., "An Example-Based Approach for Facial Expression Cloning", Eurographics/SIGGRAPH Symposium on Computer Animation, 2003, 10 pages.
Radovan et al., "Facial animation in a nutshell: past, present and future", Proceedings of the 2006 annual research conference of the South African institute of computer scientists and information technologists on IT research in developing countries, Oct. 9-11, 2006, pp. 71-79.
Random, Define Random at Dictionary.com downloaded from http://dictionary.reference.com/browse/random on Aug. 18, 2017, 5 pages.
Reason for Refusal, JP App. No. 2008-500696, dated Jul. 26, 2010, 2 pages.
Requirement for Restriction/Election, U.S. Appl. No. 11/255,854, dated Nov. 16, 2009, 6 pages.
Robert et al, "Dense Depth Map Reconstruction: A Minimization and Regularization Approach which Preserves Discontinuities", Proceedings of the 4th European Conference on Computer Vision, 1996, 13 pages.
Scharstein et al., "A Taxonomy and Evaluation of Dense Two-Frame Stereo Correspondence Algorithms", Apr. 2002, 35 pages.
Scharstein et al., "Stereo Matching with Non-Linear Diffusion", In IEEE Computer Society Conference on Computer Vision and Pattern Recognition (CVPR' 96), Jun. 1996, pp. 343-350.
Scott, R., "Sparking Life Notes on the Performance Capture Sessions for the Lord of the Rings: The Two Towers", ACM SIGGRAPH, vol. 37, No. 4, Nov. 2003, pp. 17-21.
Shewchuk, Jonathan Richard, "Triangle: Engineering a 2D Quality Mesh Generator and Delaunay Triangulator", WACG, 1996, 10 pages.
Sifakis et al., "Automatic Determination of Facial Muscle Activations from Sparse Motion Capture Marker Data", ACM Transactions on Graphics, Jul. 2005, 9 pages.
Simmons K. P., "Body Measurement Techniques: A Comparison of Three-Dimensional Body Scanning and Physical Anthropometric Methods," College of Textiles, North Carolina State University, Raleigh, North Carolina, Jan. 12, 2001, 76 pages.
Sundaresan et al., "Multi-Camera Tracking of Articulated Human Motion using Motion and Shape Cures," ACC\2006, Springer eds., Heidelberg, Jan. 13-16, 2006, vol. 3852, pp. 131-140.
Svoboda et al., "A Convenient Multicamera Self-Calibration for Virtual Environments", Massachusetts Institute of Technology, vol. 14, No. 4, Aug. 2005, pp. 407-422.
Terzopoulos, "Analysis and Synthesis of Facial Image Sequences Using Physical and Anatomical Models", IEEE Transactions on Pattern Analysis and Machine Intelligence, vol. 15, No. 6, Jun. 1993, pp. 569-579.
Teukolsky S. A., "Numerical Recipes in C: The Art of Scientific Computing", Cambridge University Press, 1992, 949 pages.
Thalmann et al., "A Computational Skin Model: Fold and Wrinkle Formation", IEEE Transactions on Information Technology in Biomedicine, vol. 6, No. 4, Dec. 2002, 7 pages.
Thalmann et al., "Joint-Dependent Local Deformations for Hand Animation and Object Grasping", In Proceedings on Graphics Interface, 1988, 12 pages.
Torralba et al., "Properties and Applications of Shape Recipes", massachusetts institute of technology—artificial intelligence laboratory, 2002, 10 pages.
Venkataraman et al., "A Kinematic-Variational Model for Animating Skin with Wrinkles", Computers & Graphics 29, Technical section, 2005, pp. 756-770.
Vicon, "Vicon Motion Systems // MX13, MX13 Camera, The MX13 1.3 Million-pixel Motion Capture Camera", www.vicon.com/jsp/products/prdouct-detail.jsp?id=170, Feb. 25, 2005, 2 pages.

(56) References Cited

OTHER PUBLICATIONS

Vicon, "Vicon Motion Systems // MX3, MX3 Camera, The MX3 0.3 Million-pixel Motion Capture Camera", www.vicon.com/jsp/products/product-detail.jsp?id=173, Feb. 25, 2005, 2 pages.
Vicon, "Vicon Motion Systems // MX40, MX40 Camera, The MX40 4 Million-pixel Motion Capture Camera", www.vicon.com/jsp/products/product-detail.jsp?id=167, printed on Feb. 25, 2005, 2 page.
Vicon, "Vicon motion Systems// SV Cam", www.vicon.com/jsp/products/product-detail.jspid+189, 2005, 1 page.
Vicon, "Vicon Systems Ltd.", www.vicon.com/jsp/index.jsp, Feb. 25, 2005, 2 pages.
Vicon-Products, "Vicon MX: System Overview", www.vicon.com/jsp/products/product-overview.jsp, Feb. 25, 2005, 2 pages.
Vicon-Products., "MX System: Cameras, The Most Powerful, Practical and Versatile Range of Motion Capture Cameras," 2005, pp. 1, www.vicon.com/jsp/products/product-category.jspcat=cameras.
Video Clips entitled Cam4Take2comp and 070306-Resolution Comparison-H264-small-no audio on a DVD, 2009.
Viinendaaru V. H., "Image Information Processing Method System and Program Utilizing the Method," Patent Abstracts of Japan, Pub. No. 2003-106812, filed on Jun. 21, 2002, (Apr. 9, 2003).
Vlasic et al., "Face Transfer with Multilinear Models", ACM Transactions on Graphics, Jul. 2005, 8 pages.
Wang et al., "Assembling an Expressive Facial Animation System", ACM Siggraph Video Game Symposium, Proceedings of the 2007 ACM Siggraph symposium on Video games, pp. 21-26, 2007.
Wang et al., "High Resolution Acquisition, Learning and Transfer of Dynamic 3-D Facial Expressions", EUROGRAPHICS 2004/M.P., vol. 23, No. 3, 2004, 10 pages.
Waters, Keith, "A Muscle Model for Animating Three-Dimensional Facial Expression", ACM, Computer Graphics, vol. 21, No. 4, Jul. 1987, pp. 17-24.
Wenger et al., "Performance Relighting and Reflectance Transformation with Time-Multiplexed Illumination", ACM Transactions on Graphics, 2005, 9 pages.
Wheeler M. D., "Automatic Modeling and Localization for Object Recognition," Available Online at <http://citeseerx.ist.psu.edu/viewdoc/download?doi=10.1.1.71.3802&rep=rep1&type=pdf>, 1996, 243 pages.
Williams et al., "Performance-Driven Facial Animation", Computer Graphics, vol. 24, No. 4, Aug. 1990, 8 pages.
Wu et al., "Simulation of Static and Dynamic Wrinkles of Skin", MIRALab, 1998, 12 pages.
Zhang et al., "Spacetime Faces: High Resolution Capture for Modeling and Animation", University of Washington, 2004, 11 pages.
Zhang et al., "Realistic and Efficient Wrinkle Simulation Using an Anatomy-based Face Model with Adaptive Refinement", Computer Graphics International, 2005, 8 pages.
Abandonment from U.S. Appl. No. 10/942,609, dated Feb. 13, 2013, 2 pages.
Abandonment from U.S. Appl. No. 12/455,771, dated Dec. 3, 2012, 2 pages.
Advisory Action from U.S. Appl. No. 10/942,609, dated Oct. 13, 2009, 2 pages.
Allen et al., "Articulated Body Deformation from Range Scan Data," ACM Transactions on Graphics (TOG), vol. 21, No. 3, 2002, pp. 612-619.
Anguelov et al., "SCAPE; Shape Completion and Animation of People," ACM Transactions on Graphics, 2005, vol. 24, No. 3, pp. 408-416.
Arun et al., "Least-Squares Fitting of Two 3-D Point Sets", IEEE Transactions on Pattern Analysis and Machine Intelligence, vol. 9, No, 5, Sep. 1987, 3 pages.
Bando et al., "A Simple Method for Modeling Wrinkles on Human Skin", IEEE Xplore, 2002, 10 pages.
Bascle et al., "Separability of Pose and Expression in Facial Tracking and Animation", IEEE Computer Society, Proceedings of the Sixth International Conference on Computer Vision, 1998, pp. 323-328.
Bennett et al., "Digital Face Cloning", SIGGRAPH, 2005, 18 pages.
Besl et al., "A Method for Registration of 3-D Shapes", IEEE Transactions on Pattern Analysis and Machine Intelligence, vol. 14, No. 2, Feb. 1992, pp. 239-256.
Black et al., "Tracking and Recognizing Rigid and Non-Rigid Facial Motions Using Local Parametric Models of Image Motion", IEEE, 1995, pp. 374-381.
Blanz et al., "Reanimating Faces in Images and Video", Eurographics 2003 / P. Brunet and D. Fellner, vol. 22, No. 3, 2003, 10 pages.
Blanz et al., "A Morphable Model for the Synthesis of 3D Faces", Proceedings of the 26th Annual Conference on Computer Graphics and Interactive Techniques, 1999, 8 pages.
Borshukov et al., "Realistic Human Face Rendering for "The Matrix Reloaded"", ESC Entertainment, 2003, 1 page.
Borshukov et al., "Universal Capture—Image-based Facial Animation for "The Matrix Reloaded"", ESC Entertainment, 2003, 1 page.
Botsch et al., "An Intuitive Framework for Real-Time Freeform Modeling", Computer Graphics Group RWTH Aachen University, 2004, 5 pages.
Botsch et al., "Real-Time Shape Editing using Radial Basis Functions", Computer Graphics Group, vol. 24, No. 3, 2005, 11 pages.
Bouguet, Jean-Yves, "Pyramidal Implementation of the Lucas Kanade Feature Tracker Description of the algorithm", Intel Corporation, Microprocessor Research Labs, 1999, pp. 1-9.
Bourke, P., "Cross Correlation" Auto Correlation-2D Pattern Identification, Aug. 1996, Available Online at<http://astronomy.swin.edu.aU/.about.pbourke/other/correlat/>, printed on Oct. 19, 2005.
Brand, Matthew, "Voice Puppetry", ACM, 1999, 8 pages.
Bregler et al., "Twist Based Acquisition and Tracking of Animal and Human Kinematics", International Journal of Computer Vision, vol. 56, No. 3, 2004, pp. 179-194.
Bregler et al., "Video Rewrite: Driving Visual Speech with Audio", ACM SIGGRAPH, 1997, pp. 1-8.
Bridson et al., "Simulation of Clothing with Folds and Wrinkles", Eurographics/SIGGRAPH Symposium on Computer Animation, 2003, 10 pages.
Brox et al., "High Accuracy Optical Flow Estimation Based on a Theory for Warping", Mathematical Image Analysis Group Faculty of Mathematics and Computer Science, vol. 4, 2004,12 pages.
Buck et al., "Performance-Driven Hand-Drawn Animation", DBLP, 2000, 8 pages.
Cao et al., "Real-time Speech Motion Synthesis from Recorded Motions", Eurographics/ACM SIGGRAPH Symposium on Computer Animation, 2004, 10 pages.
Carr et al., "Reconstruction and Representation of 3D Objects with Radial Basis Functions", Proceedings of the 28th annual conference on Computer graphics and interactive techniques, 2001, 10 pages.
Celnikera el al., "Deformable Curve and Surface Finite-Elements for Free-Form Shape Design", ACM, Computer Graphics, vol. 25, No. 4, Jul. 1991, 10 pages.
Chai et al., "Vision-based Control of 3D Facial Animation", Eurographics/SlGGRAPH Symposium on Computer Animation, 2003, 15 pages.
Chuang et al., "Performance Driven Facial Animation using Blendshape Interpolation", Computer Science Department, Stanford University, Apr. 2002, 8 pages.
Co-pending U.S. Appl. No. 60/711,905, filed Aug. 26, 2005, 4 pages.
Cole et al., "Accurate automatic visible speech synthesis of arbitrary 3D models based on concatenation of diviseme motion capture data", Computer Animation and Virtual Worlds Comp. Anim. Virtual Worlds, vol. 15, 2014, 17 pages.
Coons S. A., "Surfaces for Computer-Aided Design of Space Forms," MAC-TR-41, Project MAC, Massachusetts Institute of Technology, 1967, 105 pages.
Cootes et al., "Active Appearance Models", IEEE Transactions on Pattern Analysis and Machine Intelligence, vol. 23, No. 6, Jun. 2001, pp. 681-685.

(56) References Cited

OTHER PUBLICATIONS

Curless et al., "A Volumetric Method for Building Complex Models from Range Images," Proceedings of the 23rd Annual Conference on Computer Graphics and Interactive Techniques, 1996, pp. 303-312.

Decarlo et al., "Optical Flow Constraints on Deformable Models With Applications to Face Tracking", Department of Computer & Information Science, Technical Reports (CIS), Jan. 1997, 44 pages.

Decarlo et al., "The Integration of Optical Flow and Deformable Models with Applications to Human Face Shape and Motion Estimation", In Proceedings CVPR '96, 1996, pp. 231-238.

Deng et al., "Synthesizing Speech Animation by Learning Compact Speech Co-Articulation Models", Proceedings of Computer Graphics International, Jun. 2005, 7 pages.

Desbrun et al., "Implicit Fairing of Irregular Meshes using Diffusion and Curvature Flow", SIGGRAPH '99 Proceedings of the 26th Annual Conference on Computer Graphics and Interactive Techniques, 1999, 8 pages.

Essa et al., "Coding, Analysis, Interpretation, and Recognition of Facial Expressions", IEEE Transactions on Pattern Analysis and Machine Intelligence, 1997, pp. 1-9.

Essa et al., "Modeling, Tracking and Interactive Animation of Faces and Heads using Input from Video", Proceedings of Computer Animation '96 Conference, M.I.T Media Laboratory Perceptual Computing Section Technical Report No. 370, Jun. 1996, pp. 1-12.

European Search Report and Search Opinion, EP App. No. 05108358.2, dated Nov. 15, 2006, 6 pages.

European Search Report and Search Opinion, EP App. No. 06121767.5, dated Feb. 28, 2012.

European Search Report and Search Opinion, EP App. No. 07795872.6, dated Mar. 24, 2010, 4 pages.

Examination Report, NZ App. No. 553106, dated Jun. 22, 2009, 2 pages.

Examiner's Report, CA App. No. 2562657, dated Aug. 31, 2015, 3 pages.

Examiner's Report, CA App. No. 2562657, dated May 13, 2014, 4 pages.

Examiner's Report, CA App. No. 2657309, dated Apr. 16, 2015, 4 pages.

Examiner's Report, CA App. No. 2657309, dated Apr. 25, 2016, 4 pages.

Examiner's Report, CA App. No. 2659572, dated Dec. 4, 2014, 5 pages.

* cited by examiner

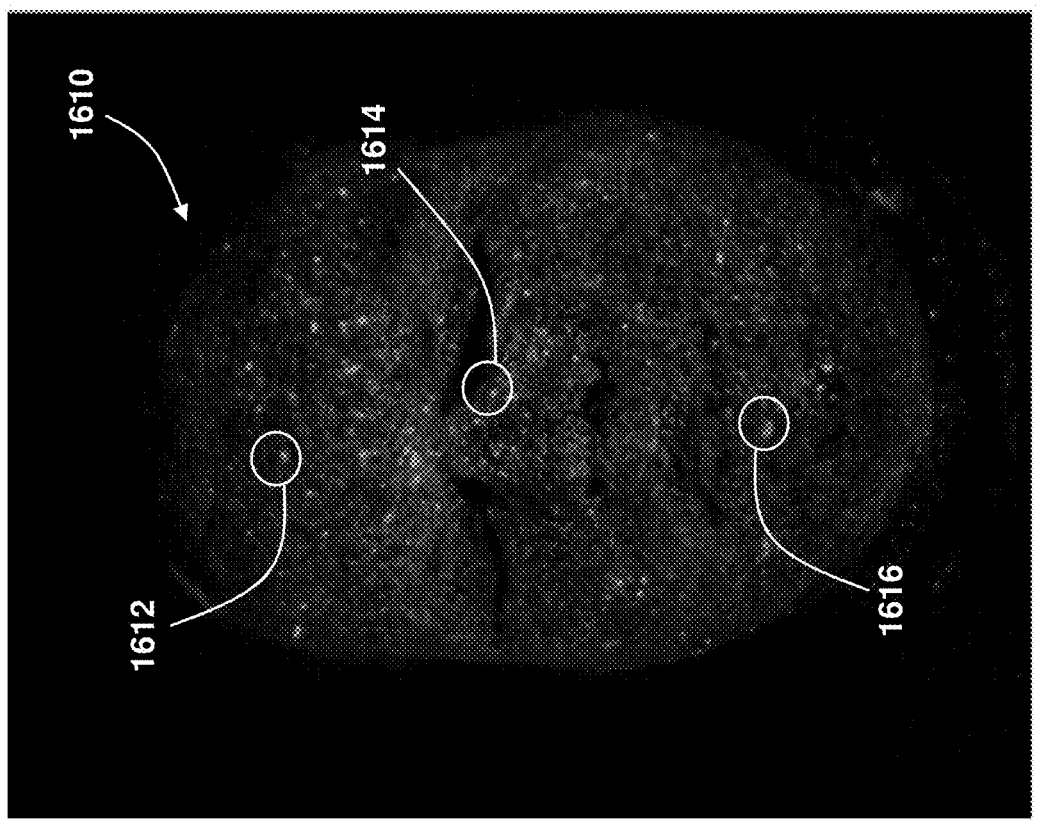
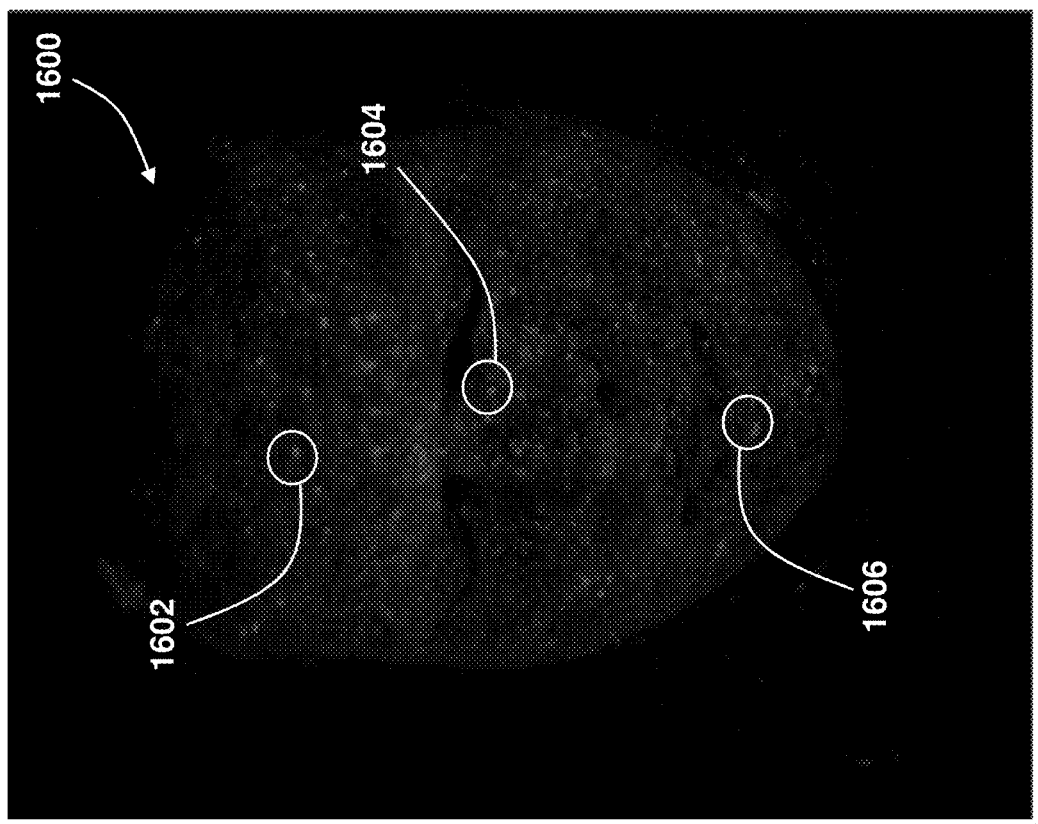
FIG. 16A
FIG. 16B

APPARATUS AND METHOD FOR PERFORMING MOTION CAPTURE USING A RANDOM PATTERN ON CAPTURE SURFACES

CROSS-REFERENCE TO RELATED APPLICATIONS

This application is a continuation of co-pending U.S. patent application Ser. No. 17/087,503, filed on Nov. 2, 2020, which is a continuation of U.S. patent application Ser. No. 16/792,116, filed on Feb. 14, 2020, now U.S. Pat. No. 10,825,226, Issued on Nov. 3, 2020, which is a continuation of U.S. patent application Ser. No. 15/713,601, filed Sep. 22, 2017, now U.S. Pat. No. 10,593,909, Issued on Mar. 17, 2020, which is a continuation of U.S. patent application Ser. No. 14/754,651, filed Jun. 29, 2015, now U.S. Issued U.S. Pat. No. 9,928,633, Issued on Mar. 27, 2018, which is a divisional of U.S. application Ser. No. 14/187,759, filed Feb. 24, 2014, entitled "Apparatus And Method For Performing Motion Capture Using A Random Pattern On Capture Surfaces" now U.S. Issued U.S. Pat. No. 9,996,962, Issued on Jun. 12, 2018, which is a divisional of U.S. application Ser. No. 11/255,854, filed Oct. 20, 2005, entitled, "Apparatus And Method for Performing Motion Capture Using A Random Pattern On Capture Surfaces", now U.S. Issued U.S. Pat. No. 8,659,668, Issued on Feb. 25, 2014, which claims the benefit of U.S. Provisional Application No. 60/724,565 filed Oct. 7, 2005, entitled "Apparatus and Method for Performing Motion Capture Using a Random Pattern On Capture Surfaces", all of which are herein incorporated by reference.

BACKGROUND OF THE INVENTION

Field of the Invention

This invention relates generally to the field of motion capture. More particularly, the invention relates to an improved apparatus and method for performing motion capture using a random pattern of paint applied to a portion of a performer's face, body, clothing, and/or props.

Description of the Related Art

"Motion capture" refers generally to the tracking and recording of human and animal motion. Motion capture systems are used for a variety of applications including, for example, video games and computer-generated movies. In a typical motion capture session, the motion of a "performer" is captured and translated to a computer-generated character.

As illustrated in FIG. 1 in a traditional motion capture system, a plurality of motion tracking "markers" (e.g., markers 101, 102) are attached at various points on a performer's 100's body. The points are typically selected based on the known limitations of human anatomy. Different types of motion capture markers are used for different motion capture systems. For example, in a "magnetic" motion capture system, the motion markers attached to the performer are active coils which generate measurable disruptions x, y, z and yaw, pitch, roll in a magnetic field.

By contrast, in an optical motion capture system, such as that illustrated in FIG. 1, the markers 101, 102 are passive spheres comprised of retroreflective material, i.e., a material which reflects light back in the direction from which it came, ideally over a wide range of angles of incidence. A plurality of cameras 120, 121,122, each with a ring of LEDs 130, 131, 132 around its lens, are positioned to capture the LED light reflected back from the retroreflective markers 101, 102 and other markers on the performer. Ideally, the retroreflected LED light is much brighter than any other light source in the room. Typically, a thresholding function is applied by the cameras 120, 121,122 to reject all light below a specified level of brightness which, ideally, isolates the light reflected off of the reflective markers from any other light in the room and the cameras 120, 121, 122 only capture the light from the markers 101, 102 and other markers on the performer.

A motion tracking unit 150 coupled to the cameras is programmed with the relative position of each of the markers 101, 102 and/or the known limitations of the performer's body. Using this information and the visual data provided from the cameras 120-122, the motion tracking unit 150 generates artificial motion data representing the movement of the performer during the motion capture session.

A graphics processing unit 152 renders an animated representation of the performer on a computer display 160 (or similar display device) using the motion data. For example, the graphics processing unit 152 may apply the captured motion of the performer to different animated characters and/or to include the animated characters in different computer-generated scenes. In one implementation, the motion tracking unit 150 and the graphics processing unit 152 are programmable cards coupled to the bus of a computer (e.g., such as the PCI and AGP buses found in many personal computers). One well known company which produces motion capture systems is Motion Analysis Corporation (see, e.g., www.motionanalysis.com).

One problem which exists with current marker-based motion capture systems is that when the markers move out of range of the cameras, the motion tracking unit 150 may lose track of the markers. For example, if a performer lays down on the floor on his/her stomach (thereby covering a number of markers), moves around on the floor and then stands back up, the motion tracking unit 150 may not be capable of re-identifying all of the markers.

Another problem which exists with current marker-based motion capture systems is that resolution of the image capture is limited to the precision of the pattern of markers. In addition, the time required to apply the markers on to a performer is long and tedious, as the application of the markers must be precise and when a large number of markers are used, for example on a face, in practice, the markers are very small (e.g. on the order of 1-2 mm in diameter). FIGS. 2A and 2B illustrate the tediousness of the process of applying markers to a performer. The positions 202 for the application of the markers 206 must first be created with a makeup pencil 204 or other fine tip marker. Once the pattern has been created, the markers 206 are applied. Because the markers 206 are only 1-2 mm in diameter, the markers 206 must be applied to the positions 202 using tweezers (not shown) and an adhesive 208.

Another problem with current marker-based motion systems is that application of the markers must be kept away from certain areas of the performer, such as the eyes 210 and the lips 212 of a performer, because the markers may impede the free motion of these areas. In addition, secretions (e.g., tears, saliva) and extreme deformations of the skin (e.g., pursing the lips 212) may cause the adhesive 208 to be ineffective in bonding the markers 206 on certain places of the skin. Additionally, during performances with current motion capture systems, markers may fall off or be smudged such that they change position on the performer, thus requiring a halt in the performance capture session (and a waste of crew and equipment resources) to tediously reapply the markers and often recalibrate the system.

Another current approach to accomplishing motion capture is to optically project a pattern or sequence of patterns (typically a grid of lines or other patterns) onto the performer. One or more cameras is then used to capture the resulting deformation of the patterns due to the contours of the performer, and then through subsequent processing a point cloud representative of the surface of the performer is calculated. Eyetronics-3d of Redondo Beach, Calif. is one company that utilizes such an approach for motion capture.

Although projected-pattern motion capture is quite useful for high-resolution surface capture, it suffers from a number of significant limitations in a motion capture production environment. For one, the projected pattern typically is limited to a fairly small area. If the performer moves out of the area of the projection, no capture is possible. Also, the projection is only in focus within a given depth of field, so if the performer moves too close or too far from the projected pattern, the pattern will be blurry and resolution will be lost. Further, if an object obstructs the projection (e.g. if the performer raises an arm and obstructs the projection from reaching the performer's face), then the obstruction region cannot be captured. And finally, as the captured surface deforms through successive frames (e.g. if the performer smiles and the cheek compresses), the motion capture system is not able to track points on the captured surface to see where they moved from frame to frame. It is only able to capture what the new geometry of the surface is after the deformation. Markers can be placed on the surface and can be tracked as the surface deforms, but the tracking will be of no higher resolution than that of the markers. For example, such a system is described in the paper "Spacetime Faces: High Resolution Capture for Modeling and Animation", by Li Zhang, et. al., of University of Washington.

As computer-generated animations becomes more realistic, cloth animation is used increasingly. Cloth simulation is quite complex because so many physical factors impact the simulation. This results in typically very long computation time for cloth simulation and many successive iterations of the simulation until the cloth achieves the look desired for the animation.

There have been a number of prior art efforts to capture cloth (and similar deformable and foldable surfaces) using motion capture techniques. For example, in the paper "Direct Pattern Tracking On Flexible Geometry" by Igor Guskow of University of Michigan, Ann Arbor. et. al, an approach is proposed where a regular grid is drawn on cloth and captured. More sophisticated approaches are described in other papers by Igor Guskow, et. al., such as "Multi-scale Features for Approximate Alignment of Point-based Surfaces", "Extracting Animated Meshes with Adaptive Motion Estimation", and "Non-Replicating Indexing for Out-of-Core Processing of Semi-Regular Triangular Surface Meshes". But none of these approaches are suitable for a motion capture production environment. Issues include production inefficiencies such as complex preparation of a specific geometric pattern on the cloth and capture quality limitations depending on lighting or other environmental issues.

Accordingly, what is needed is an improved apparatus and method for tracking and capturing deformable and foldable surfaces in an efficient production environment.

SUMMARY

A method according to one embodiment of the invention is described comprising: applying a random pattern to specified regions of a performer's face and/or body and/or other deformable surface; tracking the movement of the random pattern during a motion capture session; and generating motion data representing the movement of the performer's face using the tracked movement of the random pattern.

BRIEF DESCRIPTION OF THE DRAWINGS

The patent or application file contains at least one drawing executed in color. Copies of this patent or patent publication with color drawing(s) will be provided by the U.S. Patent and Trademark Office upon request and payment of the necessary fee.

A better understanding of the present invention can be obtained from the following detailed description in conjunction with the drawings, in which:

FIGS. 16A and 16B are the frame captures of FIGS. 9A and 9B mapped to a common coordinate system.

DETAILED DESCRIPTION OF PREFERRED EMBODIMENTS

Described below is an improved apparatus and method for performing motion capture using a random pattern of paint applied to portions of a performer's face and/or body. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

Figure 3:
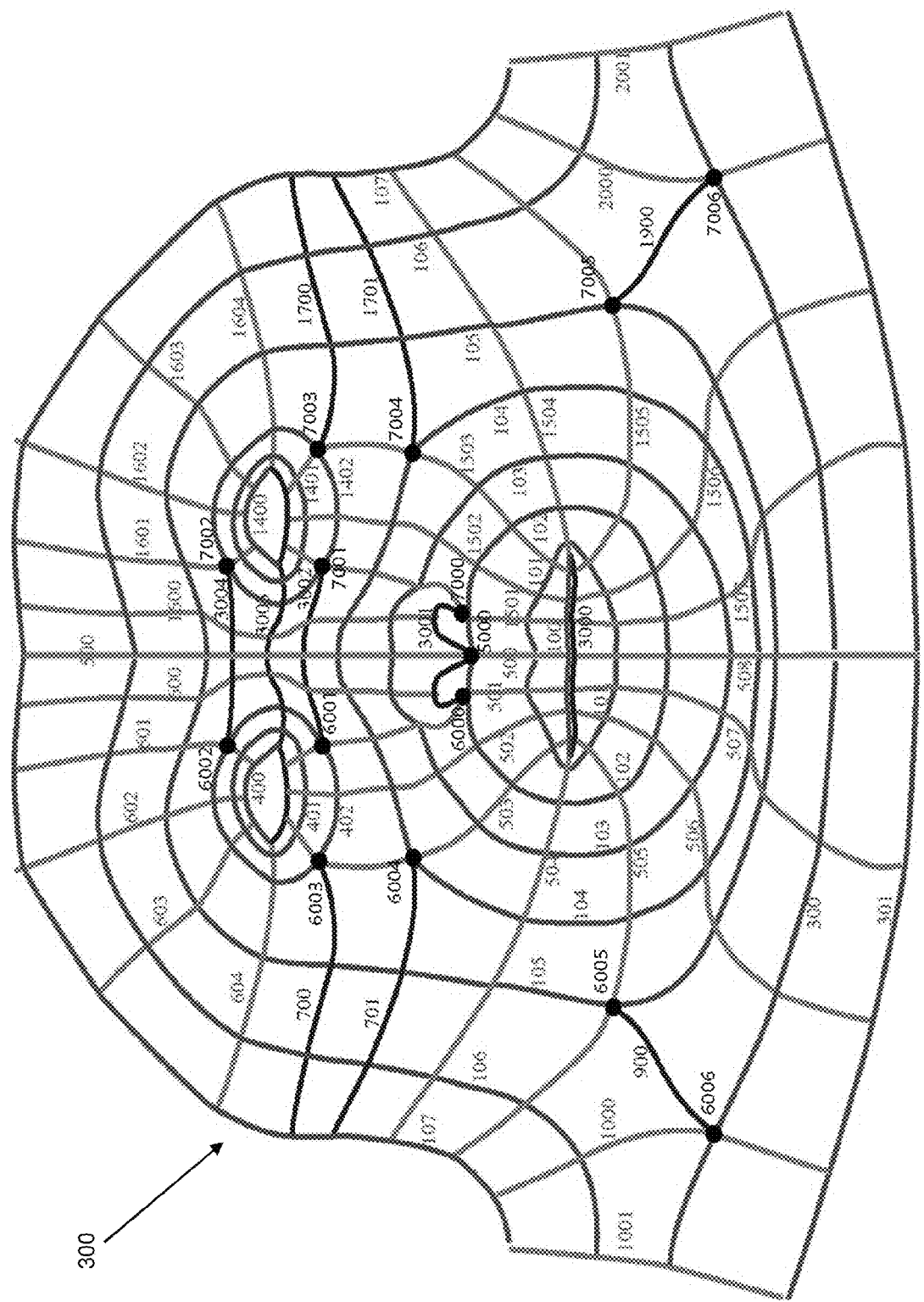
FIG. 3 illustrates a prior art curve pattern, flattened into a 2D image, that replaces the markers of FIG. 1 for use with another motion tracking system.
Figure 4:
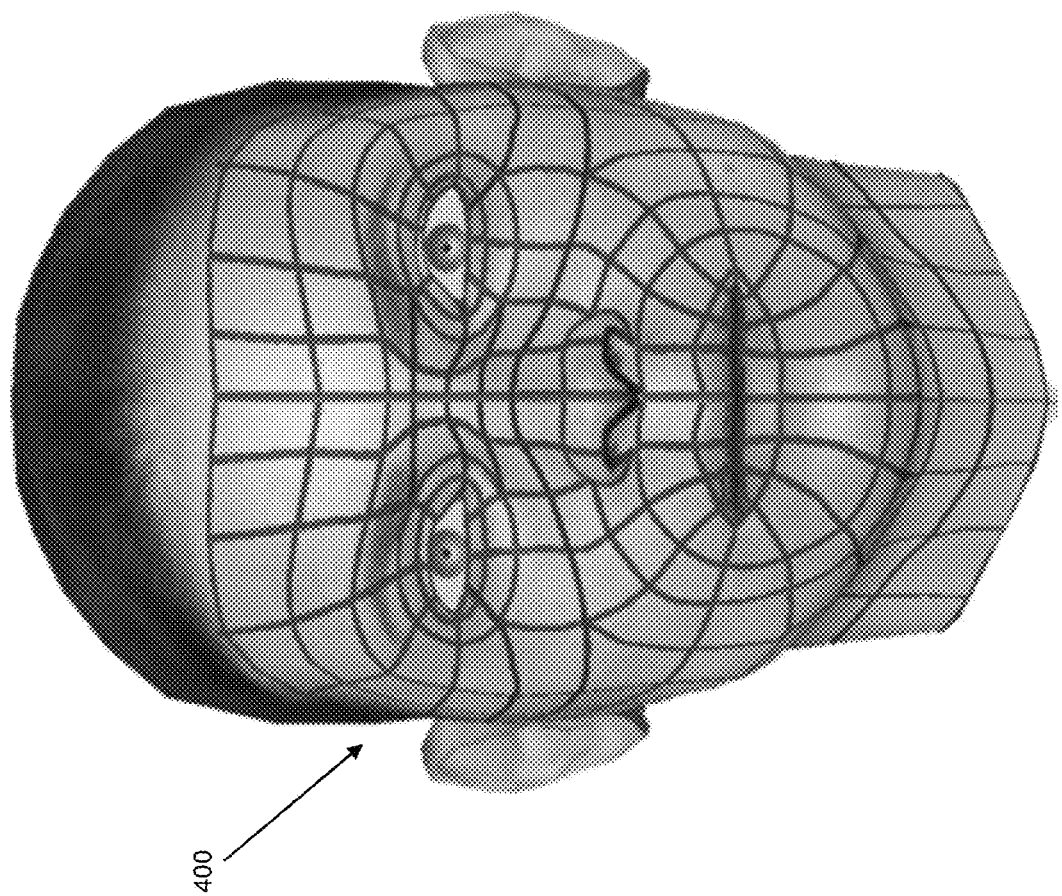
FIG. 4 illustrates a face with the prior art curve pattern of FIG. 3 applied.

The assignee of the present application previously developed a system for performing color-coded motion capture and a system for performing motion capture using a series of reflective curves 300, illustrated generally in FIG. 3 and shown painted on the face of a performer 400 in FIG. 4. These systems are described in the co-pending applications entitled "Apparatus and Method for Capturing the Motion and/or Expression of a Performer," Ser. Nos. 10/942,609, and 10/942,413, Filed Sep. 15, 2004. These applications are assigned to the assignee of the present application and are incorporated herein by reference.

The assignee of the present application also previously developed a system for performing motion capture using shutter synchronization and phosphorescent paint. This system is described in the co-pending application entitled "Apparatus and Method for Performing Motion Capture Using Shutter Synchronization," Ser. No. 11/077,628, Filed Mar. 10, 2005 (hereinafter "Shutter Synchronization" application). Briefly, in the Shutter Synchronization application, the efficiency of the motion capture system is improved by using phosphorescent paint and by precisely controlling synchronization between the motion capture cameras' shutters and the illumination of the painted curves. This application is assigned to the assignee of the present application and is incorporated herein by reference.

Figure 1:
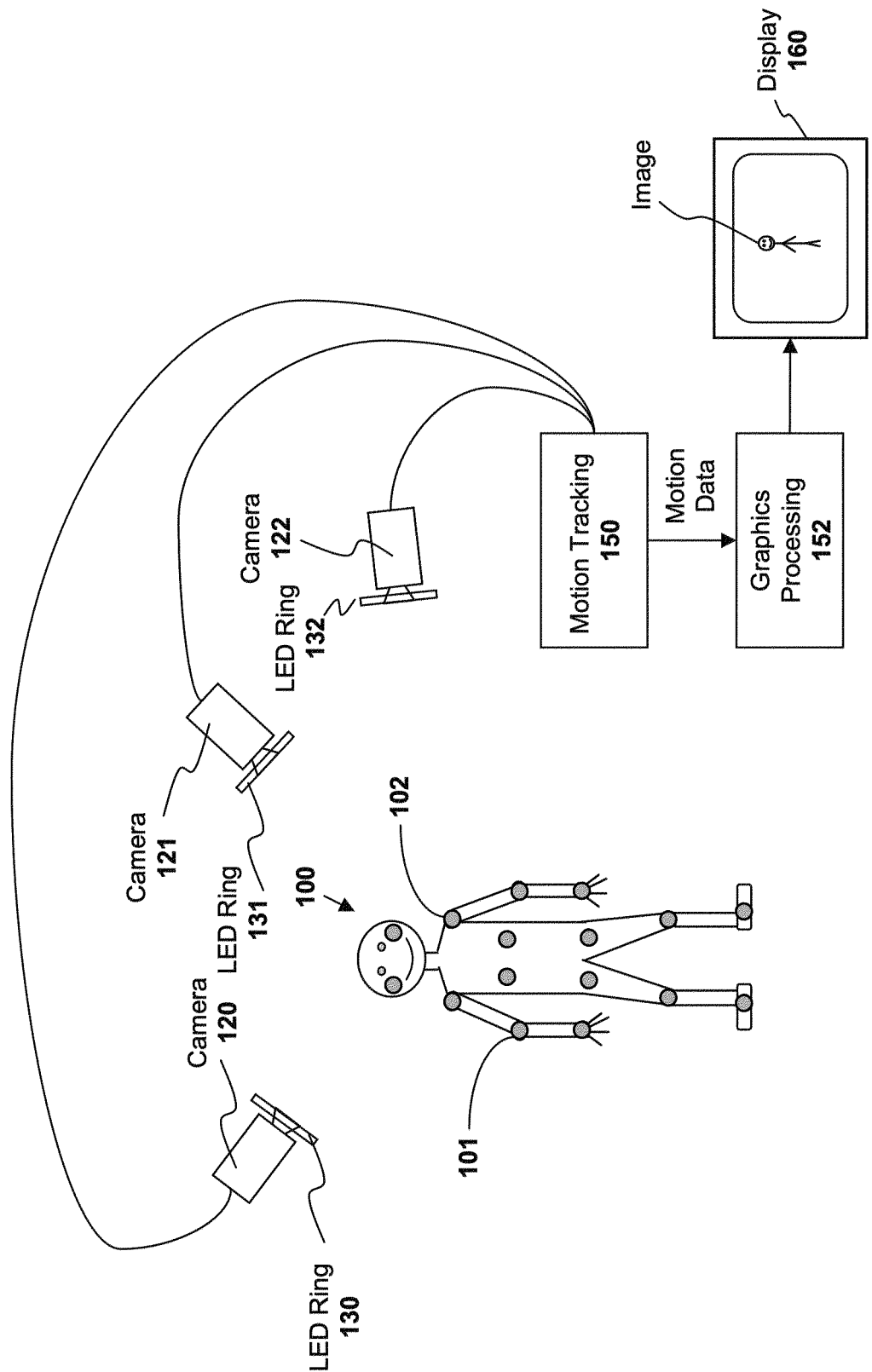
FIG. 1 illustrates a prior art motion tracking system for tracking the motion of a performer using retroreflective markers and cameras.
Figure 5:
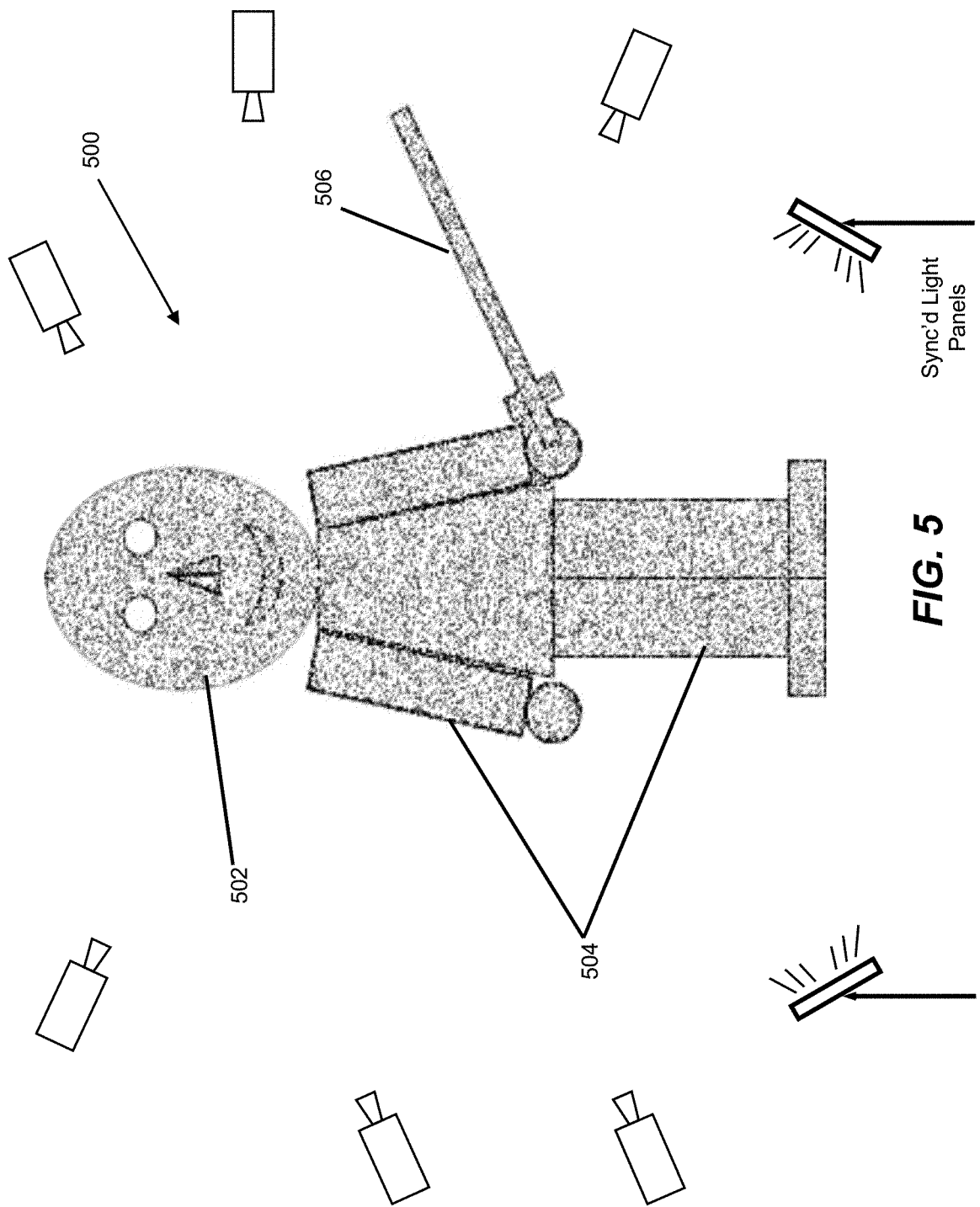
FIG. 5 illustrates a random pattern applied to all parts of a performer's face, body, and props.

Unlike any prior motion capture systems, in one embodiment of the present invention, illustrated generally in FIG. 5, a random pattern of phosphorescent paint is applied to the performer's face 502, body or clothing 504 and/or props 506 (e.g., a sword). The amount of paint applied to the performer may vary, i.e., with certain areas having relatively more or less paint in relation to other areas. No paint may be used on some areas whereas other areas may be saturated with paint. In another embodiment, multiple colors of phosphorescent paint may be applied to create the random pattern on the performer. In addition, in one embodiment, the random pattern may be used concurrently with different structured patterns, such as the curve pattern described in co-pending application Ser. Nos. 10/942,609 and 10/942,413 or the marker system of FIG. 1.

In one embodiment, the phosphorescent paint applied to the performer's face is Fantasy F/XT Tube Makeup; Product #: FFX; Color Designation: GL; manufactured by Mehron Inc. of 100 Red Schoolhouse Rd. Chestnut Ridge, N.Y. 10977. In another embodiment, paint viewable in visible light is used to apply the random pattern and visible light is used when capturing images. However, the underlying principles of the invention are not limited to any particular type of paint. In another embodiment, if a liquid surface is to be captured, particles that float in the liquid can be distributed across the surface of the liquid. Such particles could be phosphorescent particles, retroreflective spheres, or other materials which are visible with high contrast compared to the light emission of the liquid when it is captured.

Figure 6:
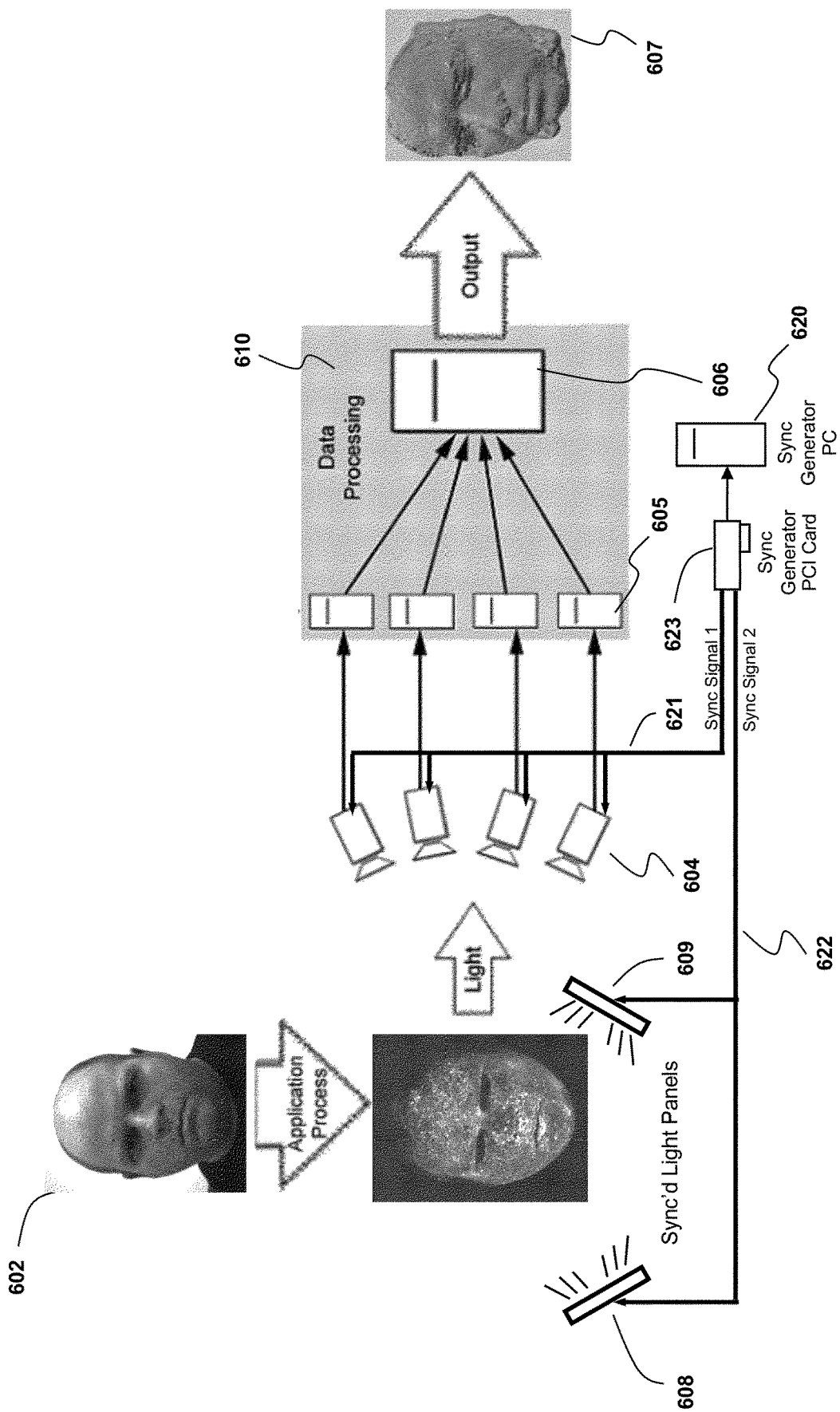
FIG. 6 illustrates one embodiment of the invention which employs the performer with the random pattern in FIG. 5 to track movement and/or facial expression with synchronized light panels and camera shutters.

As mentioned briefly above, in one embodiment, the efficiency of the motion capture system is improved by using phosphorescent paint and/or by precisely controlling synchronization between the cameras' shutters and the illumination of the random pattern. Specifically, FIG. 6 illustrates one embodiment in which the random pattern is painted on the performer's face 602 using phosphorescent paint and light panels 608-609 (e.g., LED arrays) are precisely synchronized with the opening and closing of the shutters of the motion capture cameras 604. The room in which the capture is performed is sealed from light so that it is completely, or nearly completely dark, when the light panels 608-609 are off. The synchronization between the light panels 608-609 and cameras 604 is controlled via synchronization signals 622 and 621, respectively. As indicated in FIG. 6, in one embodiment, the synchronization signals are provided from a peripheral component interface ("PCI") card 623 coupled to the PCI bus of a personal computer 620. An exemplary PCI card is a PCI-6601 manufactured by National Instruments of Austin, Tex. However, the underlying principles of the invention are not limited to any particular mechanism for generating the synchronization signals.

Figure 7:
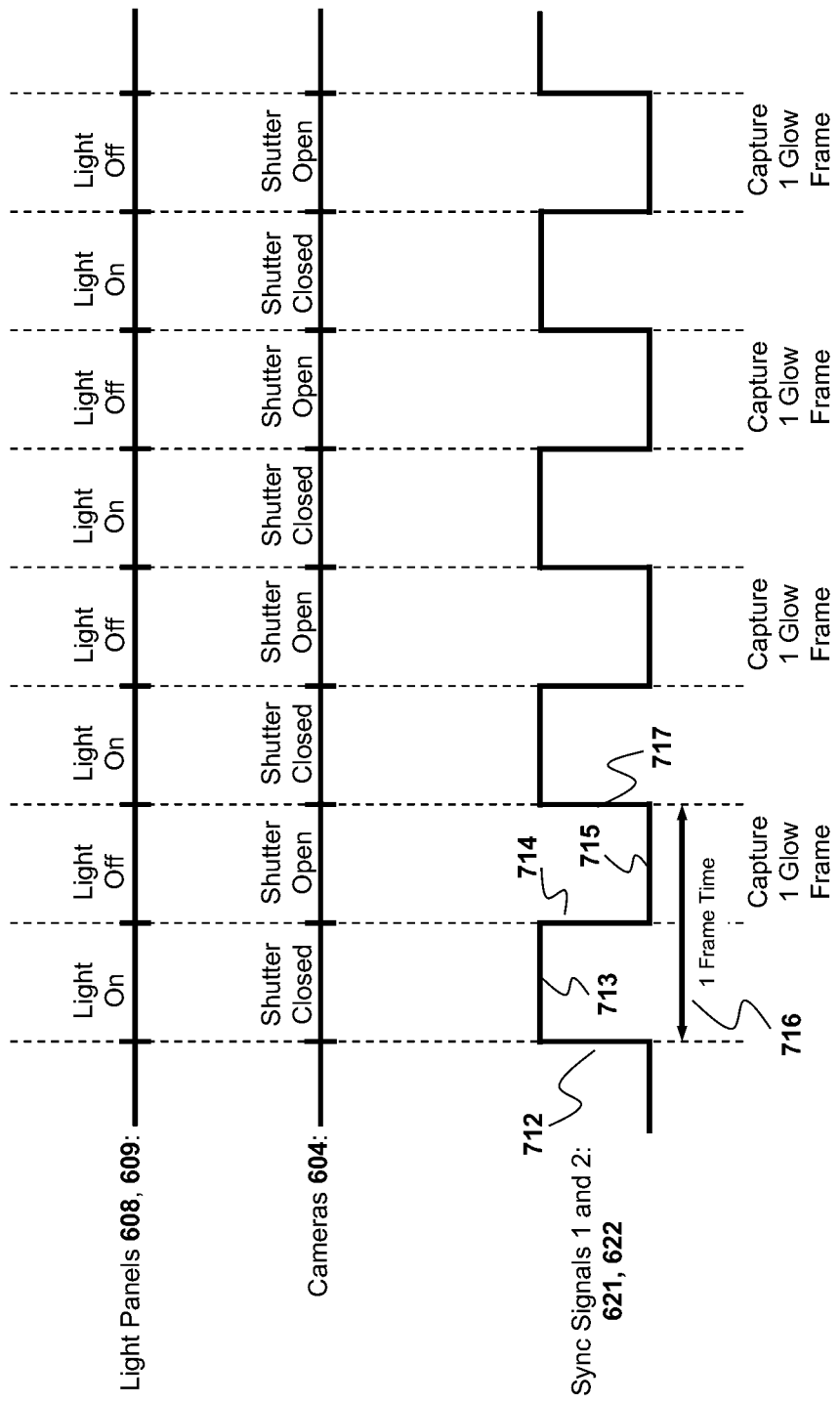
FIG. 7 is a timing diagram illustrating the synchronization between the light panels and the shutters according to one embodiment of the invention.

The synchronization between the light sources and the cameras employed in one embodiment of the invention is illustrated graphically in FIG. 7. In this embodiment, the two synchronization signals 621, 622 are the same. In one embodiment, the synchronization signals cycle between 0 to 5 Volts. In response to the synchronization signals 621, 622, the shutters of the cameras are periodically opened and closed and the light panels are periodically turned off and on, respectively. For example, on the rising edge 712 of the synchronization signals, the camera shutters are closed and the light panels are illuminated. The shutters remain closed and the light panels remain illuminated for a period of time 713. Then, on the falling edge of the synchronization signals 714, the shutters are opened and the light panels are turned off. The shutters and light panels are left in this state for another period of time 715. The process then repeats on the rising edge 717 of the synchronization signals.

As a result, during the first period of time 713, no image is captured by the cameras, and the random pattern of phosphorescent paint is illuminated with light from the light panels 608-609. During the second period of time 715, the light is turned off and the cameras capture an image of the glowing phosphorescent paint on the performer. Because the light panels are off during the second period of time 715, the contrast between the phosphorescent paint and the rest of the room (including the unpainted regions of the performer's body) is extremely high (i.e., the rest of the room is pitch black), thereby improving the ability of the system to differentiate the various patterns painted on the performer's face from anything else in the cameras' 604 fields of view. In addition, because the light panels are on half of the time, the performer will be able to see around the room during the performance. The frequency 716 of the synchronization signals may be set at such a high rate that the performer will not even notice that the light panels are being turned on and off. For example, at a flashing rate of 75 Hz or above, most humans are unable to perceive that a light is flashing and the light appears to be continuously illuminated. In psychophysical parlance, when a high frequency flashing light is perceived by humans to be continuously illuminated, it is said that "fusion" has been achieved. In one embodiment, the light panels are cycled at 120 Hz; in another embodiment, the light panels are cycled at 240 Hz, both frequencies far above the fusion threshold of any human. However, the underlying principles of the invention are not limited to any particular frequency.

Figure 8B:
FIGS. 8A and 8B are frames captured at the same time, with external visible light present, of an elevated view and a frontal view, respectively, of a performer with a random pattern of phosphorescent paint applied to the face.
Figure 8A:
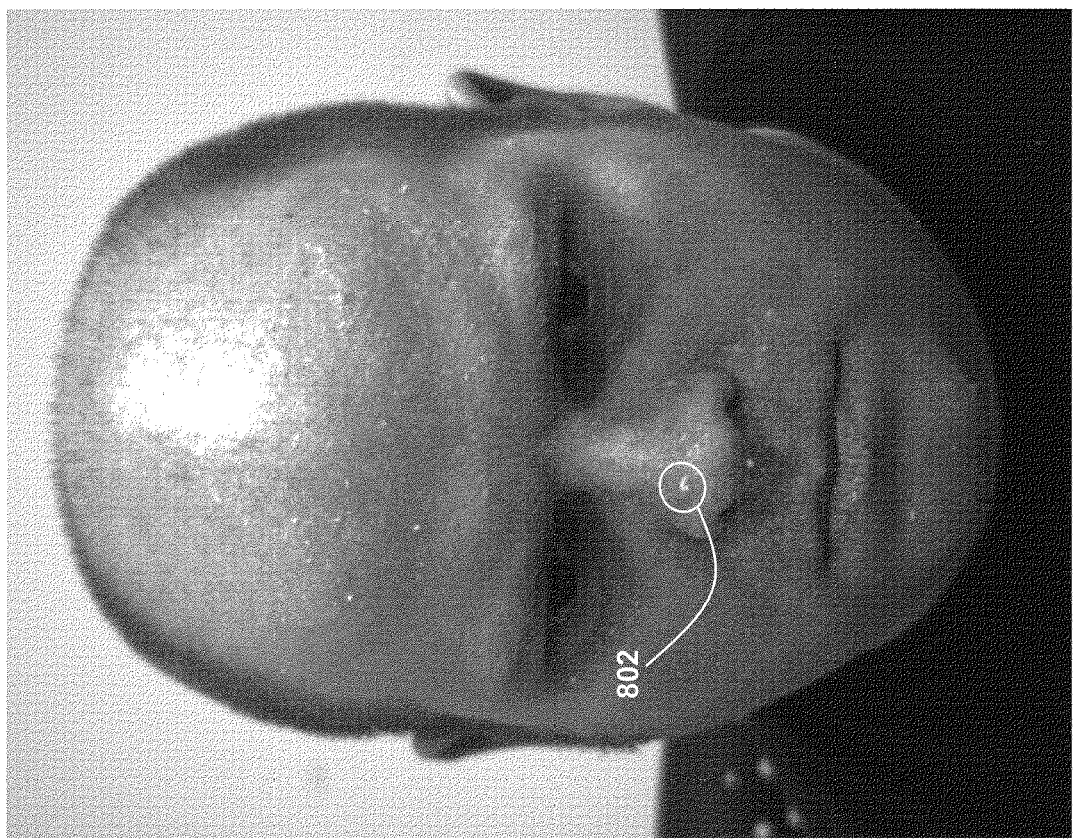
Figure 9B:
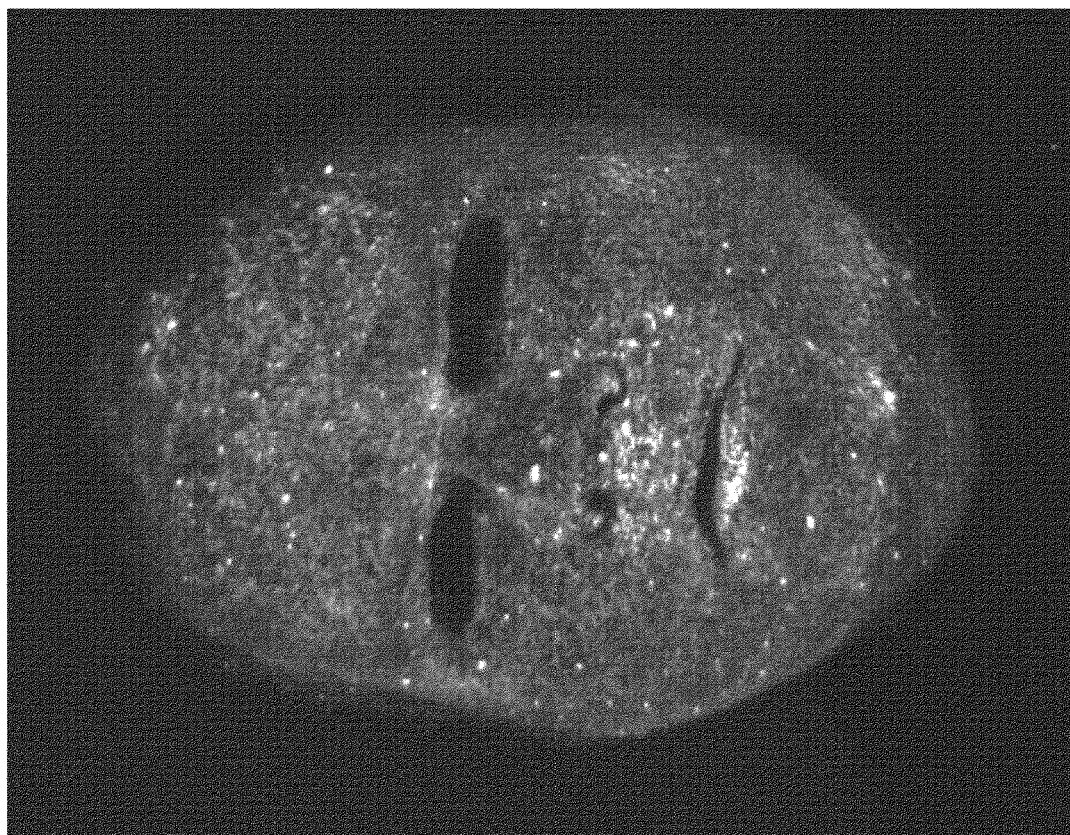
FIGS. 9A and 9B are frames captured at the same time, without external visible light present, from the same perspectives as FIGS. 8A and 8B, respectively, of the performer with the random pattern of paint applied to the face.
Figure 9A:
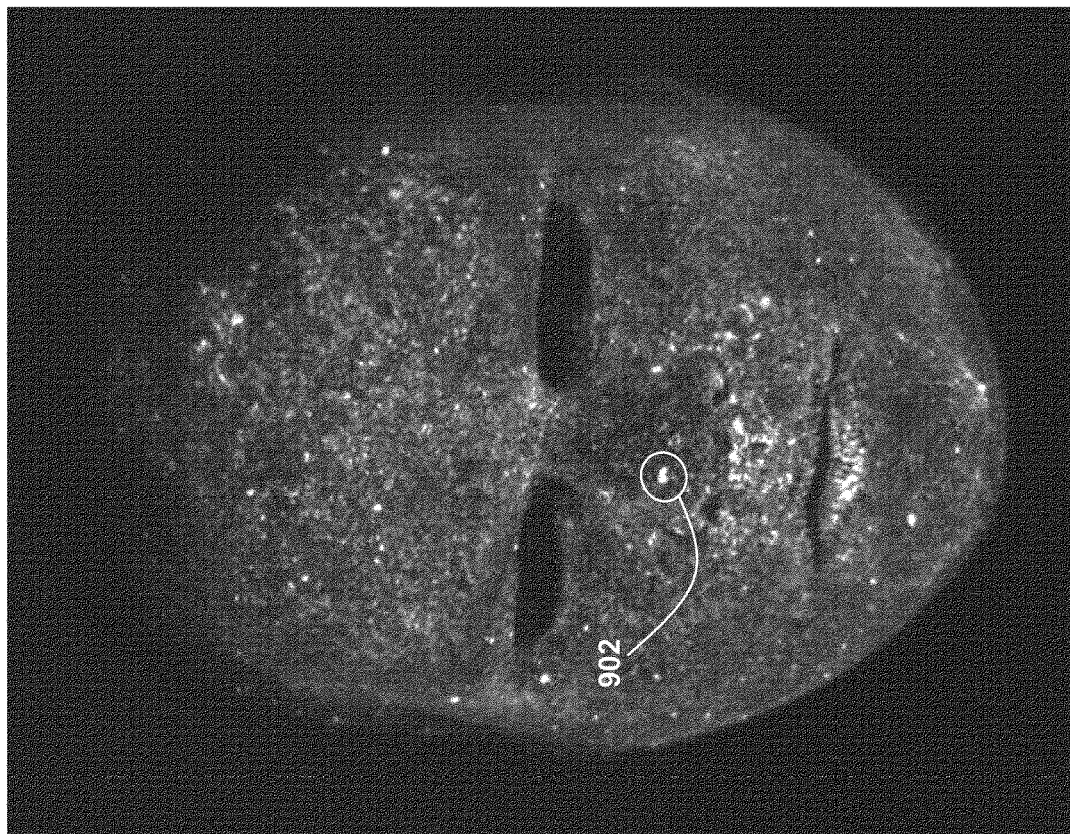

FIGS. 8A and 8B are exemplary pictures of the performer 602 during the first time period 713 (i.e., when the light panels are illuminated) from different reference angles and FIGS. 9A and 9B show the illuminated random pattern captured by the cameras 604 during the second time period 715 (i.e., when the light panels are turned off). During the first time period, the random pattern of phosphorescent paint (the paint as applied in FIGS. 8A and 8B is mostly transparent in visible light, but where the random pattern is particularly dense, it can be seen in visible light as small spots of white such as 802 in FIG. 8A) is charged by the light from the light panels and, as illustrated in FIGS. 9A and 9B, when the light panels are turned off, the only light captured by the cameras is the light emanating from the charged phosphorescent paint (and the particularly dense spot 802 can be seen in FIG. 9A as spot 902). Thus, the phosphorescent paint is constantly recharged by the strobing of the light panels, and therefore retains its glow throughout the motion capture session. In addition, because it retains its glow for a period of time, if a performer happens to move so that for a few frames some of the random pattern of phosphorescent paint is in shadow and not illuminated by the light panels, even though the phosphorescent paint is not getting fully charged for those frames, the paint will still retain its glow from previous frame times (i.e., when the paint was not in shadow).

Note also that the random paint pattern varies both spatially (i.e. paint dot placements) and in amplitude (i.e., paint dot density, since denser (thicker) dots generally phosphoresce more light) resulting in a frame capture by cameras 604 during the glow interval 715 that is modulated randomly in horizontal and vertical spatial dimensions as well as in brightness.

Figure 10:
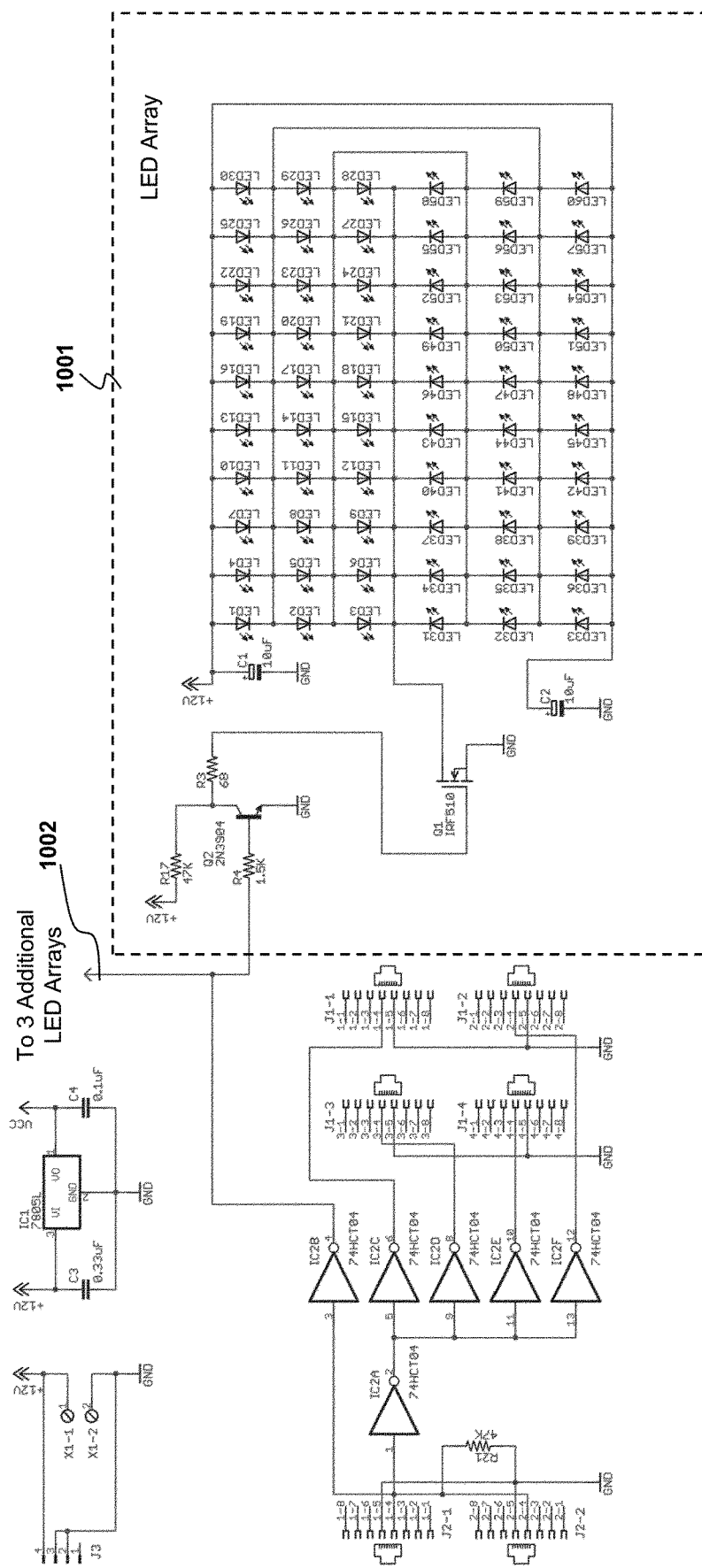
FIG. 10 is a schematic representation of an exemplary LED array and the connectors for the synchronization signals.

As mentioned above, in one embodiment, the light panels 608, 609 are LED arrays. A schematic of an exemplary LED array 1001 and associated connection circuitry is illustrated in FIG. 10. The synchronization signals are applied to the LED array 1001 via connector J2-1 illustrated to the left in FIG. 10. In one embodiment, the connectors are RJ-45 connectors. The synchronization signal is initially inverted by inverter IC2B and the inverted signal is applied to the base of transistor Q2, causing transistor Q2 to turn on and off in response to the inverted signal. This causes current to flow through resistor R3, thereby causing transistor Q1 to turn on and off. This, in turn, causes the LEDs within the LED array 501 to turn on and off. In one embodiment, the inverted signal from IC2B is applied to three additional LED arrays as indicated in FIG. 10. A plurality of additional connectors J1-1, J1-2, J1-3, and J1-4 are provided for additional light panels (i.e., the light panels may be daisy-chained together via these connectors) using inverters IC2C, IC2D, IC2E and IC2F for buffering. If daisy-chaining without buffering is desired (e.g. due to critical timing requirements that would be hampered by the IC2 propagation delays), then connector J2-2 can be used. The voltage regulator IC1 used for the LED array (shown at the top of FIG. 10) takes a 12V input and produces a 5V regulated output used by IC2. In one embodiment, transistors Q1 is a MOSFET transistor. However, the underlying principles are not limited to any particular type of circuitry.

In one embodiment of the invention, the cameras are configured to capture pictures of the performer's face (e.g., FIGS. 8A and 8B) in addition to capturing the random pattern (e.g., FIGS. 9A and 9B). The pictures of the performer's face may then be used, for example, by animators as a texture map for correlating regions of the random pattern and rendering a more accurate representation of the performer. The phosphorescent paint as applied in FIGS. 8A and 8B is largely transparent in visible light, allowing for an almost unaltered capture of the underlying image of the performer's face. Prior art motion capture systems have obscured much of the object to be captured by utilizing opaque marking materials such as retroreflective markers or high-contrast paint, or by utilizing patterns projected onto the face. All of these prior art techniques have made it difficult to capture a largely unaltered visible light image of the object being captured. Further, prior art optical motion capture techniques have relied upon specific visible light lighting conditions. For example, retroreflective markers rely upon a light source around the camera lens, paint pattern capture techniques rely upon reasonably uniform lighting of the face (e.g. shadows and highlights are avoided) and projected pattern techniques rely upon projected light. In one embodiment of the invention, the motion is only captured during the glow interval 715.

During the visible light interval 713, virtually any lighting arrangement is possible so long as the phosphorescent paint is adequately charged (i.e., such that the pattern is within the light sensitivity capability of cameras 604) before it dims. This gives enormous creative control to a director who wishes to achieve dramatic effects with the lighting of the performers when their visible light images are captured. Such creative control of lighting is an integral part of the art of filmmaking. Thus, not only does the present invention allow for largely unobstructed visible light capture of the performers, but it allows for creative control of the lighting during such visible light image capture.

Figure 11:
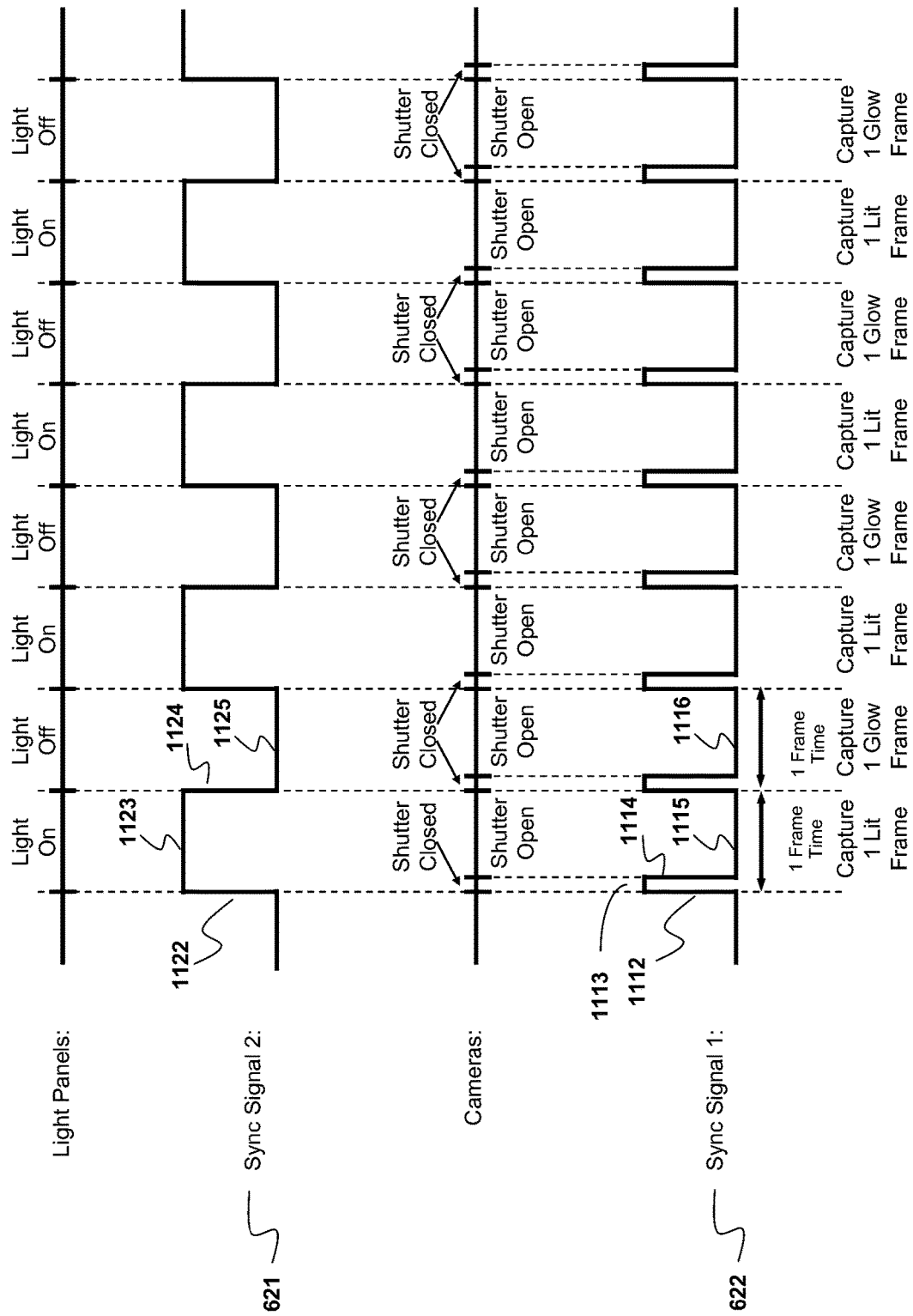
FIG. 11 is a timing diagram illustrating the synchronization between the light panels and the camera shutters in an embodiment for capturing both lit frames and glow frames.

The signal timing illustrated in FIG. 11 represents an embodiment in which an asymmetric duty cycle is used for the synchronization signal for the cameras (in contrast to the 50% duty cycle shown in FIG. 7). In this embodiment, synchronization signal 2 remains the same as in FIG. 7. The rising edge 1122 of synchronization signal 2 illuminates the light panels; the panels remain on for a first time period 1123, turn off in response to the falling edge 1124 of synchronization signal 2, and remain off for a second time period 1125.

By contrast, synchronization signal 1, which is used to control the shutters, has an asymmetric duty cycle. In response to the rising edge 1112 of synchronization signal 1, the shutters are closed. The shutters remain closed for a first period of time 1113 and are then opened in response to the falling edge 1114 of synchronization signal 1. The shutters remain open for a second period of time 1115 and are again closed in response to the rising edge of synchronization signal 1. The signals are synchronized so that the rising edge of synchronization signal 1 always coincides with both the rising and the falling edges of synchronization signal 2. As a result, the cameras capture one lit frame during time period 1115 (i.e., when the shutters are open the light panels are illuminated) and capture one "glow frame" during time period 1116 (i.e., when the shutters are open and the light panels are off).

In one embodiment, the data processing system 610 shown in FIG. 6 separates the lit frames from the glow frames to generate two separate streams of image data, one containing the images of the performer's face and the other containing phosphorescent random pattern data. The glow frames may then be used to generate the 3D point cloud that specifies surface 607 (shown enlarged in FIG. 19) of the performer's face and the lit frames may be used, for example, as a reference for animators. Such reference could be used, for example, to better synchronize a texture map of the face, or if the resulting animated face is different from the performer's face (e.g. if it is a caricature), such reference could be used to help the animator know what expression the performer is intending during that frame of the performance. and/or to assist in generating the texture map derived from visible light capture 602 (shown enlarged in FIGS. 8A and 8B) of the performer's face. The two separate video sequences may be synchronized and viewed next to one another on a computer or other type of image editing device.

Given the significant difference in overall illumination between the lit frames and the glow frames, some cameras may become overdriven during the lit frames if their light sensitivity is turned up very high to accommodate glow frames. Accordingly, in one embodiment of the invention, the sensitivity of the cameras is cycled between lit frames and glow frames. That is, the sensitivity is set to a relatively high level for the glow frames and is then changed to a relatively low level for the lit frames.

Figure 12:
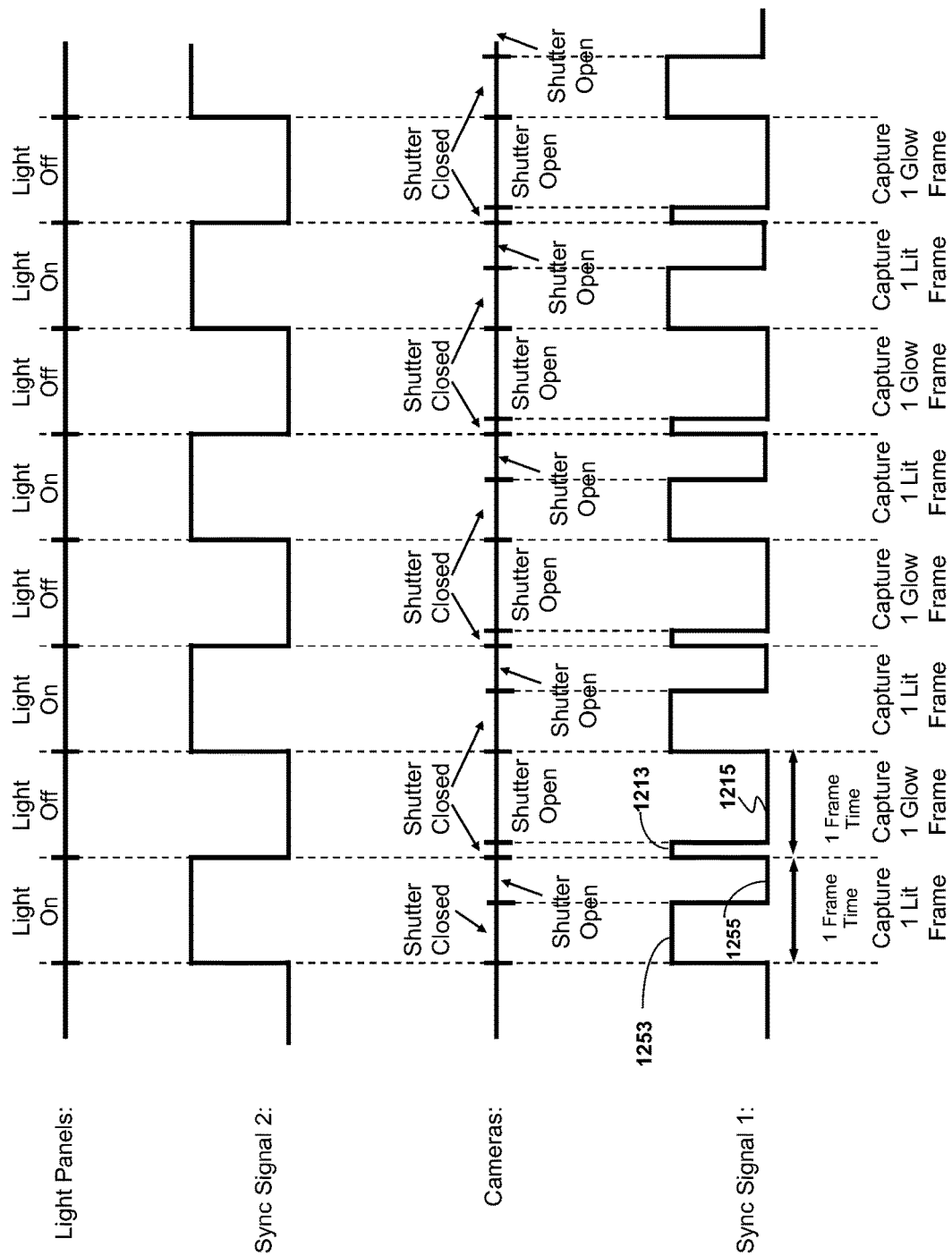
FIG. 12 is a timing diagram illustrating the synchronization between the light panels and the camera shutters in another embodiment for capturing both lit frames and glow frames.

Alternatively, if the sensitivity of the cameras 604 cannot be changed on a frame-by-frame basis, one embodiment of the invention changes the amount of time that the shutters are open between the lit frames and the glow frames. FIG. 12 illustrates the timing of one such embodiment in which synchronization signal 1 is adjusted to ensure that the cameras will not be overdriven by the lit frames. Specifically, in this embodiment, during the period of time that synchronization signal 2 is causing the light panels to be illuminated, synchronization signal 1 causes the shutter to be closed for a relatively longer period of time than when synchronization signal 2 is not illuminating the light panels. In FIG. 12, for example, synchronization signal 1 is high during time period 1253, thereby closing the shutter, and is low during period 1255, thereby opening the shutter. By contrast, during the glow frame, synchronization signal 1 is high for a relatively short period of time 1213 and is low for a relatively longer period of time 1215.

Figure 13:
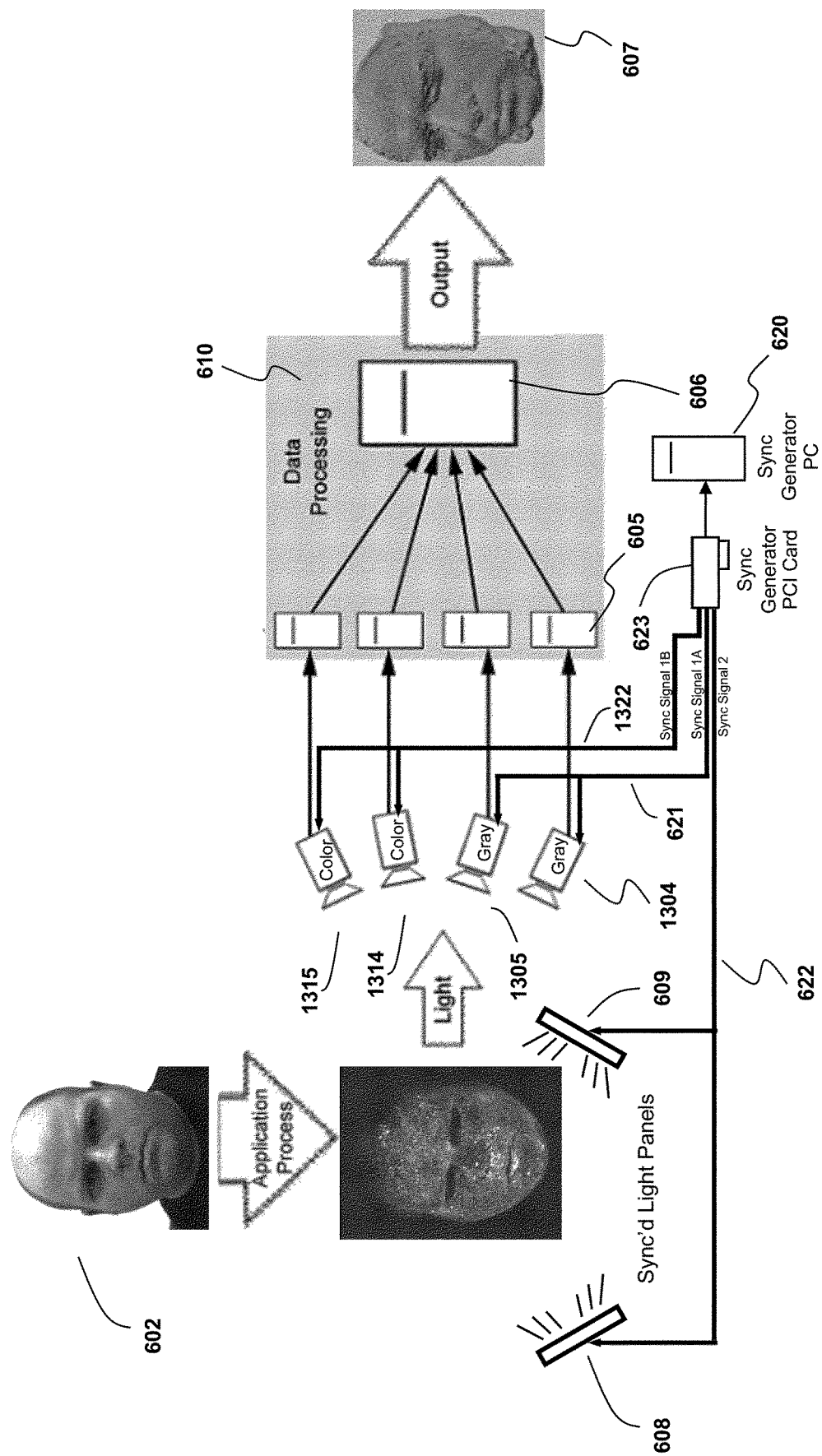
FIG. 13 illustrates one embodiment of a system for capturing both lit frames and glow frames.

In one embodiment, illustrated in FIG. 13, both color and grayscale cameras are used and are synchronized using different synchronization signals. Specifically, in this embodiment, color cameras 1314-1315 are used to capture the lit frames and grayscale cameras 1304-1305 are used to capture the phosphorescent random pattern painted on the performer's face. One of the benefits of this configuration is that grayscale cameras typically have a relatively higher resolution and higher light sensitivity than comparable sensor resolution color cameras, and can therefore capture the phosphorescent pattern more precisely. By contrast, color cameras are better suited to capturing the color and texture of the performer's face.

Figure 14:
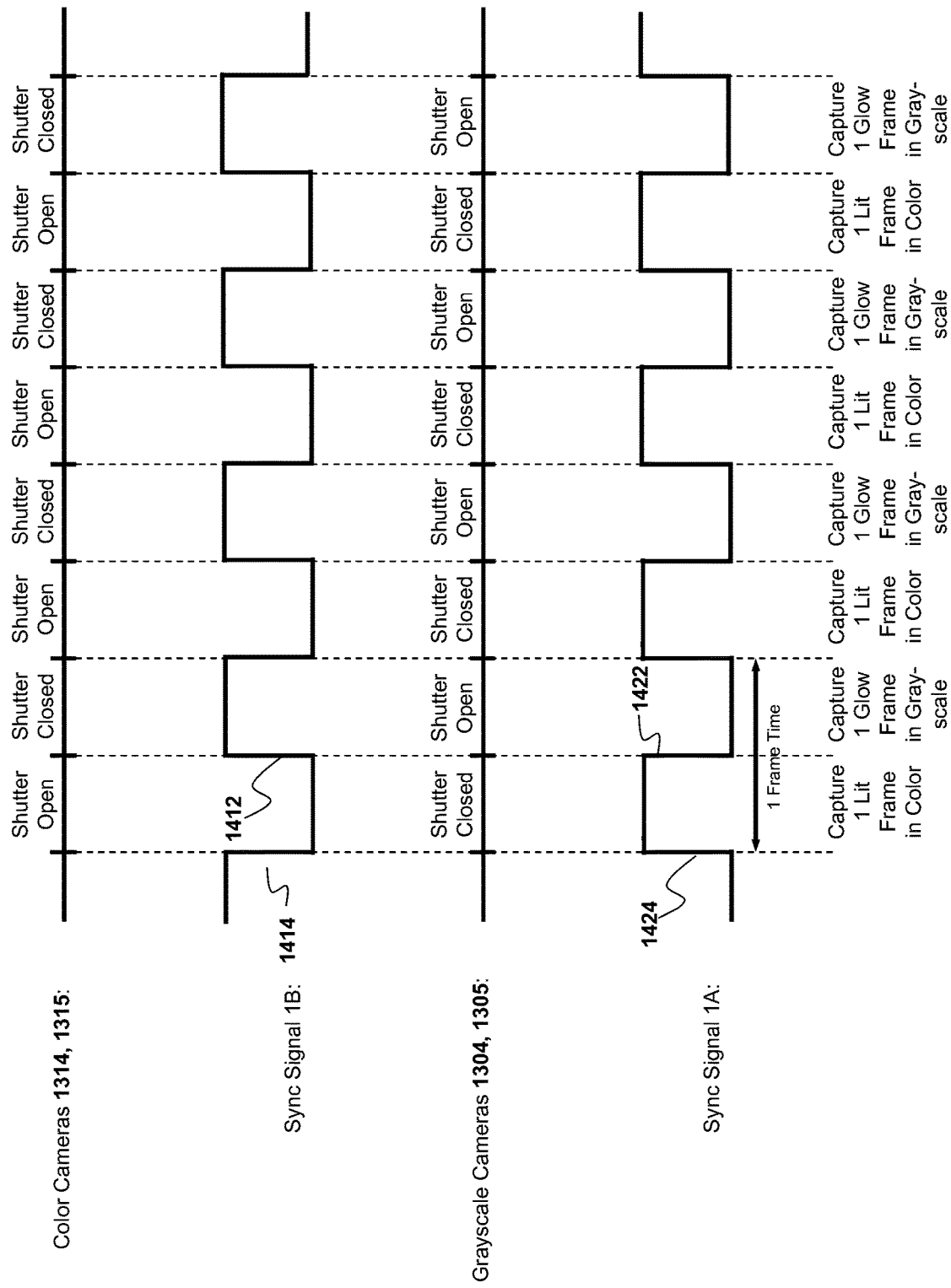
FIG. 14 illustrates a timing diagram associated with the system shown in FIG. 13.

As illustrated in FIG. 14, in one embodiment, different synchronization signals, 1A and 1B are used to control the grayscale and color cameras, respectively. In FIG. 14, synchronization signals 1A and 1B are 180 degrees out of phase. As a result, the falling edge 1414 of synchronization signal 1B occurs at the same time as the rising edge 1424 of synchronization signal 1A, thereby opening the shutters for the color cameras 1314, 1315 and closing the shutters for the grayscale cameras 1304, 1305. Similarly, the rising edge 1412 of synchronization signal 1B occurs at the same time as the falling edge 1422 of synchronization signal 1A, thereby closing the shutters for the color cameras 1314, 1315 and opening the shutters for the grayscale cameras 1304, 1305. The synchronization signal 2 for the light panels is not illustrated in FIG. 14 but, in one embodiment, is the same as it is in FIG. 7, turning the light panels on when the color camera shutters are opened and turning the light panels off when the grayscale camera shutters are opened.

When the embodiments of the present invention described herein are implemented in the real world, the synchronization signals (e.g., 621 and 622 of FIG. 6) may require slight delays between respective edges to accommodate delays in the cameras and LED arrays. For example, on some video cameras, there is a slight delay after rising edge 712 of FIG. 7 before the camera shutter closes. This can be easily accommodated by delaying signal 622 relative to signal 621. Such delays are typically on the order of less than a millisecond. As such, when the system is started, the timing signals may initially need to be precisely calibrated by observing whether the video cameras 604 are capturing completely black frames and adjusting the timing signals 621 and 622 prior to the actual performance.

The random pattern of phosphorescent paint may be applied to the performer through a variety of techniques. In one embodiment, paint is applied to a sponge roller and the sponge roller is rolled across the specified portion of the performer. FIGS. 8A-9B illustrate a pattern applied by this technique. Other exemplary techniques comprise (i) spraying the paint with an airbrush, (ii) applying paint through a stencil, or (iii) flicking a wire brush containing paint such that the droplets of paint are splattered onto the surface to be captured. The desired result is any random pattern, ideally with a 1/n random distribution, but high-quality can be achieved with patterns which are far less than ideal. It should be noted that the above paint application techniques are not exhaustive but are merely several embodiments of the present invention.

During the application of paint, parts of the performer that are not intended to be touched by the paint may be covered.

Parts of the performer that are typically screened from the paint application are the inside of the mouth and the eyeballs. These parts of the performer may have a random pattern applied to them through alternate techniques. In one exemplary technique, a random pattern of phosphorescent paint is applied to a contact lens, which is then placed over the performer's eyeball. In another exemplary technique, tooth caps embedded with a random pattern of phosphorescent pigments are placed over the teeth of the performer. In one embodiment, frames are captured during lit intervals 1115 and glow intervals 1116, and the performer's irises and/or pupils (which are smooth and geometric) are tracked during lit interval 1115 using visible light, while other parts of the performer's body are captured from phosphorescent paint patterns during glow intervals 1116, In one embodiment of the present invention, live performers and/or sets are captured at the same time as motion capture performers, who are to be generated and rendered in the future, by the motion capture system illustrated in FIG. 13. The set is in a room illuminated by the synchronized LED lights 606, 609 of the motion capture system. The live-action performers and sets are captured by color cameras 1314-1315 during the frame intervals when the lights are on, and the motion-captured performers are captured by the grayscale cameras 1304-1305 during the frame intervals when the lights are off.

To compute the 3D surface 607 of FIGS. 6 and 13, images of the performer/paint are captured within the field of view of at least two cameras. Correlation of the motion capture data from the at least two cameras is performed in order to create a 3D surface of regions of the performer. The correlated regions of the captured data from all of the cameras are then correlated to create a final 3D surface 607.

In one embodiment of the present invention, a correlation may be performed by Data Processing system 610 (which may incorporate one or more computing systems 605 per camera 604 and/or may incorporate one or more computing systems 606 to process the aggregated camera capture data) at a low resolution for each pair of frames from two cameras with overlapping fields of view to determine regions of the pair of frames that highly correlate to each other. Then, another correlation of the regions determined to have high correlation at low resolution is performed at a higher resolution in order to construct a 3D surface for the two frames. Correlation may also be performed on at least two successive time frame captures from the same view of reference in order to determine and track movement and/or expressions of the performer.

Figure 15:
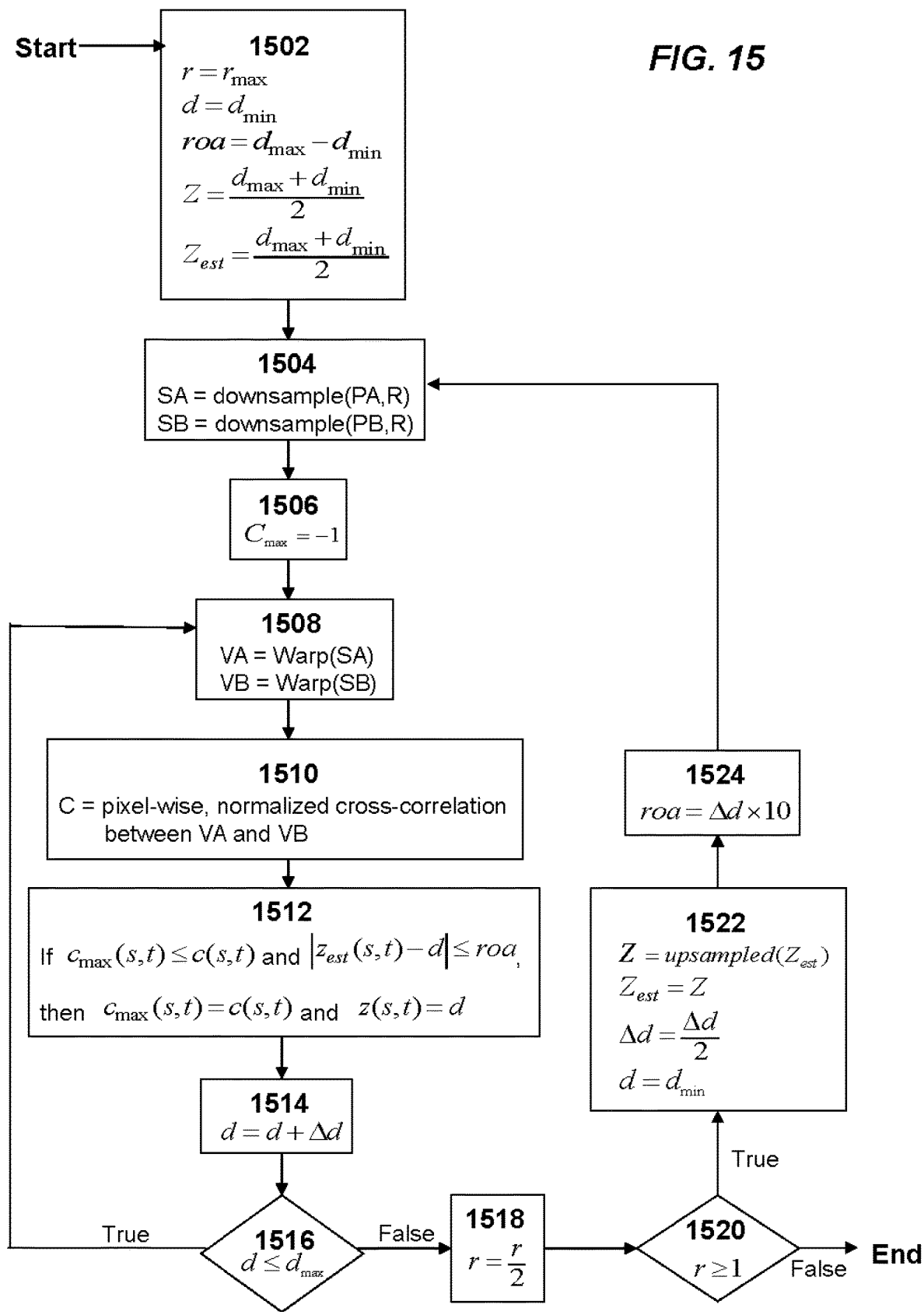
FIG. 15 illustrates the method of correlating captured frames from two cameras of the motion capture system to create a 3D surface.
Figure 28:
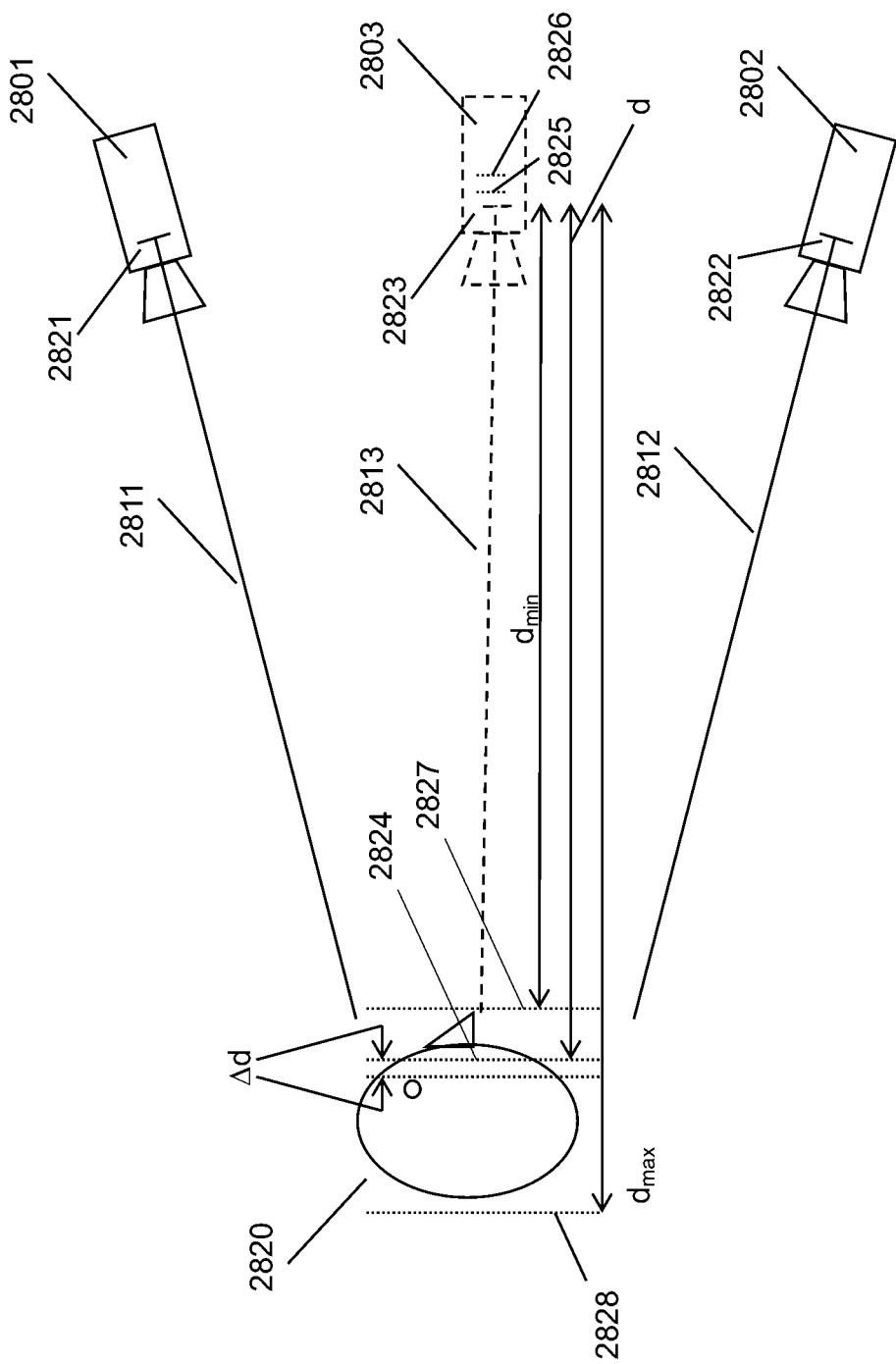
FIG. 28 illustrates the imaginary camera positioning described in FIG. 15.

FIG. 15 is a flowchart illustrating one specific embodiment of a method for correlating two frame captures from two different perspectives (e.g., the captures of FIGS. 9A and 9B). Before discussing the flowchart of FIG. 15, certain concepts must be introduced. Referring to FIG. 28, Camera 2801 captures frame PA in a stream of frames via sensor 2821. Camera 2802 captures frame PB via sensor 2822 at the same time frame PA is captured. Through the correlation technique described in FIG. 15, the resulting correlated frame from frame PA and frame PB will be from the perspective of an imaginary or "virtual" camera, visualized as imaginary camera 2803 in FIG. 28.

The following variables will be used in discussing FIG. 15.

r: Variable r is the sensor resolution divisor for downsampling. For example, if a 640×480 pixel resolution frame is downsampled to 160×120 pixels, then r equals 4 (640/160 and 480/120 equal 4).

$r_{max}$: Variable $r_{max}$ is the maximum sensor resolution divisor r can equal. Thus, the largest downsampling that can occur will use $r_{max}$.

SA: SA is the downsample of frame PA of factor of r. Downsampling can be performed using various filters such as a bilinear filter, a bicubic filter, or other filters and/or techniques known in the art. Thus, in the example in the definition of r, SA is 160×120 pixels in size, where PA was downsampled from 640×480 with a value of r equals 4 to a size of (640/4)×(480/4).

SB: SB is the downsample of PB as through the same process described in the definition of SA. As will be seen in FIG. 15, correlations of frames PA and PB are first performed at lower resolutions (e.g., SA and SB) and then performed at gradually higher resolutions in order to prevent regions of frames PA and PB from falsely having high correlations with one another. For example, in a particular frame, a spot on a performer's chin may be falsely be identified as having a high correlation with a spot on the ear.

$d_{min}$: The distance $d_{min}$, illustrated in FIG. 28, is the distance between the imaginary camera's sensor 2823 (the visualization of the frame buffer) and the plane perpendicular to line 2813 of a capture point of the object 2820 closest to the imaginary sensor 2823. Thus, in the example of FIG. 28, the closest point is the tip of the nose of performer 2820. The plane of the point is visualized as plane 2827. It will be understood by one in the art through discussion of FIG. 15 that $d_{min}$ can be set to a value less than the value described above. In other exemplary embodiments, $d_{min}$ can be user defined or set to the beginning of the field of focal depth for camera 2801 and/or 2802.

$d_{max}$: The distance $d_{max}$ is the distance between the imaginary camera's sensor 2823 (the visualization of the frame buffer) and the plane perpendicular to line 2813 of a capture point of the object 2820 farthest away from the imaginary sensor 2823. Thus, in the example of FIG. 28, the farthest point is the back of the head of performer 2820. The plane of the point is defined in the same way as for dmin. It will be understood by one in the art through discussion of FIG. 15 that $d_{max}$ can be set to a value greater than the value described above, as shown plane 2828 in FIG. 28. In other exemplary embodiments, $d_{max}$ can be user defined or set to the end of the field of focal depth for camera 2801 and/or 2802. In yet other exemplary embodiments $d_{max}$ can be user defined or set to further depth of the captured object in the fields of view of cameras 2801 and 2802.

d: The distance d is the distance between the imaginary camera's sensor 2823 and the imaginary plane of capture 2824. During the process of FIG. 15, frames PA and PB are correlated as if captured from the same point of reference. Hence, the frame stored in the frame buffer in correlating PA and PB is like a frame being captured via the imaginary sensor 2823 from the imaginary capture plane 2824. Thus, during discussion of FIG. 15, frames SA and SB will be reference converted using a perspective transform, or "warped", as if they were projected on imaginary plane 2824. Distance d will change between $d_{min}$ and $d_{max}$. Therefore, frames SA and SB will be warped multiple times as if projected on the moving imaginary plane 2824.

Δd: Δd is the increment that distance d changes between frames. Thus, it can be visualized that the imaginary plane 2824 moves Δd distance from $d_{min}$ to $d_{max}$ where at each increment, the correlation of PA and PB is performed (as described in greater detail below). The user can choose a larger or smaller Δd, depending on the precision of reconstruction resolution in the z dimension that is desired.

VA: VA is the reference conversion of SA ("Virtual A"). In other words, VA is the resulting matrix (i.e., 2 dimensional frame buffer) of warping SA to the reference of the imaginary plane 2824. Matrix VA can be visualized as the frame SA (2825) captured via imaginary sensor 2823, but of course limited to what is in view of camera 2801. For example, if the underside of the nose of head 2820 is obstructed from camera 2801's view then VA will not contain image information from the underside of the nose.

VB: VB is the reference conversion of SB ("Virtual B"). In other words, VB is the resulting matrix (i.e., 2 dimensional frame buffer) of warping SB to the reference of the imaginary plane 2824. Matrix VB can be visualized as the frame SB (2826) captured via imaginary sensor 2823. VA and VB are two matrices of perspective converted matrices SA and SB that will be correlated against each other in the process illustrated in FIG. 15.

Z[m,n]: Matrix Z is originally of size m×n. The size of Z is originally equal to the size of capture frames PA and PB. Because of correlation at different resolutions, though, Z will be downsampled and upsampled. Thus, each element of Z is notated as z(j,k), where j is between 1 and m/r and k is between 1 and n/r. After the process illustrated in FIG. 15, when correlation is finished performing at the highest resolution (when r=1), z(j,k)+$d_{min}$ is the measure of depth of pixel j,k in the frame being correlated. Thus, pixel j,k of the resulting frame can be visualized as being z(j,k)+$d_{min}$ distance away from the imaginary camera 2803. Hence, once the correlation process of FIG. 15 is complete, the Z matrix can be used to render a 3D image of the object 2820.

$Z_{est}$[m,n]: Matrix $Z_{est}$ (an estimate of Z) is a matrix originally of size m×n. The existence and use of $Z_{est}$ allows for the manipulation of z(j,k) values without changing the values stored in Z. $Z_{est}$ will be the same size as Z through the downsampling and upsampling in the process described in FIG. 15.

roa: roa stands for Range of Acceptance and is the range of distances z(j,k) is allowed to deviate at a given resolution stage of the process illustrated in FIG. 15. For example, object 2820 is known to be within distance $d_{min}$ and $d_{max}$ of imaginary camera 2803. Therefore, initial roa could be set to $d_{max}$ -$d_{min}$, as in FIG. 15, because no z(j,k) can be larger than this value. roa is refined each time a higher resolution pair of frames are beginning to be correlated, as will be seen in FIG. 15.

C[(m/r),(n/r)]: Matrix C is a matrix of the correlation values for a pixel-wise, normalized cross-correlation between VA and VB at a specific d. The pixel-wise, normalized cross-correlation is well known in the art. An exemplary illustration and discussion of one pixel-wise, normalized cross-correlation is "Cross Correlation", written by Paul Bourke, copyright 1996 (http://astronomy.swin.edu.au/~pbourke/other/correlate/). In one embodiment of the present invention, the values are normalized to the range on −1 to 1. Since correlation will be performed at varying resolutions, the size of the matrix will depend on the amount of downsampling of the original frames (e.g., PA and PB). For example, if PA and PB are downsampled to 80×60, C will be of size 80×60. Each element of C is notated as c(s,t) where s is between 1 and m/r and t is between 1 and n/r.

$C_{max}$[(m/r),(n/r)]: Matrix $C_{max}$ is a matrix wherein $c_{max}$(s,t) is the maximum value of c(s,t) when comparing all c(s,t) values for a specific s and t over all d's (e.g., $d_{min}$, $d_{min}$+Δd, $d_{min}$+2Δd, . . . $d_{max}$). Hence, $C_{max}$ contains the largest correlation value computed for each pair of pixels va(s,t) and vb(s,t) of matrices VA and VB. The d at which largest correlation value is determined for pixel s,t will be stored in z(s,t) as the optimal d for the pair of pixels. When r is 1, the d's stored will create the wanted final Z matrix.

Beginning discussion of FIG. 15, step 1502 is entered wherein d, r, ROA, Z, and $Z_{est}$ are initialized. Their initial values are set to the following:

$$r = r_{max}$$
$$d = d_{min}$$
$$roa = d_{max} - d_{min}$$
$$Z = \frac{d_{max} + d_{min}}{2}$$
$$Z_{est} = \frac{d_{max} + d_{min}}{2}$$

In one embodiment, $r_{max}$ is defined by the user, but it may be determined in a variety of ways including, but not limited to, setting a static variable for all correlations or depending the variable on $d_{min}$ and/or $d_{max}$. It will be understood by one in the art through matrix algebra that Z=a means; for all j,k; z(j,k) equal a. Such notation will be used throughout the discussion of FIG. 15.

Step 1504 is then entered, where the frames PA and PB are downsampled to the size m/r×n/r and stored as SA and SB, respectively. Thus, for the first pass through step 1504, the size of SA and SB will be m/$r_{max}$×n/$r_{max}$. As previously discussed, downsampling is well known in the art and may be performed by various filters and/or techniques including, but not limited to, bilinear filtering and bicubic filtering.

Proceeding to step 1506, $C_{max}$ is set to an initial value, where:

$$C_{max} = -1$$

All elements of matrix $C_{max}$ may be set equal to any number or be user defined. The value of −1 is one value that ensures that for every $c_{max}$(s,t), at least one c(s,t) will be greater than $c_{max}$(s,t) because the minimum of a correlation value is typically 0. In the present embodiment illustrated in FIG. 15, $C_{max}$ will be of the same size as SA and SB for every resolution because, as previously stated, the size of $C_{max}$ is m/r×n/r.

In step 1508, SA and SB are perspective transformed (warped) to the plane 2824 in FIG. 28 and stored in VA and VB, respectively, which can be visualized as frame captures 2825 and 2826 of the imaginary camera 2803 in FIGS. 28 (2825 and 2826 are shown as being located behind 2823 for the sake of illustration, but spatially, they are coincident with 2823). It is understood and well known in the art that the two matrices VA and VB can be stored as one matrix utilizing a 3rd dimension of length 2 to store both frame buffers or stored in a variety of other ways.

Proceeding to step 1510, a pixel-wise, normalized cross-correlation between VA and VB is performed and stored in C. It is understood in the art that substitutable functions may be performed, such as not normalizing the data before cross-correlation or correlating regions other than pixels.

In step 1512, every element in $C_{max}$ is compared to its respective element in C, and the corresponding element of Z is compared to determine if it lies within the range of acceptance. Hence, for every (s,t) in C, $C_{max}$, and Z:

If $c_{max}(s,t) \leq c(s,t)$ and $|z_{est}(s,t)-d| \leq roa$, then $c_{max}(s,t)=c(s,t)$ and $z(s,t)=d$ In one embodiment of the invention, the above conditional statement can be implemented in software through the use of multiple "for" loops for variables s and t. It will be appreciated by one in the art that the above conditional statement can be implemented in a variety of other ways. Once the final iteration of step 1512 has been performed for a specific resolution, matrix Z will be the best estimate of d values for each pixel corresponding to the depth of each pixel of the object captured away from $d_{min}$.

Once all conditional statements are performed in step 1512, d is incremented in step 1514. Thus, $$d=d+\Delta d$$

As previously discussed, $\Delta d$ is a user defined value to increment d. $\Delta d$ can be visualized as the distance for moving imaginary plane 2824 a $\Delta d$ distance past the imaginary plane's 2824 previous position.

Proceeding to decision block 1516, the procedure determines if the final cross-correlation 1510 of VA and VB and comparison step 1512 at a specific distance d has been performed. The process can be visually perceived in FIG. 28 as determining whether the imaginary plane 2824 has been moved far enough to be positioned behind imaginary plane 2828. Mathematically, the process block determines if:

$$d \le d_{max}$$

If true, then the procedure has not finished all iterations of cross-correlating VA and VB at a specific resolution. Hence, the procedure loops back to step 1508. If the above statement is false, then the procedure has finished cross-correlating VA and VB at a specific resolution. Therefore, the procedure flows to step 1518.

In step 1518, the sensor resolution divisor r is decreased. In the illustrated embodiment, r is decreased by:

$$r = \frac{r}{2}$$

Decreasing r leads to cross-correlation being performed at a higher resolution because SA and SB are the downsampling of PA and PB, respectively, by the magnitude of r. Thus, for example, if r is 8, then r/2 is 4. Hence, the size of SA and SB increases from, for example, 80×60 to 160×120 where PA and PB are of size 480×360. Other exemplary embodiments of decreasing r exist such as, but not limited to, a user defined array of specific r values or dividing by a different value other than 2. Dividing by 2 means that the frame captures PA and PB will be downsampled at a magnitude of factors of two (e.g., 2×, 4×, 8×, . . . ).

Once r has been decreased, decision block 1520 is reached. Decision block 1520 determines whether r has been decreased to less than 1. As previously discussed, when r equals 1, no downsampling of PA and PB occurs. Therefore, in the current embodiment, when r is less than 1 (e.g., r=0.5), the previous cross-correlations were performed at the highest resolution (e.g., 640×480 if PA and PB are of size 640×480) and the attained Z matrix is the desired matrix to help render a 3D surface of the object. If r is greater than or equal to 1, then cross-correlation has not yet been performed at the highest resolution. Thus, the decision block determines if:

$$r \ge 1$$

If false, the procedure illustrated in FIG. 15 has completed and the flowchart is exited. If the above statement is true, then the procedure flows to step 1522. If, as in one previously discussed embodiment r is decreased by an array of specific values in step 1518, then one skilled in the art will notice that the logic of decision block 1518 will change to logic needed to determine if the last value in the array of specific values iterated through in block 1518 has been reached during the flow of the flowchart a number of times equal to the number of elements in the array. One skilled in the art will know how to change the logic of decision block 1520 depending on the logic of step 1518.

In step 1522, some of the variables are adjusted before cross-correlating at a higher resolution. The following variables are set as:

$$Z = \text{upsampled}(Z_{est})$$

$$Z_{est} = Z$$

$$\Delta d = \frac{\Delta d}{2}$$

$$d = d_{min}$$

$Z_{est}$ is upsampled and stored in Z. In order to determine the magnitude of upsampling, one skilled in the art will notice that the value of dividing r in step 1518 is the magnitude of upsampling. In the present embodiment, the magnitude of upsampling is 2. For example, $Z_{est}$ (if currently of size 160×120) is upsampled to size 320×240 and stored in Z. The magnitude of upsampling can be determined by dividing the original value of r in step 1518 by the decreased value of r in step 1518. If an array of defined r values is used for step 1518, then the magnitude of upsampling can be determined from the array. As previously stated, upsampling is well known in the art and can be performed with a variety of filters and/or techniques including, but not limited to, bilinear filtering and bicubic filtering. Once Z has been stored, $Z_{est}$ is set equal to Z (the result of upsampling $Z_{est}$ for determining Z).

In addition to setting the values of Z and $Z_{est}$, $\Delta d$ is decreased. In the current embodiment, $\Delta d$ is divided by 2. $\Delta d$ is decreased because when cross-correlating at higher resolutions, the increment of increasing d should be smaller in order to determine better z values for each pixel s,t. Visually, at higher resolution, the user will want the imaginary screen 2824 in FIG. 28 to move at smaller intervals between $d_{min}$ and $d_{max}$. $\Delta d$ may be decreased in any manner known in the art, such as, but not limited to, dividing by a different value or using $\Delta d$ values defined by a user in an array the size of 1 greater than the number of iterations of step 1522 during flow of the flowchart.

Furthermore, d is reset to equal $d_{min}$. Visually, this can be illustrated, in FIG. 28, as resetting the imaginary plane 2824 to the position of imaginary plane 2827, which is a $d_{min}$ distance from the imaginary camera 2803 along path 2813.

Proceeding to step 1524, roa is decreased. roa is decreased because prior cross-correlation at a lower resolution helps to determine a smaller range of acceptance for z values after cross-correlating at a higher resolution. In the current embodiment, roa is decreased by the following equation.

$$roa = \Delta d \times 10$$

For the first time performing step 1524, $\Delta d \times 10$ should be less than the difference between $d_{max}$ and $d_{min}$, which is the value roa was originally set to equal. 10 was found to be a good multiple of $\Delta d$ for the current embodiment, but roa can be decreased in a variety of ways including, but not limited to, multiplying $\Delta d$ by a different value than 10 and dividing roa by a value.

After decreasing roa, the procedure loops back to step 1504 to perform cross-correlation at a higher resolution, wherein the flowchart is followed until exiting the procedure at decision block 1520.

FIG. 15 illustrates only one embodiment of the present invention. It will be known to someone skilled in the art that not all of the steps and processes illustrated in FIG. 15 must be followed. Instead, FIG. 15 should only be used as a guideline for implementing one embodiment of the present invention. Alternate embodiments may comprise, but are not limited to, using a larger Δd value for incrementing d and then performing a curve regression on the correlation values for each pixel s,t in order to determine a maxima of the curve and thus extrapolate a z value corresponding to the maxima. The above alternate embodiment may allow for faster processing as less pixel-wise, normalized cross-correlations need to be performed at each resolution.

Figure 29:
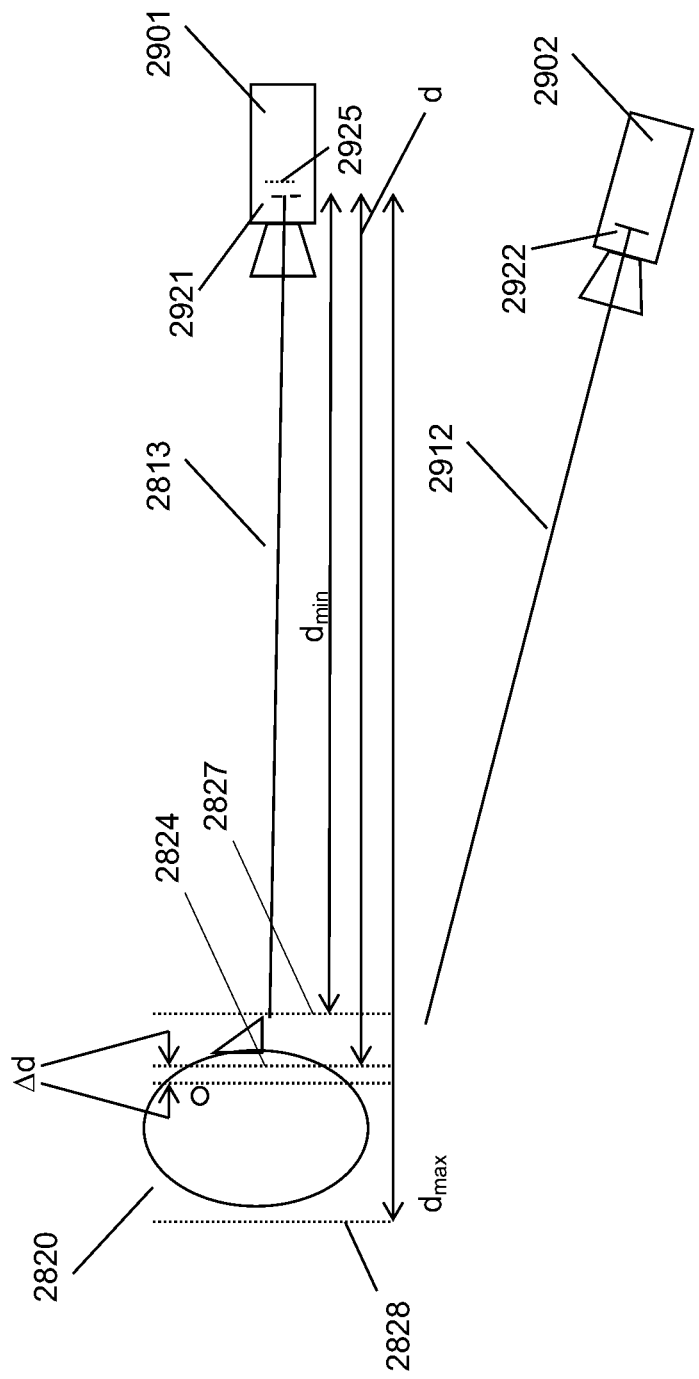
FIG. 29 illustrates the imaginary camera at the same perspective as an existing camera.

Another embodiment of the present invention is illustrated in FIG. 29. FIG. 29 illustrates the imaginary camera as envisioned in FIG. 28 as being at the position of one of the cameras 2901 or 2902. In FIG. 29, the imaginary camera can be envisioned as camera 2901. Thus, the frame buffer 2823 visualized in FIG. 28 can be visualized as the sensor 2921 of the camera 2901. Hence, in this alternate embodiment, the flowchart of FIG. 15 is changed such that VA=SA in step 1508. Since the frame buffer is from the perspective of camera 2901, the frame capture of 2901 does not need to be perspective converted (warped). All other aspects of the previously discussed embodiment of the invention are included in this alternate embodiment.

Figure 30:
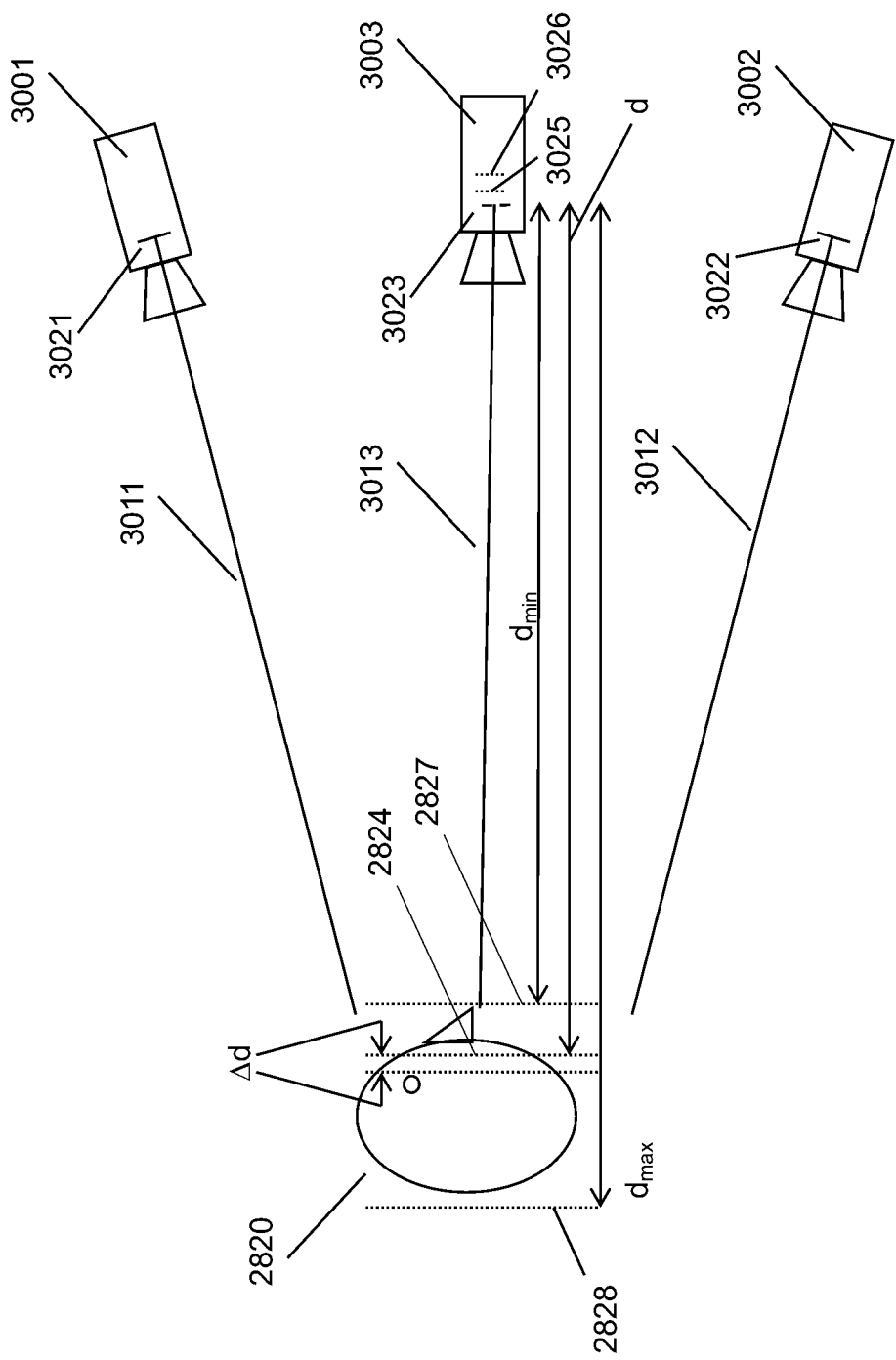
FIG. 30 illustrates correlation between frames captured by three cameras

In a further embodiment of the present invention, more than two cameras are used for cross-correlation. FIG. 30 illustrates frame captures from three cameras being cross-correlated. The imaginary camera 2803 as visualized in FIG. 28 is visualized as one of the cameras 3001, 3002, or 3003. In the specific alternate embodiment, the imaginary camera is visualized as the camera 3003, where frame buffers 3025 and 3026 correspond to the warped frame captures of cameras 3001 and 3002, respectively (for the sake of illustration, frame buffers 3025 and 3026 are shown as being located behind sensor 3023, but they will be warped to a position that coincides spatially with sensor 3023). Since multiple pairs of frames are cross-correlated, the flowchart of FIG. 15 is amended for the alternate embodiment such that, in step 1510, matrix C is the average of the two correlations performed between frame buffers 3023 and 3025, and between 3023 and 3026. Thus, matrix C can be mathematically annotated as:

$$C = \frac{C_B + C_C}{2}$$

where CB is the pixel-wise, normalized cross-correlation correlation between a warped frame 3025 of camera 3001 and a frame 3023 of camera 3003 and CC is the pixel-wise, normalized cross-correlation between a warped frame 3026 of camera 3002 and a frame 3023 of camera 3003. The alternate embodiment may also be expanded to include any number of cameras over 3, each with their capture frame warped to the position of frame 3023 of camera 3002 and then pixel-wise, normalized cross-correlated with frame 3023, with all of the correlated results averaged to produce a value of C per pixel.

Furthermore, the cross-correlations may be combined by means other than a simple average. In addition, the alternate embodiment may set the frame buffer perspective, as visualized as sensor 2823 in imaginary camera 2803 of FIG. 28, outside of any of the existing cameras 3001-3003. For example, an imaginary camera could be visualized as existing between cameras 3001 and 3002 such that the frame captures of all cameras would need to be warped to the perspective of the imaginary camera before cross-correlation. Other embodiments exist of the present invention, and the scope of the present invention should not be limited to the above examples and illustrations.

Figure 17:
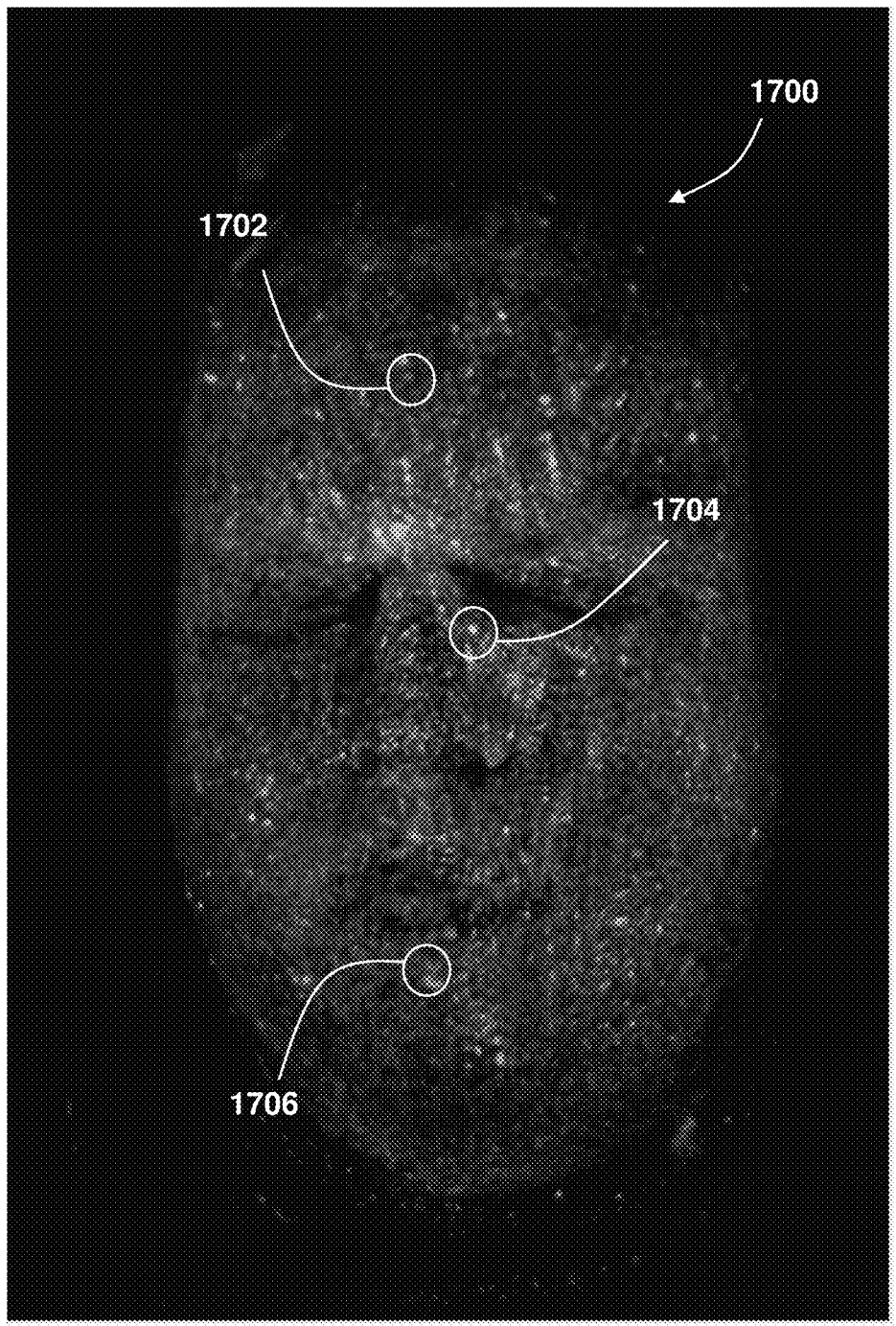
FIG. 17 is a frame with the frame captures of FIGS. 16A and 16B overlapping each other.

FIGS. 16A and 16B and 17 help illustrated visually what the correlation algorithm is doing. FIGS. 16A and 16B illustrate frame captures 1600 and 1610. The frame captures 1600 and 1610 are perspective converted (warped) as an example of step 1508 in FIG. 15 at full resolution (i.e. when r=1). A user would be able to see with the naked eye that regions 1602, 1604, and 1606 correspond to regions 1612, 1614, and 1616, respectively. Colors red and green have been used for illustration purposes only, as the capture can be performed in any format such as, for example, grayscale.

FIG. 17 is an example of the frames 1600 and 1610 being overlapped as frame 1700, as may be an example of storing VA and VB as one matrix of arrays in step 1508 of FIG. 15. A user would be able to see with the naked eye that the depth d is currently set such that region 1704 has a higher correlation than regions 1702 and 1706 (region 1604 and 1614 are closer in to each other than are the other region pairs). The color yellow (red+green) illustrates high correlation between overlapping pixels at a depth d while high concentrations of red and/or green color illustrates lower correlation between overlapping pixels at a depth d. Color yellow has been used for illustration purposes only.

Figure 18:
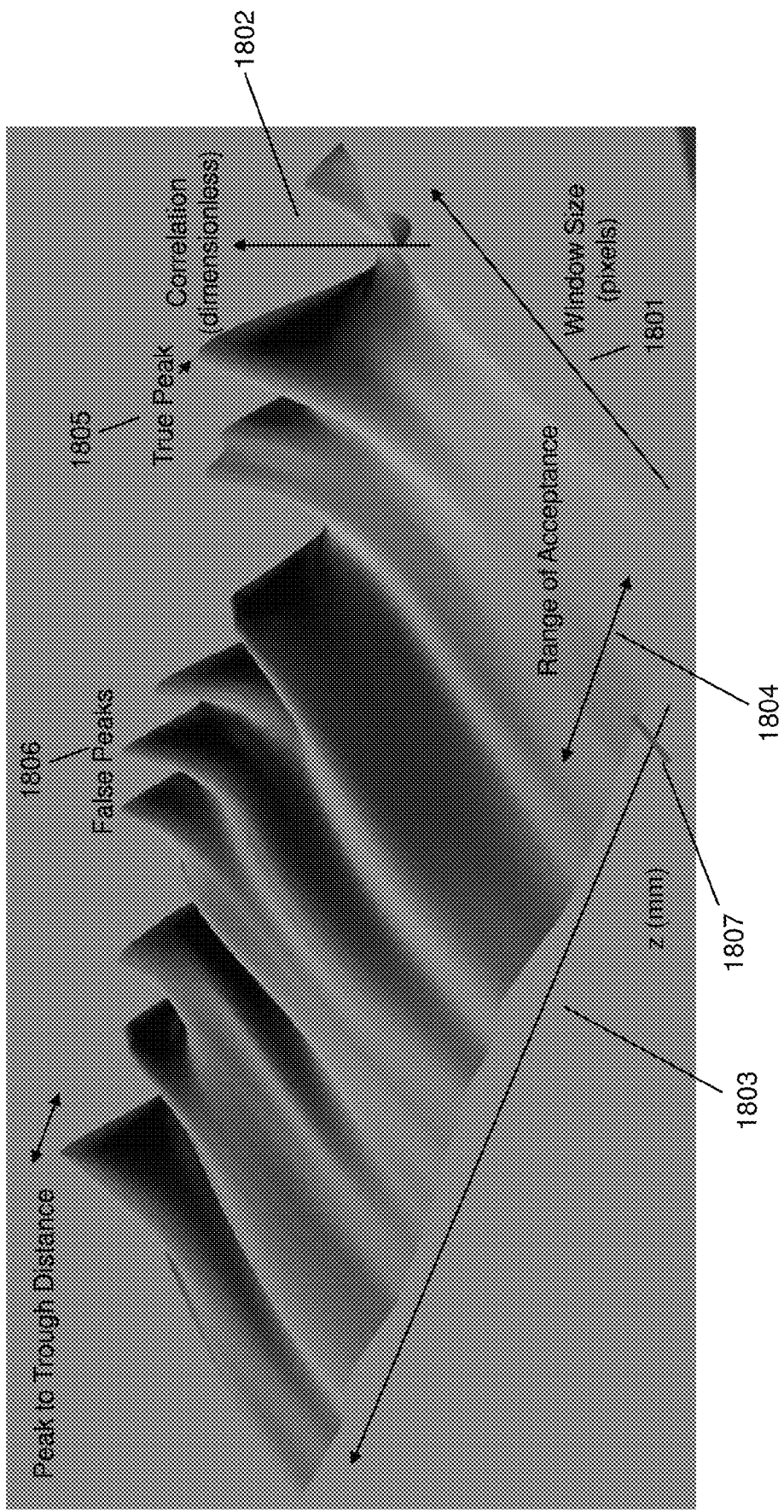
FIG. 18 illustrates an example of the correlation graph in order to determine the depth of a point in FIG. 17.

FIG. 18 is an example of the graph for determining z(s,t) (1803) for a specific pixel s,t at a specific resolution (identified by window size 1801). The range of acceptance (roa) 1804 (which had been determined by prior correlations at lower resolution) limits the values that z can equal so as to remove false peaks 1806 of correlation values from consideration in order to determine the correct correlation value corresponding to a correct d value for pixel s,t. In the example, mark 1807 identifies the z 1803 that corresponds to the true peak 1805. False peaks can result from any number of reasons, including noise in the captured signal, random regions with similar patterns, or because the area being captured is quite oblique to the capturing camera and produces a distorted image. Thus, the successive reduction of resolution, illustrated by the process shown in FIG. 15 is very effective eliminating false peaks from consideration when determining the correct z value in the capture reconstruction. It will be recognized by those skilled in the art that FIG. 18 is only an illustration of the pixel-wise, normalized cross-correlation and comparison process of steps 1510 and 1512 of FIG. 15 and should not be considered as a limitation of the determination of values for matrix Z.

Figure 19:
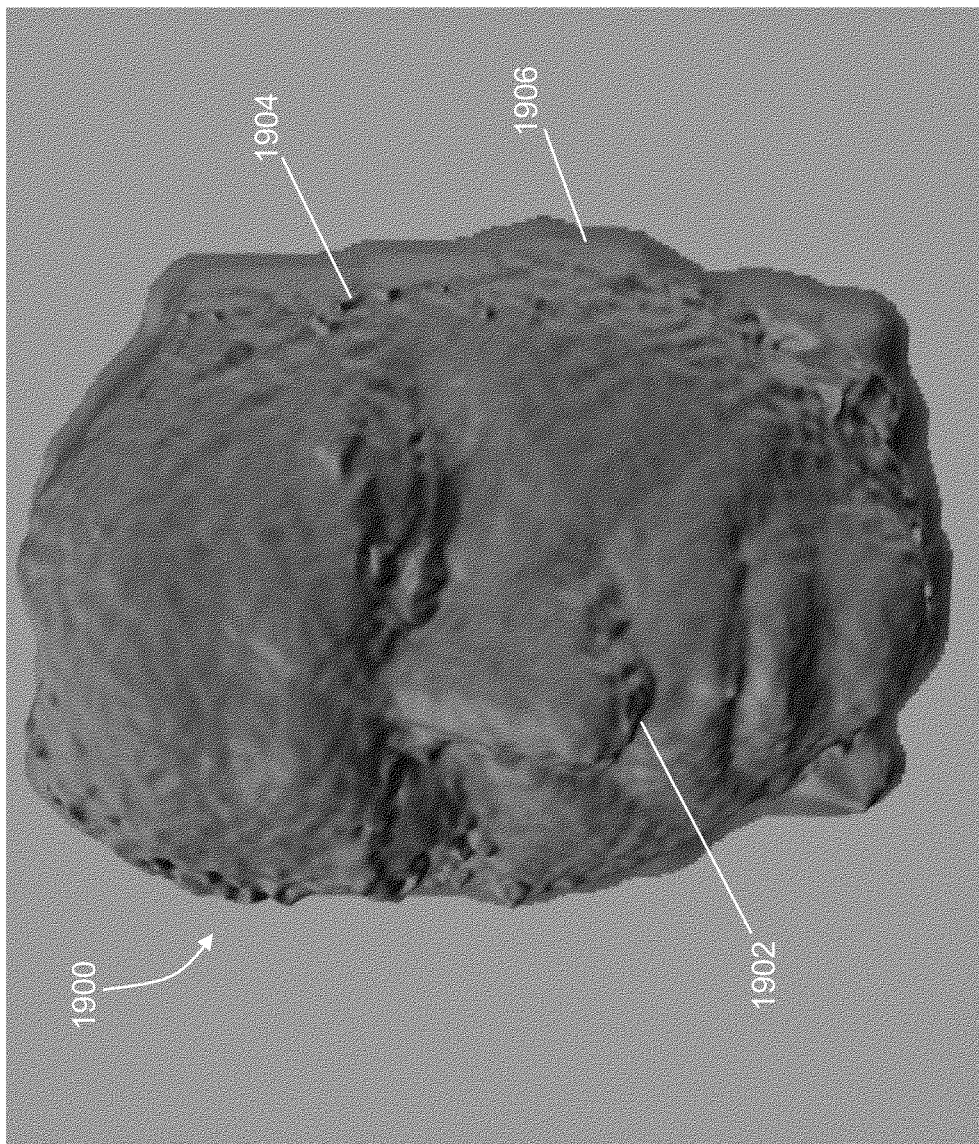
FIG. 19 is an example of a resulting 3D texture map from the correlation method of FIG. 15 and rendering.

The Z matrix output from FIG. 15 can then be rendered into a 3D surface. FIG. 19 is a 2D representation of the 3D surface 1900 created by correlating the frames represented in FIGS. 9A and 9B. It should be noted that the "splotchy" or "leathery" appearance of the 3D surface 1900 is related to the low resolution of the cameras used to capture the frames of the performer (e.g., 0.3 Megapixels).

The processes just described for determining the surface of a captured object can be used for a single frame, or it can be re-applied successively for multiple frames of an object in motion. In this case, if the reconstructed images such as that of FIG. 19 are played back in succession, a 3D animation of the captured surface will be seen. In an alternative embodiment, the same process is reapplied to successive frames of an object that is not moving. In that case, the resulting reconstructed z values can be averaged among the frames so as to reduce noise. Alternatively, other weightings than an averaging can be used, including for example, using the z value at each pixel which was derived with the highest correlation value amongst all the reconstructed frames.

During motion capture, some regions of a performer may be captured by only one camera. When the system of one embodiment correlates the region with other regions from cameras with overlapping fields of view, the correlation determines that the region is distinct (i.e. it does not have a high correlation with any other captured region) and the system can then establish that the region is visible but its position can not be reconstructed into a 3D surface. FIG. 19 illustrates at 1902 an artifact created on the 3D surface 1900 by having only one camera capture a region (i.e. this object was captured by 2 cameras, one above the head and one below the head; the top of the nose obstructed the camera above the head from having visibility of the nostrils, so only the camera below the head had visibility of the nostrils). In addition, artifacts and errors may occur where the region is at an angle too oblique in relation to the cameras' optical axis (as shown by the artifact 1904, a region oblique to both cameras) or where the pattern is out of view of all cameras in the motion capture system (as shown by the artifact 1906).

For regions that may be out of view of any camera of the motion capture system, the random patterns on all surfaces desired to be captured may be captured and stored by the motion capture system before initiating a motion capture sequence. To capture and store the random pattern, the performer (with any other objects desired to be captured) stands in such a way that each region to be captured is visible to at least one camera. The captured patterns are stored in a database in memory (e.g., RAM or hard disk). If the region is only seen by one camera, then the pattern stored is the pattern captured by that one camera. If it is seen by multiple cameras, then the views of the region by each of the multiple cameras is stored as a vector of patterns for that region. In some cases, it is not possible to find one position where the random pattern areas on the performer and all other objects to be captured can be seen by at least one camera. In this case, the performer and/or objects are repositioned and captured through successive frames until all random pattern areas have been captured by at least one camera in at least one frame. Each individual frame has its captured patterns correlated and stored as described previously in this paragraph, and then correlations are performed among all of the stored patterns from the various frames. If a region of one frame is found to correlate with the region of another, then each frame's images of the region (or one or both frame's multiple images, if multiple cameras in one or both frames correlate to the region) is stored as a vector of patterns for that region. If yet additional frames capture regions which correlate to the said region, then yet more images of that region are added to the vector of images. In the end, what is stored in the database is a single vector for each random pattern area of every surface desired to be captured by the system.

Note that the size of the areas analyzed for correlation in the previous paragraph is dependent on the desired resolution of the capture and the achievable resolution of the cameras, given their distance from the objects to be captured. By moving the cameras closer to the objects to be captured and by using higher pixel resolution cameras, smaller areas can be captured and correlated. But, higher resolutions will result in higher computational overhead, so if an application does not require the full achievable resolution of the system, then lower resolution can be used by simply correlating the captured regions at a lower resolution. Or, to put it another way, random patterns can be correlated whether they are correlated at the full resolution of the cameras or at a lower resolution. In one embodiment of the invention, the desired capture resolution can be specified by the user.

Once the region database has been created as described previously, the motion capture session can begin and the motion of a performance can be captured. After a sequence of frames of the motion of a performance is captured, for each given frame, all of the regions stored in the region database are correlated against the captured regions. If a given stored region does not correlate with any of the captured regions (even regions captured by only a single camera), then the system will report that the given region is out of view of all cameras for that frame.

A 3D modeling/rendering and animation package (such as Maya from Alias Systems Corp. of Toronto, Ontario Canada) can link a texture map or other surface treatments to the output of the motion capture system for realistic animation. For example, if the character to be rendered from the motion capture data has a distinctive mole on her cheek, the texture map created for that character would have a mole at a particular position on the cheek. When the first frame is taken from the motion capture system, the texture map is then fitted to the surface captured. The mole would then end up at some position on the cheek for that frame captured from the performer, and the motion capture system would identify that position by its correlation to its region database.

Figure 26B:
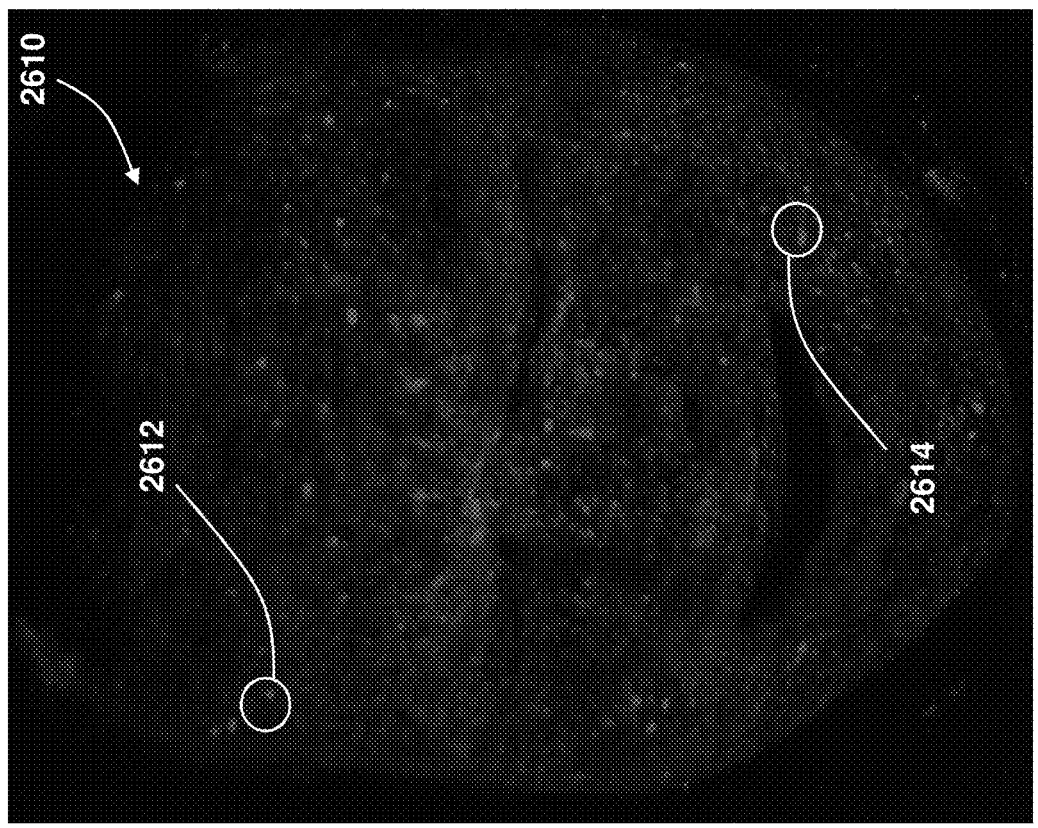
FIGS. 26A and 26B are frames captured at successive moments in time, without external visible light present and each from the same perspective of a performer with the random pattern of paint applied to the face.
Figure 26A:
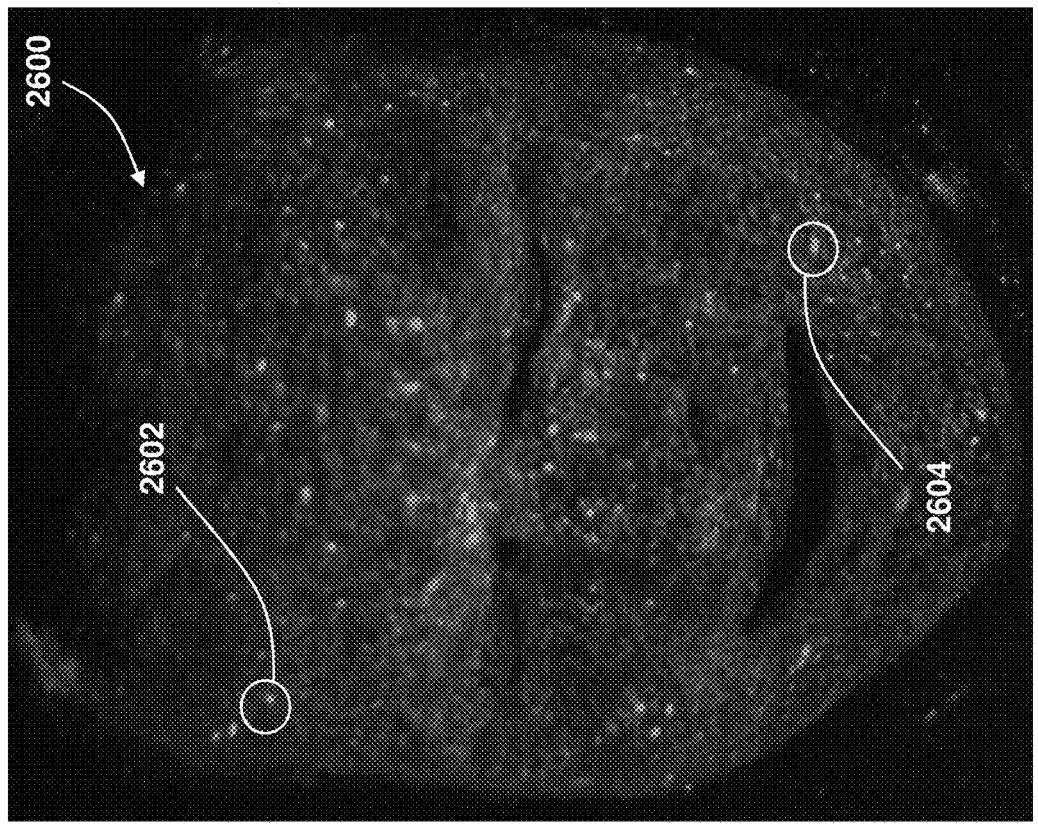

The motion capture system of the present invention can correlate successive time interval frame captures to determine movement of the performer. In one embodiment of the present invention, the distance and orientation between correlated regions of the random pattern captured in successive time frames are measured to determine the amount and direction of movement. To illustrate, FIGS. 26A and 26B are frames 2600, 2610 captured by a camera separated by $\frac{1}{7}$8th of a second in time. The data of the frames 2600, 2610 are colored red and green, respectively, for illustrative purposes only. The frame captures can be performed in any color, grayscale or any capture technique known in the art.

Figure 27:
FIG. 27 is a frame with the frame captures of FIGS. 26A and 26B overlapping each other.

In FIG. 27, the frame 2700 is the overlapping of frames 2600 and 2610 from FIGS. 26A and 26B, respectively. Uniformly yellow areas of frame 2700 are regions of the random pattern that appear in the same position in both frames 2600 and 2610 (i.e. they do not move in the $\frac{1}{7}$8th-second time interval). Where areas of red and/or green in frame 2700 exist, the random pattern moved in the time interval between the capture of the frames 2600 and 2610. For example, region 2702 is uniformly yellow and thus represents little or no movement between corresponding spots 2602 and 2612. In contrast, region 2704 comprises a pair of red and green spots corresponding to a green spot 2604 and a red spot 2614, thus representing more movement during the $\frac{1}{7}$8th-second time interval from frame 2600 to frame 2610 than that of region 2702. The colors of red, green, and yellow for frame 2700 are for illustrative purposes only.

Thus utilizing the recognition of movement in successive frame captures, in one embodiment of the invention, the 3D modeling/rendering/and animation package can link the texture map or other surface treatments to the recognized directions and distances of movement for regions of the random pattern during successive frame captures of the motion capture system to achieve realistic animation.

Utilizing the previous example of the mole within the 3D texture rendered by the package, in a successive new frame where the area of the cheek with the mole would move, that region of the 3D texture with the mole would also move. For example, suppose the mole was located at spot 2604 during frame time 2600. The motion capture system would correlate the region with the region database and would identify that the region is now at a new position 2614 on the new surface that it outputs for the new frame 2610. This information would be used by the 3D modeling/rendering and animation package, and the package would move the mole on the texture map for the cheek to the new position 2614. In this manner, the texture map would stay locked to the changing surface features during the performance.

Figure 2B:
FIG. 2B illustrates a prior art method of applying the markers after drawing the pattern as in FIG. 2A.
Figure 2A:
FIG. 2A illustrates a prior art method of drawing a pattern with a makeup pencil for positioning the reflective markers for motion capture.

The precise frame-to-frame surface region tracking described in the previous paragraph would be very difficult to achieve with an arbitrary position on the performer (e.g. the performer's face) using prior art motion capture systems. With a retroreflective marker-based system (such as that used on the face shown in FIGS. 2A and 2B), the only positions on the performers that can be tracked precisely are those which happen to be positions containing a marker. With a line-based system (such as that shown in FIG. 4), the only positions that can be tracked precisely are those at the intersections of the lines, and only approximately at positions on the lines between the intersections. And with a system using patterns projected on the face, no positions can be tracked precisely, unless some markers are applied to the face, and then the tracking is no better than a marker- or line-based system. Thus, this invention is a dramatic improvement over prior-art systems in tracking positions on deformable surfaces (such as a face) while capturing the surfaces at high resolution.

Although the present invention may be utilized to capture any surface or object with an applied random pattern, one application for which the invention is particularly useful is capturing the motion of moving fabric. In one embodiment, a random pattern is applied to a side of the cloth or article of clothing. In another embodiment of the present invention, a random pattern is applied to both sides of a cloth or article of clothing. In yet another embodiment, each side of the cloth is coated with a random pattern of a different color paint (in the case of phosphorescent paint, a paint that phosphoresces in a different color) in relation to the paint applied to the other side in order to better differentiate the two sides.

Figure 20A:
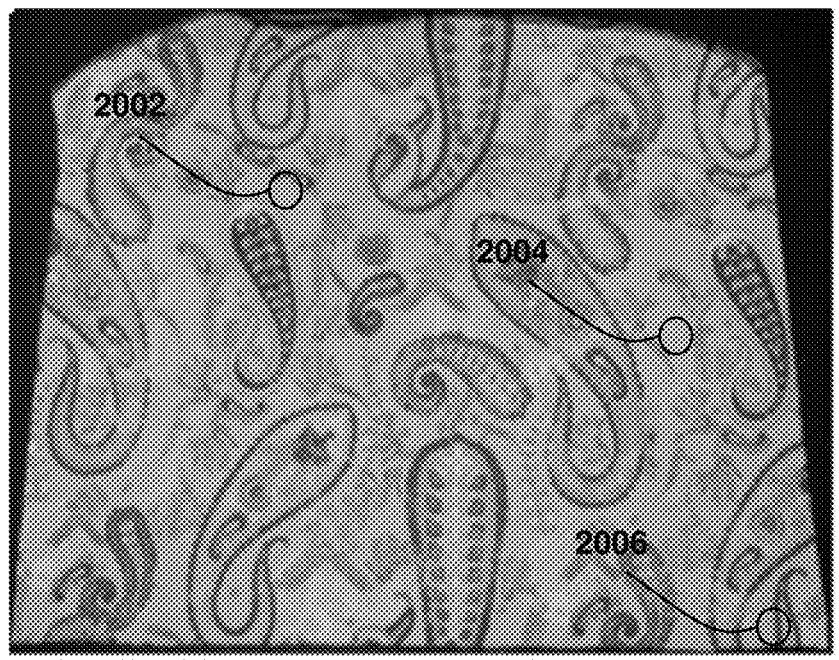
FIGS. 20A and 20B are frames captured; at two separate points in time, from the same camera position, and with external visible light present; of a cloth with a random pattern of phosphorescent paint applied to both sides.
Figure 20B:
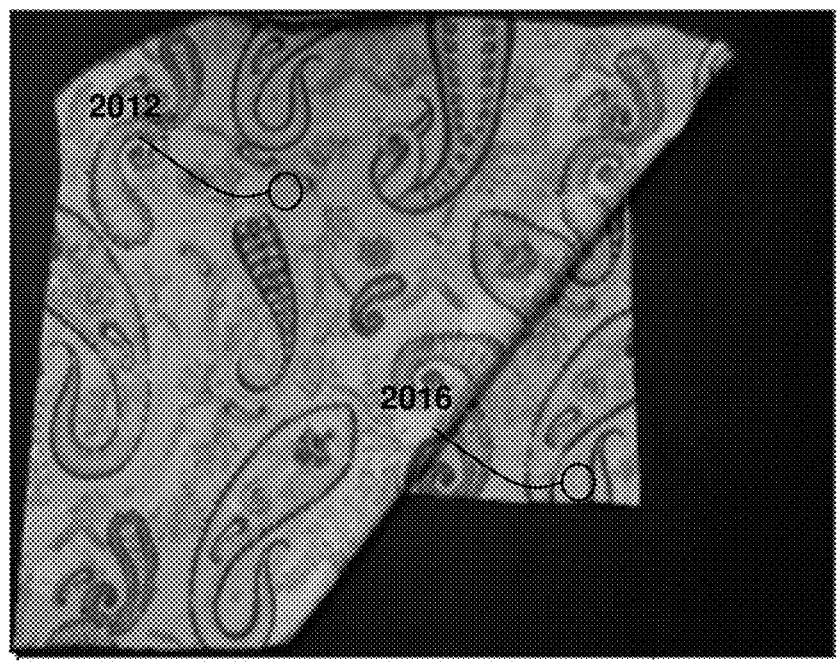
Figure 21A:
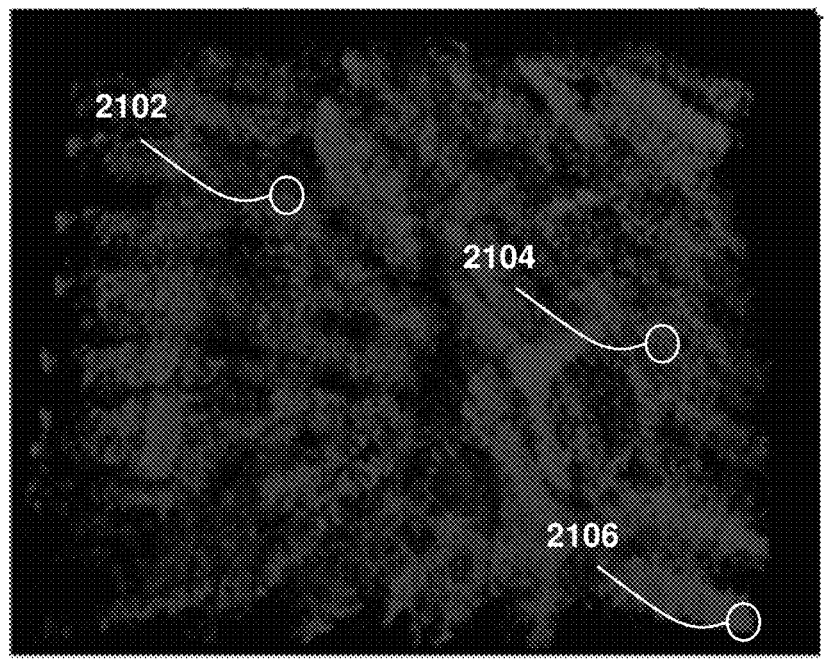
FIGS. 21A and 21B are frame captures, without external visible light present, corresponding to FIGS. 20A and 20B, respectively, of the cloth with the random pattern of paint applied to both sides.
Figure 21B:
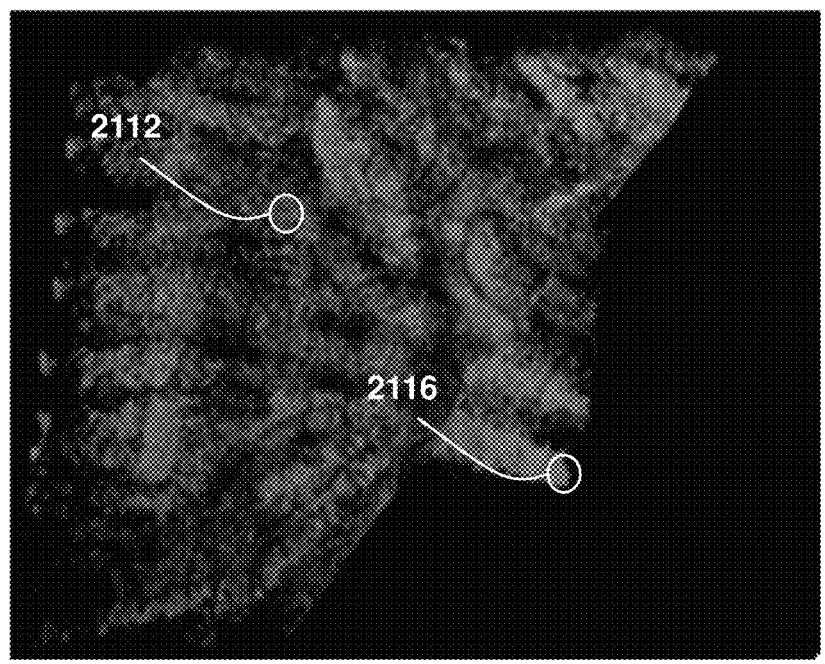

FIGS. 20A and 20B illustrate captured frames with external visible light of a cloth with an applied random pattern of phosphorescent paint (the phosphorescent paint as applied is largely transparent in visible light, but where it is especially dense, it can be seen in as a smattering of yellow on the cloth's blue and lavender paisley print pattern). FIGS. 21A and 21B illustrate the captured frames, without external visible light, corresponding to the captured frames of FIGS. 20A and 20B, respectively. FIGS. 21A and 21B are colored red and green, respectively, for descriptive purposes only in the forthcoming description of FIG. 22. For the present invention, the frames may be captured in any color or in grayscale.

The motion capture system of the present invention handles cloth in the same way it handles a performer. In one embodiment, prior to a motion capture session, the cloth with the random pattern applied is unfolded and held in such a way that each region on both sides of the cloth can be captured by at least one camera. A region database is then created for all regions on both sides of the cloth.

During the capture session, for each frame, the regions that are visible to at least 2 cameras are correlated and their surface positions are output from the motion capture system along with the regions in the region database that correlate to the regions on the surface, as illustrated in FIG. 15. Therefore, the 3D modeling/rendering and animation package is able to keep a texture map locked to the surface that is output by the motion capture system.

Figure 22:
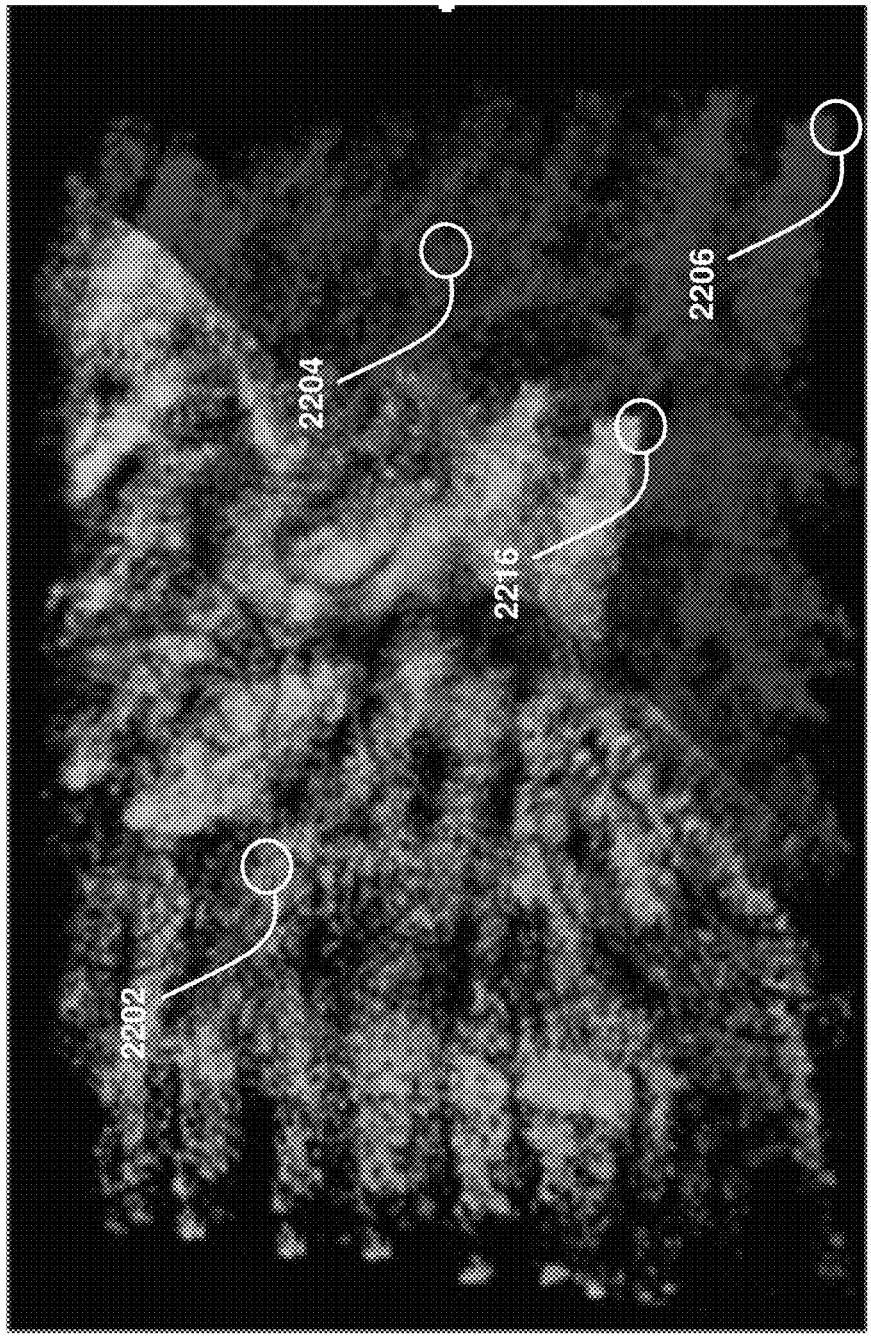
FIG. 22 is a frame with the frame captures of FIGS. 21A and 21B overlapping each other.

In addition, correlation can be performed on subsequent time frame captures from the same camera in order to track points on the cloth as they move. For example, FIG. 22 illustrates the overlapping of FIGS. 21A and 21B, which were captured at different times. Regions 2102 and 2106 of FIG. 21A are correlated to regions 2112 and 2116 of FIG. 21B, respectively, as shown by regions 2202 and 2206/2216, respectively, in FIG. 22. Region 2104 has no mated region in FIG. 21B because the region is hidden from the camera's view by the fold in the cloth, as shown by corresponding region 2204 in FIG. 22 in red, for which there is no mated green region. For illustrative purposes, the uniformly yellow regions of the frame in FIG. 22 correspond to non-moving regions of the frames in FIGS. 21A and 21B and the regions of FIG. 22 that are either a medley of red/green/yellow or are of a solid red or green color indicate areas that have moved from the frame captured in FIG. 21A and the frame captured in FIG. 21B. Thus, movement can be noticed because of the shifting of region 2106/2206 to region 2116/2216 and the disappearance of region 2104 of the cloth between FIGS. 21A and 21B, leaving only a solid red region 2204.

The cloth capture techniques described herein can also facilitate a simulated cloth animation, which may be created by cloth animation packages such as those available within Maya from Alias Systems Corp. of Toronto, Ontario Canada. A performer may wear a garment similar to the one being simulated by the cloth animation package. The performer may then perform movements desired by the animation director while being captured by the motion capture system. The motion capture system of the present invention then outputs the cloth surface each frame, as previously described, along with a mapping of the position of the regions on the cloth surface (as correlated with the previously captured region database of the entire surface of the cloth). The data is then used by the cloth simulation package to establish constraints on the movement of the cloth.

For example, suppose an animation director has a character in an animation that is wearing a cloak. The animation director wishes the cloak to billow in the wind with a certain dramatic effect. Prior art cloth simulation packages would require the animation director to try establish physical conditions in the simulation (e.g. the speed, direction and turbulence of the wind, the weight and flexibility of the cloth, the mechanical constraints of where the cloth is attached to the performer's body, the shape and flexibility of any objects the cloth comes into contact with, seams or other stiff elements in the cape, etc.). And, even with very fast computers, a high-resolution cloth simulation could easily take hours, or even days, to complete, before the animation director will know whether the resulting billowing cloak look corresponds to the dramatic effect he or she is trying to achieve. If it doesn't, then it will be a matter of adjusting the physical conditions of the simulation again, and then waiting for the simulation to complete again. This adds enormous cost to animations involving cloth animation and limits the degree of dramatic expression.

Given the same example as the previous paragraph, but using one embodiment of the present invention (i.e. applying a random pattern of paint to the cloth and capturing it as described previously), if the animation director desires a character to have a cloak to billow in the wind with a certain dramatic effect, then the animation director just attaches a cloak of the desired weight and flexibility on a performer in the environment of the scene, and then adjusts a fan blowing on the performer until the billowing of the cloak achieves the desired dramatic effect. Then, this billowing cloak is captured using the techniques previous described. Now, when the cloth for the cloak is simulated by the cloth simulation package, the cloth simulation package can be configured with only very approximate physical conditions, but to only allow the cloak to move within some range of motion (e.g. plus or minus 5 pixels in x, y, or z) relative to the motion of the captured cloak. Then, when the cloth animation package simulates the cloak, its motion will very closely follow the motion of the captured cloak due to the constrained motion, and the animation director will achieve the desired dramatic effect. Thus, compared to prior art cloth simulation techniques, the method of the present invention dramatically reduces the time and effort needed to achieve a desired dramatic effect with simulated cloth, which allows the director far more creative control. In one embodiment of the present invention (as illustrated in the preceding example), the captured cloth surface may be used to establish a general set of boundaries for the cloth simulation, so that each region simulated cloth may not veer further than a certain distance from each region of the captured cloth. In another embodiment, the captured cloth surface may be used for rigid parts of a garment (e.g. the rigid parts like the collar or seams), and the simulated cloth may be used for the non-rigid parts of the garment (e.g., the sleeves). Likewise, another embodiment is that the captured cloth surface may be used for the non-rigid parts of the garment (e.g. the sleeves), and the simulated cloth may be used for the rigid parts of a garment (e.g., collar, seams).

The present invention is not constrained to capturing or using only specific portions of a captured cloth surface. The captured cloth surface can be used to fully specify the cloth surface for an animation, or it can be used partially to specify the cloth surface, or it can be used as a constraint for a simulation of a cloth surface. The above embodiments are only for illustrative purposes.

Camera Positioning for a Motion Capture System

Because motion capture with random patterns allows for higher resolution capture, the system may employ camera positioning which is different from existing camera configurations in current motion capture systems. The unique configuration yields motion capture at higher resolution than motion capture produced by previously existing camera configurations with the same type of cameras. Another of the many advantages of the unique camera configuration is that large-scale camera shots can capture relatively low-resolution background objects and skeletal motion of performers and still motion capture at high resolution critical motions of performers such as faces and hands.

Figure 23:
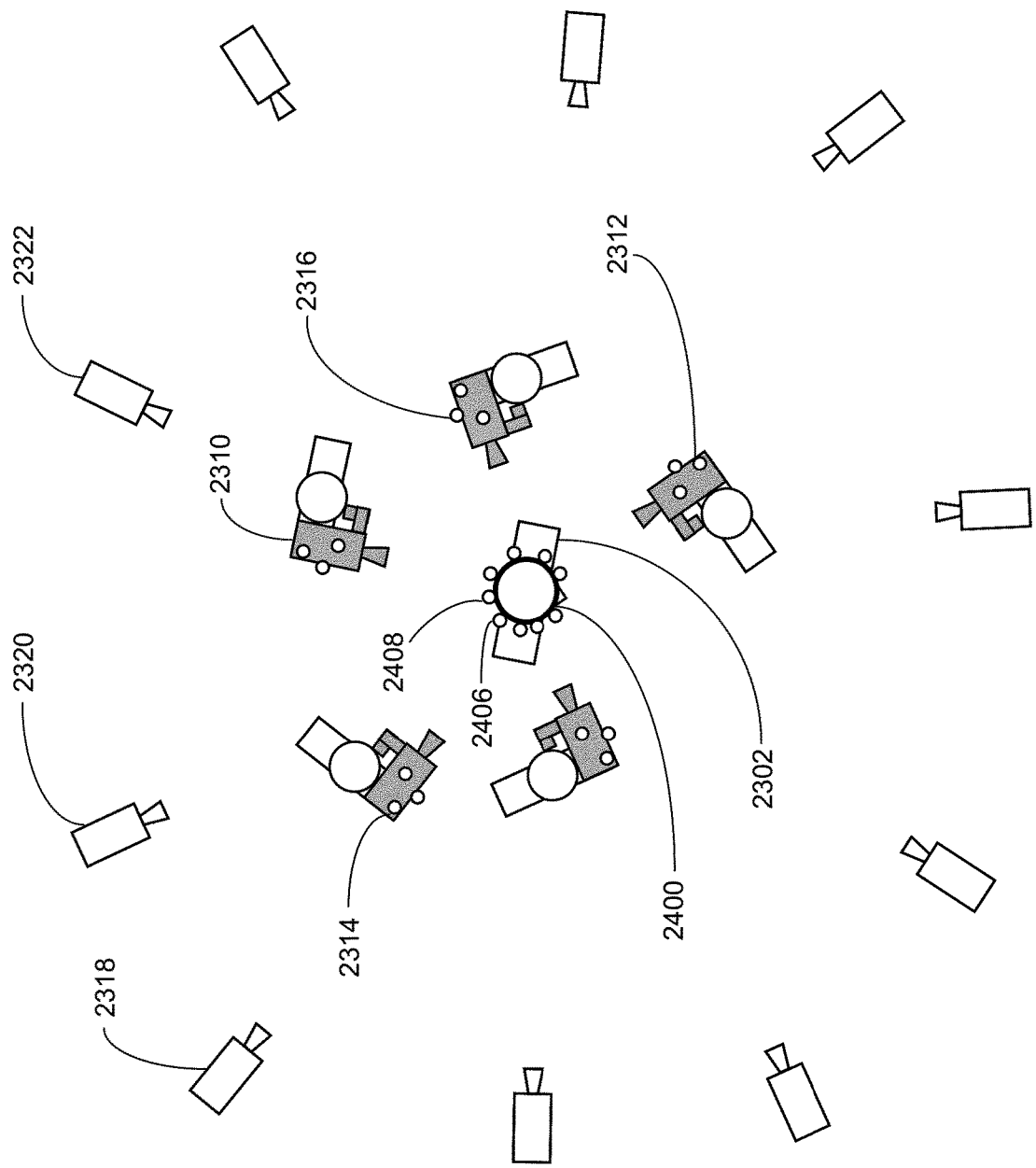
FIG. 23 illustrates one embodiment of the camera positioning for the motion capture system of FIG. 6 or 13.
Figure 24:
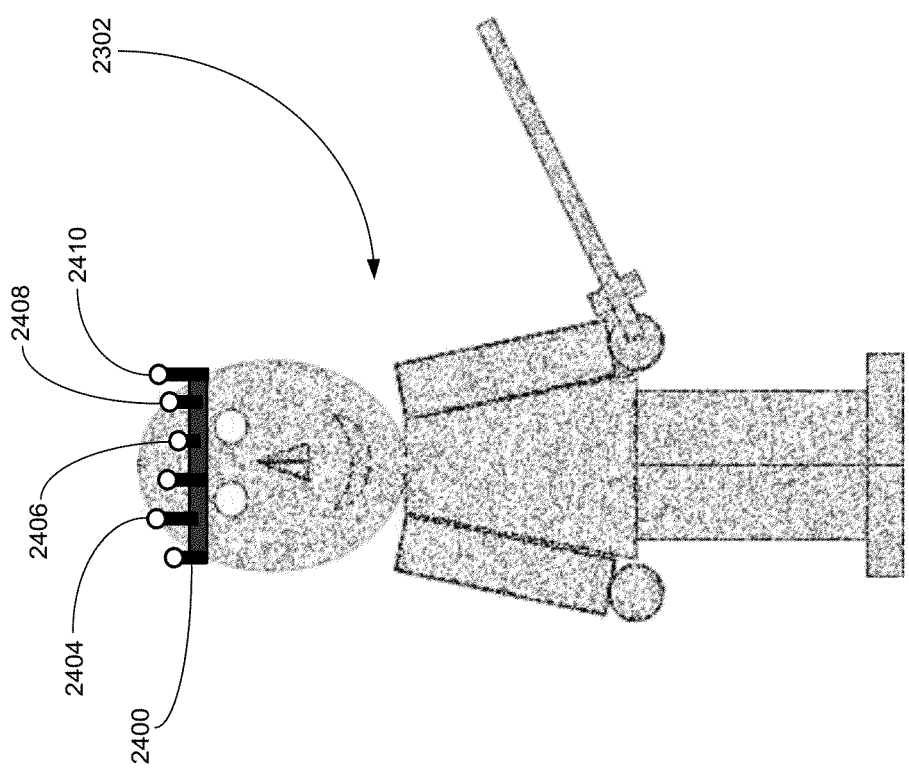
FIG. 24 illustrates the performer in FIG. 23 wearing a crown of markers.

FIG. 23 illustrates one embodiment of the camera positioning for motion capturing the performer 2302. In the current embodiment, the performer is wearing a crown 2400 with markers attached (e.g., 2406, 2408). FIG. 24 shows the markers of the crown 2400 worn by the performer 2302 at varying heights from one another. For example, marker 2406 is lower than marker 2408, which is lower than marker 2410. With varying heights placed on the markers, the motion capture system can determine in which direction the performer 2302 is orientated. Orientation can also be determined by other embodiments of the present invention, such as markers placed on the body, or identifiable random patterns applied to certain regions of the performer 2302.

In FIG. 24, a random pattern is applied to the entire performer 2302, but alternate embodiments have the random pattern applied to a portion of the performer 2302, such as the face. In an additional embodiment, filming without motion capture using the unique camera configuration allows higher resolution capture of portions of a larger shot (e.g., close up capture of two performers having a dialogue in a larger scene).

In FIG. 23, a ring of cameras (e.g., cameras 2310 and 2312) close to the performer 2302 is used. In one embodiment of the present invention, the cameras capture the areas of the performer 2302 for which a high resolution is desired. For example, a random pattern applied to the face of a performer 2302 may be captured at a high resolution because of the close proximity of the cameras 2310-2312. Any number of cameras can circle the performer 2302, and the cameras can be positioned any reasonable distance away from the performer 2302.

Figure 25:
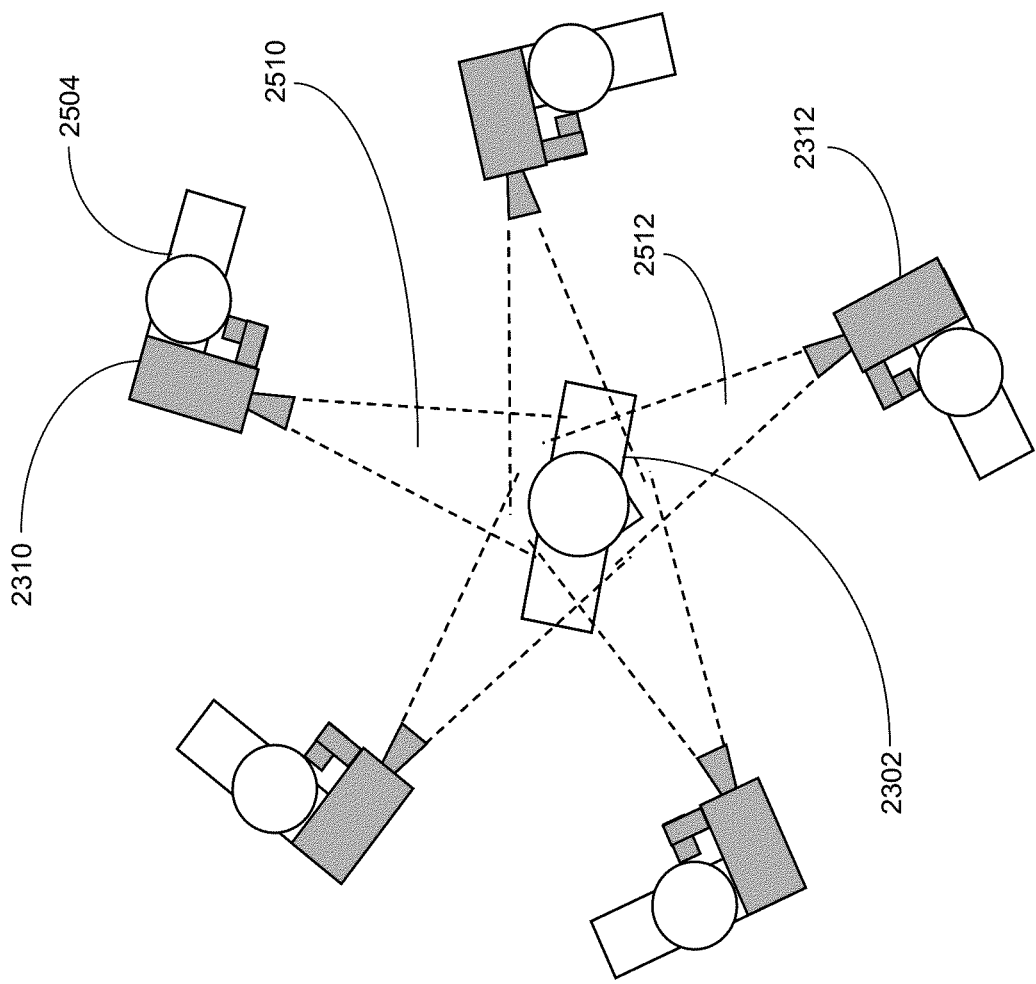
FIG. 25 illustrates, from FIG. 23, the inner ring of cameras' fields of view of the performer.

FIG. 25 illustrates the performer 2302 encircled by the ring of cameras 2310-2312 from FIG. 23. In one embodiment of the present invention, persons control the cameras circling the performer 2302. For example, person 2504 controls camera 2310. Human control of a camera allows the person to focus on important and/or critical areas of the performer 2302 for high resolution motion capture. In alternate embodiments, the cameras may be machine-controlled and/or stabilized.

Referring back to FIG. 23, a second ring of cameras (e.g., cameras 2318-2322) encircles the first ring of cameras and the performer 2302. Any number of cameras may form the second ring of cameras 2318-2322. In one embodiment, the outer ring of cameras capture wide shots including a lower resolution capture of the performer 2302 than the cameras 2310-2312, which are in closer proximity to the performer 2302.

In order to create a wide shot with a high resolution capture of the performer 2302, the motion captures of the inner ring of cameras 2310-2312 must be integrated into the wide captures of the outer ring of cameras 2318-2322. In order to integrate the captures, the Data Processing Unit 610 of the motion capture system must know the camera position and orientation for each of the cameras comprising the inner ring of cameras 2310-2312. Determining the positioning of the cameras comprising the inner ring may be of more importance and difficulty with the use of persons 2504 to control the cameras 2310-2312 because of random human movement.

In one embodiment, markers (e.g., 2314 and 2316) are attached to the cameras 2310-2312. The markers 2314-2316 are captured by the outer ring of cameras 2318-2322. The position and orientation of the markers 2314-2316 identified in the frame captures of the outer ring of cameras 2318-2322 allow the data processing unit to determine the position and orientation of each camera of the inner ring of cameras 2310-2312. Therefore, the Data Processing Unit 610 can correlate the desired frame captures from an inner ring camera with the frame captures of an outer ring camera so as to match the orientation and positioning of the inner ring camera's frame captures with the outer ring camera's frame captures. In this way, a combined capture of both high-resolution and low-resolution captured data can be achieved in the same motion capture session.

FIG. 25 illustrates the cameras' field of view (e.g., camera 2310 has field of view 2510 and camera 2312 has field of view 2512). When two cameras have overlapping fields of view, 3D rendering can be performed on the streams of frame captures (as previously discussed).

In order to correlate images as described in the process illustrated in FIG. 15, the data processing unit must know the orientations and positions of the two cameras. For example, the Data Processing Unit 610 may have to correct the tilt of a frame because of the person controlling the camera holding the camera at a tilted angle in comparison to the other camera. In one embodiment, the position and orientation of the markers attached to the cameras are used by the Data Processing Unit 610 to calculate corrections to offset the orientation differences between the two cameras. The Data Processing Unit 610 can also correct the difference in distance the two cameras are positioned away from the performer 2302.

Once corrections are performed by the Data Processing Unit 610, the Data Processing Unit 610 may correlate the streams of capture data from the two cameras in order to render a 3D surface. Correlations can also be performed on the streams of frame captures from two outer ring cameras 2318-2322, and then all correlations can be combined to render a volume from the captures. Correlations can then be performed on the sequence of volumes to render the motion of a volume.

In an alternative embodiment, the outer ring of cameras 2318-2322 are prior art retroreflective marker-based motion capture cameras and the inner ring of cameras 2310-2312 are random-pattern motion capture cameras of the present invention. In this embodiment, when phosphorescent random pattern paint is used, the LED rings around the marker-based cameras 2318-2322 (shown as LED rings 130-132 in FIG. 1) are switched on and off synchronously with the light panels (e.g. 608 and 609 of FIG. 6) so that the outer ring marker capture occurs when the LED rings 130-132 are on (e.g. during interval 713 of FIG. 7) and the inner ring random pattern capture occurs when the LED rings 130-132 are off (e.g. during interval 715 of FIG. 7).

In another embodiment, the outer ring of cameras 2318-2322 are prior art marker-based motion capture cameras and the inner ring of cameras 2310-2312 are random-pattern motion capture cameras of the present invention, but instead of using retroreflective balls for markers, phosphorescent balls are used for markers. In this embodiment, when phosphorescent random paint is used, the inner and outer cameras capture their frames at the same time (e.g. interval 715 of FIG. 7).

In another embodiment, utilizing either of the capture synchronization methods described in the preceding two paragraphs, the outer ring of cameras 2318-2322 capture lower-resolution marker-based motion (e.g. skeletal motion) and the inner ring of cameras 2310-2312 capture high-resolution surface motion (e.g. faces, hands and cloth). In one embodiment the outer ring of cameras 2318-2322 are in fixed positions (e.g. on tripods) while the inner ring of cameras 2310-2312 are handheld and move to follow the performer. Markers 2314-2316 on the inner ring cameras are tracked by the outer ring cameras 2318-2322 to establish their position in the capture volume (x, y, z, yaw, pitch roll). This positioning information is then used by the software correlating the data from the inner ring cameras 2310-2312 using the methods described above (e.g. FIG. 15). Also, this positioning information is used to establish a common coordinate space for the marker-based motion data captured by the outer ring cameras 2318-2322 and the random-pattern based motion data captured by the inner ring cameras 2310-2312 so that the captured objects can be integrated into the same 3D scene with appropriate relative placement.

In another embodiment, using either outer- and inner-ring synchronization method, an outer ring of marker-based cameras 2318-2322 tracks the crown of markers 2400 and determines the position of the markers in the capture volume, and an inner ring of random pattern-based cameras 2310-2310 determines their position relative to one another and to the crown 2400 by tracking the markers on the crown 2400. And in yet another embodiment, the outer ring of marker-based cameras 2318-2322 tracks both the crown of markers 2400 and markers 2314-2316 on the inner ring of random pattern-based cameras 2310-2312, and determines the position of whatever markers are visible, while the inner ring of cameras 2310-2312 tracks whatever markers on the crown 2400 are visible. Both methods (tracking the crown of markers 2400 and tracking the markers on the cameras) are used to determine the position of the inner cameras 2310-2312 in the capture volume, so that if for a given frame one method fails to determine an inner camera's 2310-1212 position (e.g. if markers are obscured) the other method is used if it is available.

In an alternate embodiment of the camera positioning, each group of cameras may be placed in an arc, line, or any other geometric configuration, and are not limited to circles or circular configurations. In addition, more than two groups of cameras may be used. For example, if the application requires it, four rings of cameras may be configured for the motion capture system.

Hardware and/or Software Implementation of the Present Invention

Embodiments of the invention may include various steps as set forth above. The steps may be embodied in machine-executable instructions which cause a general-purpose or special-purpose processor to perform certain steps. Various elements which are not relevant to the underlying principles of the invention such as computer memory, hard drive, input devices, have been left out of the figures to avoid obscuring the pertinent aspects of the invention.

Alternatively, in one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. Accordingly, the scope and spirit of the present invention should be judged in terms of the claims which follow.

What is claimed is:

1. A system comprising:
   a video game program incorporating data representing a rendered animated three-dimensional (3D) face;
   the data including a rendering of a first plurality of 3D points on at least part of the rendered animated 3D face at a first plurality of time intervals correlated to a high resolution second plurality of 3D points on at least part of a surface of a performer's face at a second plurality of time intervals;
   wherein the second plurality of 3D points on the surface of the performer's face were not identified by markers applied to the performer's face; and
   wherein a processor automatically tracked the second plurality of 3D points.

2. The system of claim 1 wherein the first plurality of 3D points automatically tracked the second plurality of 3D points within regions of the performer's face that fold or deform.

3. The system of claim 1 wherein the second plurality of 3D points include some or all parts of eyes, lips, or teeth of the performer.

4. The system of claim 1 wherein the second plurality of 3D points at one or more time intervals corresponds to a facial expression.

5. The system of claim 1 wherein at least some of the time intervals are successive frame times.

6. The system of claim 1 wherein at least some of the time intervals are not successive frame times.

7. The system of claim 1 wherein the first plurality of 3D points represent at least part of a character's face different from performer's face.

8. The system of claim 1 wherein the surface of the performer's face was captured by a plurality of cameras.

9. A method comprising:
   communicating video from a video game program that includes a rendered animated three-dimensional (3D) face;
   at least part of the video including a rendering of a first plurality of 3D points on at least part of the rendered animated 3D face at a first plurality of time intervals correlated to a high resolution second plurality of 3D points on at least part of a surface of a performer's face at a second plurality of time intervals;
   wherein the second plurality of 3D points on the surface of the performer's face were not identified by markers applied to the performer's face; and
   wherein a processor automatically tracked the second plurality of 3D points.

10. The method of claim 9 further comprising:
    the first plurality of 3D points automatically tracked the second plurality of 3D points within regions of the performer's face that fold or deform.

11. The method of claim 9 further comprising:
    the second plurality of 3D points include some or all parts of eyes, lips, or teeth of the performer.

12. The method of claim 9 wherein the second plurality of 3D points at one or more time intervals corresponds to a facial expression.

13. The method of claim 9 wherein at least some of the time intervals are successive frame times.

14. The method of claim 9 wherein at least some of the time intervals are not successive frame times.

15. The method of claim 9 further comprising:
    the first plurality of 3D points representing at least part of a character's face different from the performer's face.

16. A system comprising:
    a video game program incorporating data representing a rendered animated three-dimensional (3D) face;
    the data including a rendering of a first plurality of 3D points on at least part of the rendered animated 3D face at a first plurality of time intervals correlated to a second plurality of 3D points on at least part of a surface of a performer's face at a second plurality of time intervals;
    wherein the first plurality of 3D points automatically tracked the second plurality of 3D points within regions of the performer's face that fold or deform.

17. The system of claim 16 wherein the second plurality of 3D points on the surface of the performer's face were not identified by markers applied to the performer's face.

18. The system of claim 16 wherein the second plurality of 3D points include some or all parts of eyes, lips, or teeth of the performer.

19. The system of claim 16 wherein the second plurality of 3D points at one or more time intervals corresponds to a facial expression.

20. The system of claim 16 wherein at least some of the time intervals are successive frame times.

21. The system of claim 16 wherein at least some of the time intervals are not successive frame times.

22. The system of claim 16 wherein the first plurality of 3D points represent at least part of a character's face different from the performer's face.

23. The system of claim 16 wherein the surface of the performer's face was captured by a plurality of cameras.

24. A method comprising:
    communicating video from a video game program that includes a rendered animated three-dimensional (3D) face;
    at least part of the video including a rendering of a first plurality of 3D points on at least part of the rendered animated 3D face at a first plurality of time intervals correlated to a second plurality of 3D points on at least part of a surface of a performer's face at a second plurality of time intervals;
    wherein the first plurality of 3D points automatically tracked the second plurality of 3D points within regions of the performer's face that fold or deform.

25. The method of claim 24 wherein the second plurality of 3D points on the surface of the performer's face were not identified by markers applied to the performer's face.

26. The method of claim 24 further comprising:
    the second plurality of 3D points include some or all parts of eyes, lips, or teeth of the performer.

27. The method of claim 24 wherein the second plurality of 3D points at one or more time intervals corresponds to a facial expression.

28. The method of claim 24 further wherein at least some of the time intervals are not successive frame times.

29. The method of claim 24 wherein at least some of the time intervals are not successive frame times.

30. The method of claim 24 further comprising:
    the first plurality of 3D points representing at least part of a character's face the performer's face.

* * * * *